(12) United States Patent
Kim et al.

(10) Patent No.: US 11,360,791 B2
(45) Date of Patent: Jun. 14, 2022

(54) ELECTRONIC DEVICE AND SCREEN CONTROL METHOD FOR PROCESSING USER INPUT BY USING SAME

(71) Applicant: Samsung Electronics Co., Ltd, Suwon-si (KR)

(72) Inventors: Jihyun Kim, Suwon-si (KR); Dongho Jang, Hwaseong-si (KR); Minkyung Hwang, Seoul (KR); Kyungtae Kim, Hwaseong-si (KR); Inwook Song, Seoul (KR); Yongjoon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 16/499,197

(22) PCT Filed: Mar. 27, 2018

(86) PCT No.: PCT/KR2018/003574
§ 371 (c)(1),
(2) Date: Sep. 27, 2019

(87) PCT Pub. No.: WO2018/182270
PCT Pub. Date: Oct. 4, 2018

(65) Prior Publication Data
US 2021/0109703 A1  Apr. 15, 2021

(30) Foreign Application Priority Data

Mar. 28, 2017 (KR) .......................... 10-2017-0039239

(51) Int. Cl.
*G06F 9/451* (2018.01)
*G06F 3/16* (2006.01)
(Continued)

(52) U.S. Cl.
CPC .......... *G06F 9/451* (2018.02); *G06F 3/04817* (2013.01); *G06F 3/04883* (2013.01);
(Continued)

(58) Field of Classification Search
None
See application file for complete search history.

(56) References Cited

U.S. PATENT DOCUMENTS 8,165,886 B1 * 4/2012 Gagnon .................. G10L 15/19
715/728
8,452,597 B2 * 5/2013 Bringert .................. G06F 3/167
704/251
(Continued)

FOREIGN PATENT DOCUMENTS

EP    2767898 A2    8/2014
JP    5365060 B2    9/2013
(Continued)

OTHER PUBLICATIONS

International Search Report dated Jun. 26, 2018 in connection with International Patent Application No. PCT/KR2018/003574, 2 pages.
(Continued)

*Primary Examiner* — Ryan Barrett

(57) ABSTRACT

Various embodiments of the present invention relate to an electronic device and a screen control method for processing a user input by using the same, and according to the various embodiments of the present invention, the electronic device comprises: a housing; a touchscreen display located inside the housing and exposed through a first part of the housing; a microphone located inside the housing and exposed through a second part of the housing; at least one speaker located inside the housing and exposed through a third part of the housing; a wireless communication circuit located
(Continued)

inside the housing; a processor located inside the housing and electrically connected to the touchscreen display, the microphone, the at least one speaker, and the wireless communication circuit; and a memory located inside the housing and electrically connected to the processor, wherein the memory stores a first application program including a first user interface and a second application program including a second user interface, wherein the memory stores instructions, and when the memory is executed, cause the processor to: display the first user interface on the display, while displaying the first user interface, receive a user input through at least one of the display or the microphone, wherein the user input includes a request for performing a task using the second application program, transmit data associated with the user input to an external server via the communication circuit, receive a response from the external server via the communication circuit, wherein the response includes information on a sequence of states of the electronic device to perform the task, and after receiving the response, display the second user interface on a first region of the display, based on the sequence of the states, while displaying a portion of the first user interface on a second region of the display. Other various embodiments, in addition to the various embodiments disclosed in the present invention, are possible.

14 Claims, 44 Drawing Sheets

(51) Int. Cl.
  *G10L 15/22* (2006.01)
  *G06F 3/04817* (2022.01)
  *G06F 3/04883* (2022.01)
  *G10L 15/28* (2013.01)
(52) U.S. Cl.
  CPC ............. *G06F 3/167* (2013.01); *G10L 15/22* (2013.01); *G10L 15/28* (2013.01); *G06F 2203/0381* (2013.01); *G10L 2015/223* (2013.01)

(56) References Cited

U.S. PATENT DOCUMENTS

| 8,539,503 | B2 | 9/2013 | Homma |
| 9,412,392 | B2 | 8/2016 | Lindahl |
| 9,466,293 | B1* | 10/2016 | Gagnon ................. G10L 17/22 |
| 9,785,337 | B2 | 10/2017 | Seo et al. |
| 10,127,011 | B2 | 11/2018 | Bang et al. |
| 10,572,104 | B2 | 2/2020 | Shin et al. |
| 2009/0112572 | A1* | 4/2009 | Thorn ..................... G06F 3/038 704/3 |
| 2014/0028826 | A1* | 1/2014 | Lee .......................... G10L 25/87 348/77 |
| 2014/0218372 | A1 | 8/2014 | Missig et al. |
| 2014/0237367 | A1 | 8/2014 | Jung et al. |
| 2014/0282272 | A1 | 9/2014 | Kies et al. |
| 2014/0289423 | A1* | 9/2014 | Kim .................. H04N 21/44227 709/233 |
| 2015/0082175 | A1 | 3/2015 | Onohara et al. |
| 2015/0185980 | A1 | 7/2015 | An et al. |
| 2016/0034253 | A1* | 2/2016 | Bang ..................... G06F 9/5055 715/728 |
| 2016/0147388 | A1 | 5/2016 | Shin et al. |

FOREIGN PATENT DOCUMENTS

| JP | 5928048 B2 | 5/2016 |
| KR | 10-2014-0105340 A | 9/2014 |
| KR | 10-2015-0077774 A | 7/2015 |
| KR | 10-2016-0016530 A | 2/2016 |
| KR | 10-2016-0059026 A | 5/2016 |
| KR | 10-2016-0061733 A | 6/2016 |
| KR | 10-1659063 B1 | 9/2016 |

OTHER PUBLICATIONS

Written Opinion of the International Searching Authority dated Jun. 26, 2018 in connection with International Patent Application No. PCT/KR2018/003574, 8 pages.

Supplementary European Search Report dated Mar. 16, 2020 in connection with European Patent Application No. 18 77 6046, 10 pages.

* cited by examiner

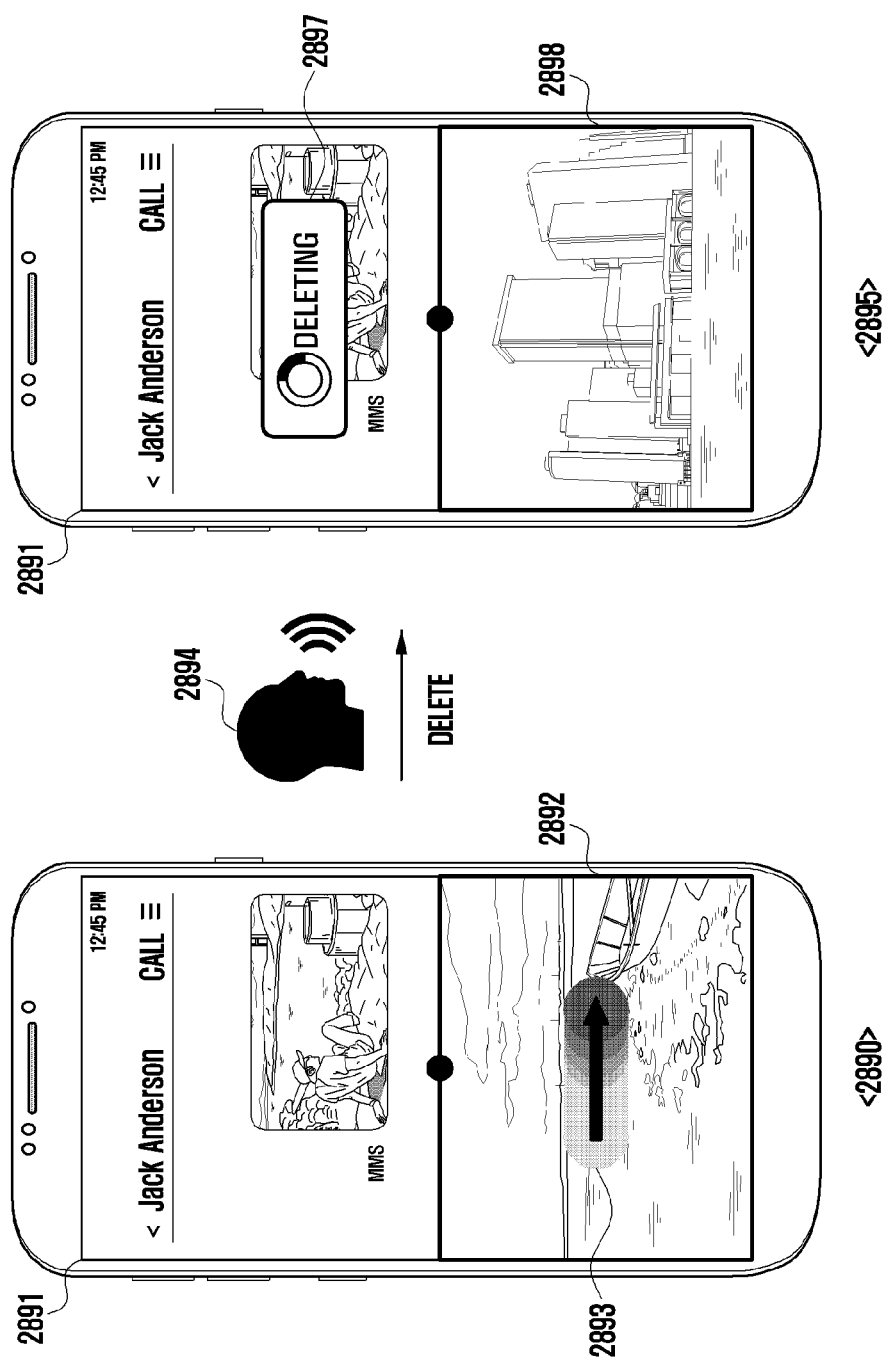

ELECTRONIC DEVICE AND SCREEN CONTROL METHOD FOR PROCESSING USER INPUT BY USING SAME

CROSS-REFERENCE TO RELATED APPLICATIONS

This application is a 371 of International Application No. PCT/KR2018/003574 filed on Mar. 27, 2018, which claims priority to Korean Patent Application No. 10-2017-0039239 filed on Mar. 28, 2017, the disclosures of which are herein incorporated by reference in their entirety.

BACKGROUND

1. Field

Various embodiments of the disclosure relate to an electronic device and a screen control method for processing a user input by using the same.

2. Description of Related Art

Recent development of speech recognition technology has made it possible to implement a speech recognition function by various electronic devices having a speech input device (for example, a microphone). For example, an electronic device can recognize speech uttered by a user through the speech recognition function, and can execute a specific function on the basis of the uttered speech. Such a speech recognition function has recently been gradually and widely adopted by electronic devices to replace physical inputs and to control the electronic devices with speech.

However, in order to control an electronic device through a speech input, the user needs to undergo multiple processes of activating the electronic device, activating the speech recognition function, and inputting speech information.

In addition, if speech uttered by the user is input after performing the speech recognition function, the existing screen that has been displayed is replaced with a screen corresponding to the user's utterance, in order to perform the corresponding operation, and this may pose a problem in that the user's activity through the existing screen may be interfered with.

According to various embodiments of the disclosure, an electronic device may provide a method for performing a speech recognition function easily.

According to various embodiments of the disclosure, an electronic device may provide a screen control function capable of performing an operation corresponding to a user utterance.

SUMMARY

According to various embodiments of the disclosure, an electronic device may include: a housing; a touchscreen display positioned inside the housing and exposed through a first portion of the housing; a microphone positioned inside the housing and exposed through a second portion of the housing; at least one speaker positioned inside the housing and exposed through a third portion of the housing; a wireless communication circuit positioned inside the housing; a processor positioned inside the housing and electrically connected to the display, the microphone, the speaker, and the communication circuit; and a memory positioned inside the housing and electrically connected to the processor, wherein the memory is configured to store a first application program that includes a first user interface, and a second application program that includes a second user interface, and wherein the memory stores instructions that, when executed, cause the processor to: display the first user interface on the display; while displaying the first user interface, receive a user input through at least one of the display or the microphone, wherein the user input includes a request for performing a task using the second application program; transmit data associated with the user input to an external server via the communication circuit; receive a response from the external server via the communication circuit, wherein the response includes information on a sequence of states of the electronic device to perform the task; and after receiving the response, display the second user interface on a first region of the display, based on the sequence of the states, while displaying a portion of the first user interface on a second region of the display.

According to various embodiments of the disclosure, a method for controlling a screen for processing a user input may include the operations of: displaying a first user interface on a touchscreen display; receiving a user input including a request for performing a task by using a second application program through at least one of the touchscreen display or a microphone while displaying the first user interface; transmitting data associated with the user input to an external server through a wireless communication circuit; receiving a response including information regarding a sequence of states of the electronic device, in order to perform the task, from the external server through the wireless communication circuit; and, after receiving the response, displaying a second user interface related to the second application program on a first region of the touchscreen display while a portion of the first user interface is displayed on a second region of the touchscreen display.

According to various embodiments of the disclosure, an electronic device may have a separate button for a speech recognition function such that the speech recognition function can be performed easily.

According to various embodiments of the disclosure, an electronic device may perform a function corresponding to a user utterance without interfering with the screen that has been used by the user to perform an activity.

BRIEF DESCRIPTION OF THE DRAWINGS

FIG. 28A to FIG. 28E are diagrams illustrating a method for determining a window to display an application corresponding to a path rule by an intelligent server according to various embodiments of the disclosure.

DETAILED DESCRIPTION

Figure 1:
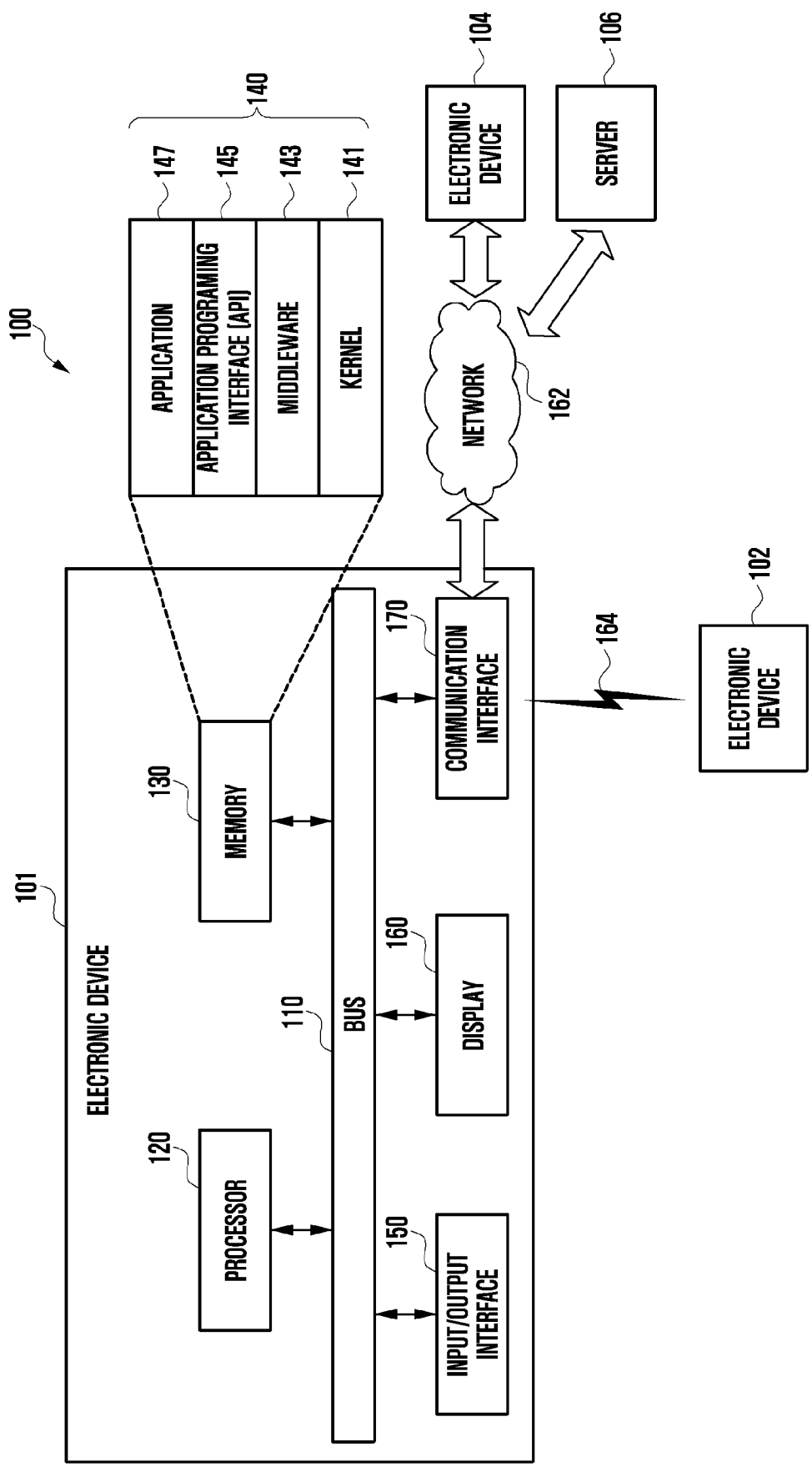
FIG. 1 is a block diagram illustrating a network environment including an electronic device according to various embodiments of the disclosure.

Hereinafter, various embodiments of the disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements.

In the disclosure, the terms such as "include", "have", "may include" or "may have" denote the presence of stated elements, components, operations, functions, features, and the like, but do not exclude the presence of or a possibility of addition of one or more other elements, components, operations, functions, features, and the like.

In the disclosure, the expression "A or B", "at least one of A and/or B", or "one or more of A and/or B" is intended to include any possible combination of enumerated items. For example, the expression "A or B", "at least one of A and B", or "at least one of A or B" may indicate all of (1) case of including at least one A, (2) case of including at least one B, or (3) case of including both at least one A and at least B.

In the disclosure, expressions such as "1st" or "first", "2nd" or "second", etc. may indicate various elements regardless of their sequence and/or importance and are used merely to distinguish one element from the others. For example, a first user device and a second user device may indicate different user devices regardless of their sequence or importance. For example, without departing from the scope of the disclosure, a first element may be referred to as a second element, and similarly a second element may be also referred to as a first element.

When it is mentioned that a certain (i.e., first) element is "(operatively or communicatively) coupled with/to" or "connected to" another (i.e., second) element, it will be understood that the first element is coupled or connected to the second element directly or via any other (i.e., third) element. On the other hand, when it is mentioned that a certain (i.e., first) element is "directly coupled with/to" or "directly connected to" another (i.e., second) element, any other (i.e., third) element does not exist between the certain element and another.

In the disclosure, the expression "configured to ~" may be interchangeably used with other expressions "suitable for ~", "having the capacity to ~", "designed to ~", "adapted to ~", "made to ~", or "capable of ~". The expression "configured to (or set to) ~" may not necessarily mean "specifically designed to ~" in hardware. Instead, in some situations, the expression a device "configured to ~" may mean that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

Terms used in the disclosure are used only to describe certain embodiments and may not be intended to limit the scope of other embodiments. The singular expressions may include plural expressions unless the context clearly dictates otherwise. Terms used herein, including technical or scientific terms, may have the same meaning as commonly understood by one of ordinary skill in the art. Among terms used herein, terms defined in a generic dictionary may be interpreted as having the same or similar meaning as the contextual meanings of the related art and, unless explicitly defined herein, may not be interpreted as ideally or excessively formal sense. In some cases, terms, even defined herein, are not construed to exclude embodiments of the disclosure.

According to various embodiments of the disclosure, an electronic device may include at least one of a smart phone, a tablet PC, a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, or a wearable device. The wearable device may include at least one of an appcessory type device (e.g. a watch, a ring, a bracelet, an anklet, a necklace, glasses, contact lens, and head-mounted-device (HMD), a textile or clothes-integrated device (e.g., electronic clothes), a body-attached device (e.g., skin pad and tattoo), or a bio-implantable circuit.

In a certain embodiment, the electronic device may be home appliance including at least one of television (TV), a digital video disk (DVD) player, an audio player, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™, game consoles (e.g., Xbox™, PlayStation™, an electronic dictionary, an electronic key, a camcorder, or an electronic frame.

According to another embodiment, the electronic device may include at least one of a medical device (such as portable medical measuring devices (including a glucometer, a heart rate monitor, a blood pressure monitor, or a body temperature thermometer), a magnetic resonance angiography (MRA) device, a magnetic resonance imaging (MRI) device, a computed tomography (CT) device, a camcorder, or a microwave scanner), a navigation device, a global navigation satellite system (GNSS), an event data recorder (EDR), a flight data recorder (FDR), an automotive infotainment device, marine electronic equipment (such as marine navigation system or gyro compass), aviation electronics (avionics), security equipment, an automotive head unit, an industrial or household robot, a drone, an automatic teller machine (ATM), a point of sales (POS) terminal, or an Internet-of-things (IoT) device (such as electric bulb, sensor, sprinkler system, fire alarm system, temperature controller, street lamp, toaster, fitness equipment, hot water tank, heater, or boiler).

According to a certain embodiment, the electronic device may include at least one of furniture, a part of a building/structure, a part of a vehicle, an electronic board, an electronic signature receiving device, a projector, or a sensor (such as water, electricity, gas, or electric wave meters). According to various embodiments, the electronic device may be flexible or a combination of at least two of the aforementioned devices. According to a certain embodiment, the electronic device is not limited to the aforementioned devices.

Now, an electronic device according to various embodiments will be described in detail with reference to the accompanying drawings. In the disclosure, the term "user" may denote a person who uses the electronic device or a device (e.g., artificial intelligent electronic device) which uses the electronic device.

FIG. 1 is a block diagram illustrating a network environment 100 including an electronic device 101 according to various embodiments. Referring to FIG. 1, an electronic device 101, 102 or 104 or a server 106 may be connected to each other via a network 162 or short-range communication 164. The electronic device 101 may include a bus 110, a processor 120, a memory 130, an input/output interface 150, a display 160, and a communication interface 170. In an embodiment, the electronic device 101 may be configured without at least one of the aforementioned components or with another component. The bus 110 may include a circuit for interconnecting components 110 to 170 such that the components communicate signal (e.g., control message and data). The processor 120 may include at least one of a central processing device, an application processor, and a communication processor (CP). The processor 120 may execute operation related to the control of and/or communication among the other components constituting the electronic device 101 and perform data processing.

The memory 130 may include a volatile and/or non-volatile memory. The memory 130 may store a command or data associated with at least one of the components of the electronic device 101. According to an embodiment, the memory 130 may store software and/or programs 140. The programs 140 may include a kernel 141, a middleware 143, an application programming interface (API) 145, and/or an application program (or "application") 147. At least part of the kernel 141, middleware, and API 145 may be referred to as operating system. The kernel 141 may control or manage system resources (e.g., bus 110, processor 120, and memory 130) for use in executing operations or functions implemented in other programming modules (e.g., middleware 143, API 145, and application program 147). Further, the kernel 141 can provide an interface through which the middleware 143, the API 145, and/or the application 147 can access an individual element of the electronic device 101 and then control and/or manage system resources.

The middleware 143 may relay the data communicated between the API 145 or the application program 147 and the kernel 141. The middleware 143 may process at least one task request received from the application program 147 according to priority. For example, the middleware 143 may assign a priority to at least one of the application programs 147 for use of the system resources (e.g., the bus 110, the processor 120, and the memory 130) of the electronic device 101 and process the at least one task request according to the assigned priority. The API 145 may include an interface for controlling the functions provided by the kernel 141 and the middle 143 and includes at least one interface or function (e.g., command) for file control, window control, and video control, and text control, by way of example. The input/output interface 150 may relay a command or data input by a user or via an external electronic device to other component(s) of the electronic device 101 and output a command or data received from other component(s) of the electronic device 101 to the user or the external electronic device.

Examples of the display 160 may include a liquid crystal display (LCD), a light emitting diodes display (LED), an organic LED (OLED) display, a micro electro mechanical systems (MEMS) display, and an electronic paper display. The display 160 may display various contents (e.g., text, image, video, icon, and symbol) to the user by way of example. The display 160 may include a touch screen that is capable of receiving a touch, gesture, proximity, or hovering input made with an electronic pen or part of the user's body by way of example. The communication interface 170 may set up a communication channel between the electronic device 101 and an external device (e.g., first external electronic device 102, second external electronic device 104, and server 106). For example, the communication interface 170 may connect to the network 162 through a wireless or wired communication channel to communicate with the external electronic device (e.g., second external electronic device 104 and server 106).

Examples of the wireless communication may include cellular communications using at least one of LTE, LTE Advanced (LTE-A), code division multiple access (CDMA), wideband CDMA (WCDMA), universal mobile telecommunications system (UMTS), Wireless Broadband (WiBro), and global system for mobile communications (GSM). According to an embodiment, examples of the wireless communication may include communications using at least one of wireless fidelity (Wi-Fi), Bluetooth, Bluetooth low energy (BLE), Zigbee, near field communication (NFC), magnetic secure transmission, radio frequency (RF), and body area network (BAN). According to an embodiment, examples of the wireless communication may include GNSS communication. Examples of the GNSS may include a global positioning system (GPS), a global navigation satellite system (Glonass), a Beidou navigation satellite system (hereinafter, referred to as "Beidou"), and Galileo (the European global satellite-based navigation system). In the following description, the terms "GPS" and "GNSS" are interchangeably used. Examples of the wired communication may include communications using at least one of universal serial bus (USB), high definition multimedia interface (HDMI), recommended standard 233 (RS-232), power line communication, and plain old telephone service (POTS). The network 162 may be a telecommunication network including a computer network (e.g., LAN and WAN), Internet, and telephony network, by way of example.

Each of the first and second external electronic devices 102 and 104 may be identical to or different from the electronic device 101 in type. According to various embodiments, all or part of the operations being executed at the electronic device 101 may be executed at one or more other electronic devices (e.g., electronic devices 102 and 104 and server 106). According to an embodiment, if it is necessary for the electronic device 101 to execute a function or service automatically or in response to a request, the electronic device 101 may request to another device (e.g., electronic devices 102 and 104 and server 106) for executing at least part of related functions on its behalf or additionally. The other electronic device (e.g., electronic devices 102 and 104 and server 106) may execute the requested function or additional function and notify the electronic device 101 of the execution result. The electronic device 101 may provide the requested function or service with execution result in itself or after performing additional processing thereon. In order to accomplish this, it may be possible to use a cloud computing, a distributed computing, or a client-server computing technology.

Figure 2:
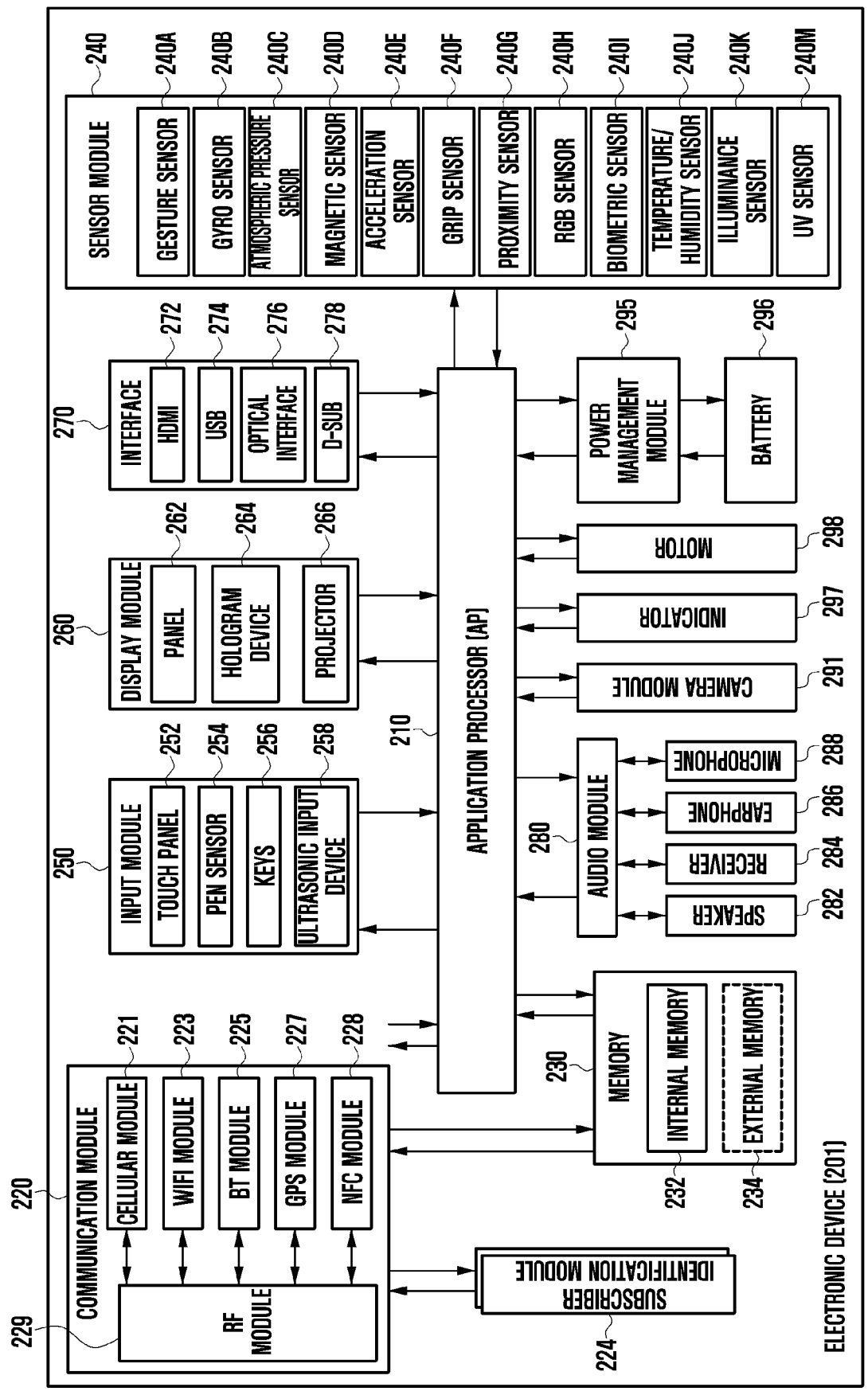
FIG. 2 is a block diagram illustrating an electronic device according to various embodiments of the disclosure.

FIG. 2 is a block diagram illustrating an electronic device 201 according to various embodiments.

The electronic device 201 may include all or part of the electronic device 101 depicted in FIG. 1. The electronic device 201 may include at least one processor (e.g., AP 210), a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298. The processor 210 may execute the operation system or application program to control a plurality of hardware or software components connected to the processor 210 and perform various data processing and operations. The processor 210 may be implemented in the form of system on chip (SoC) by way of example. According to an embodiment, the processor 210 may also include a graphic processing unit (GPU) and/or an image signal processor. The processor 210 may include at least part (e.g., cellular module 221) of the components depicted in FIG. 2). The processor 210 may load the command or data received from at least one of other components (e.g., non-volatile memory) onto the volatile memory and store processed result data in the non-volatile memory.

The communication module 220 may have a configuration identical with or similar to that of the communication interface 170 by way of example. For example, the communication module 220 may include a cellular module 221, a Wi-Fi module 223, a Bluetooth module 225, a GNSS module 227, an NFC module 228, and an RF module 229. The cellular module 221 may provide a voice call service, a video call service, a text messaging service, and an Internet access service via a communication network, by way of example. According to an embodiment, the cellular module 221 may identity and authenticate the electronic device 201 and perform identification and authentication on the electronic device 201 in the communication network by means of the subscriber identity module (SIM) 224. According to an embodiment, the cellular module 221 may perform part of the functions of the processor 210. According to an embodiment, the cellular 221 may include a communication processor (CP). According to an embodiment, part of the cellular module 221, the Wi-Fi module 223, the Bluetooth module 225, the GNSS module 227, and the NFC module 228 (e.g., two or more) may be included in an integrated chip (IC) or an IC package. The RF module 229 may transmit/receive a communication signal (e.g., RF signal). The RF module 229 may include a transceiver, a power amplification module (PAM), a frequency filter, a low noise amplifier (LNA), and an antenna by way of example. According to an alternative embodiment, at least one of the cellular module 221, the Wi-Fi module 223, the Bluetooth module 225, the GNSS module 227, and the NFC module 228 may transmit/receive an RF signal via a separate RF module. The SIM 224 may include a card containing a subscriber identity module or an embedded SIM and contain unique identity information (e.g., integrated circuit card identifier (ICCID)) or subscriber information (e.g., international mobile subscriber identity (IMSI)).

The memory 230 (e.g., memory 130) may include an internal memory 232 and an external memory 234 by way of example. The internal memory 232 may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, and flash memory, a hard drive, and a solid state drive (SSD) by way of example. The external memory 234 may include flash drive such as compact flash (CF), secure digital (SD), Micro-SD, Mini-SD, extreme digital (xD), multimedia card (MMC), and memory stick. The external electronic device 234 may be functionally or physically connected with the electronic device 201 via various interfaces.

The sensor module 240 may measure physical quantities or detects an operation state of the electronic device 201 and convert the measured or detected information to an electrical signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment, the electronic device 201 may further include another processor configured to control the sensor module 240 as part of or separated from the processor 210, and the another processor may control the sensor module 240 while the processor 210 is in a sleep state.

The input device 250 may include a touch panel 252, a (digital) pen sensor 254, a key 256, or an ultrasonic input device 258 by way of example. The touch panel 252 may use at least one of capacitive, resistive, infrared, or ultrasonic methods by way of example. The touch panel 252 may further include a control circuit. The touch panel 252 may further include a tactile layer to provide tactile response to a user. The (digital) pen sensor 254 may include a sheet for recognition as part of a touch panel or a separate sheet for recognition. The key 256 may include a physical button, an optical key, or a keypad, by way of example. The ultrasonic input device 258 may detect ultrasonic waves generated by an input tool through a microphone (e.g., the microphone 288) and ascertain data corresponding to the detected ultrasonic waves.

The display 260 (e.g., the display 160) may include a panel 262, a hologram device 264, a projector 266, and a control circuit for controlling the aforementioned components. The panel 262 may be implemented to be flexible, transparent, or wearable. The panel 262 may include a touch panel 252 and at least one module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in the air using a light interference phenomenon. The projector 266 may display an image by projecting light on a screen. The screen may be placed inside or outside the electronic device 201 by way of example. The interface 270 may include an HDMI 272, a USB 274, an optical interface 276, or a D-subminiature (D-sub) 278 by way of example. The interface 270 may be included in the communication interface 170 shown in FIG. 1 by way of example. Additionally or alternatively, the interface 270 may include a mobile high-definition link (MHL) interface, an SD card/MMC interface, or an infrared data association (IrDA) standard interface.

The audio module 280 may convert sounds into electrical signals and convert electrical signals into sounds. At least some components of the audio module 280 may be included in the input/output interface 145 shown in FIG. 1 by way of example. The audio module 280 may process sound information inputted/outputted through a speaker 282, a receiver 284, an earphone 286, or a microphone 288. The camera module 291, as a device for capturing a still image and a video image, may include at least one image sensor (e.g., a front sensor or a rear sensor), a lens, an image signal processor (ISP), or a flash (e.g., an LED or a xenon lamp). The power management module 295 may manage the power of the electronic device 201. The power management module 295 may include a power management IC (PMIC), a charger IC, or a battery or fuel gauge. The PMIC may support wired and/or wireless charging methods. Examples of the wireless charging method may include a magnetic resonance method, a magnetic induction method, and an electromagnetic method, and the PMIC may further include supplementary circuit such as a coil loop, a resonant circuit, and a rectifier. The battery gauge may measure a remaining capacity of the battery 296, charging voltage and current, and temperature of the battery by way of example. The battery 296 may include a rechargeable battery and/or a solar battery by way of example.

The indicator 297 may display a specific state of the electronic device 201 or part thereof (e.g., the processor 210), such as a booting state, a message state, or a charging state. The motor 298 may convert electrical signals into mechanical vibration and may generate vibration or haptic effect. The electronic device 201 may include a mobile TV-support device (e.g., a GPU) for processing media data generated in compliance with the standards such as digital multimedia broadcasting (DMB), digital video broadcasting (DVB), and mediaFlo™. Each of the above-mentioned components may be configured with at least one component and the name of a corresponding component may vary according to the type of an electronic device. According to various embodiments, the electronic device (e.g., electronic device 201) may be configured without part of the aforementioned components or with additional components; part of the components may be combined into one entity capable of executing the same functions of the components before being combined.

Figure 3:
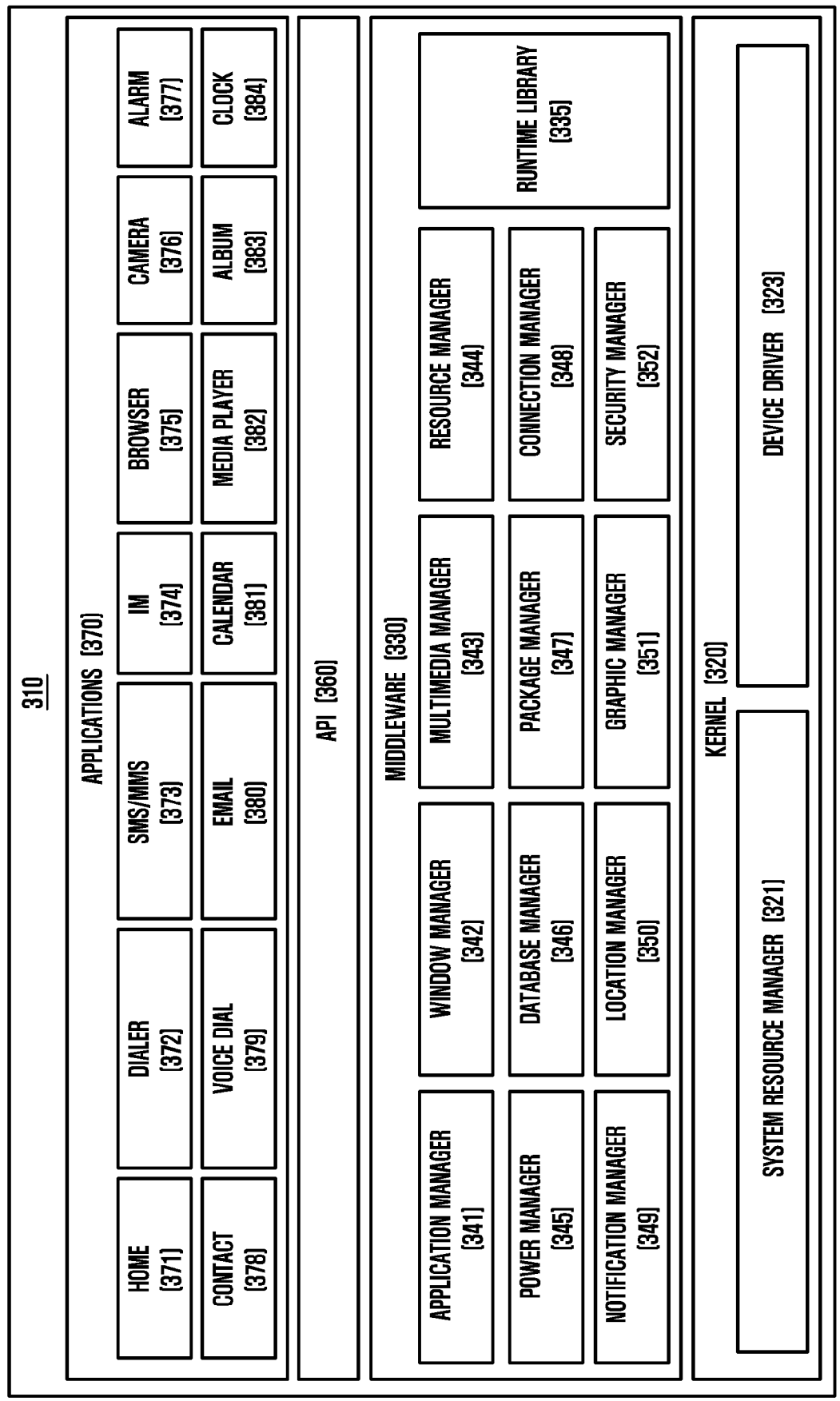
FIG. 3 is a block diagram illustrating a program module according various embodiments of the disclosure.

FIG. 3 is a block diagram illustrating a program module according various embodiments.

According to an embodiment, the program module 310 (e.g., program 140) may include an operating system for controlling the resources of the electronic device (e.g. electronic device 101) and various applications (e.g., application program 147) running on the operating system. The operating system may include Android™, iOS™, Windows™, Symbian™, Tizen™, and Bada™ for example. In reference to FIG. 3, the program module 310 may include a kennel 320 (e.g., kernel 141), a middleware 330 (e.g., middleware 143), an API 360 (e.g., API 145), and an application 370 (e.g., application 147). At least part of the program module 310 may be pre-loaded on the electronic device or downloaded from an external electronic device (e.g., electronic devices 102 and 104).

The kernel 320 may include a system resource manager 321 a device driver 323 by way of example. The system resource manager 321 may control, assign, or withdraw the system resources. According to an embodiment of the present disclosure, the system resource manager 321 may include a process manager, a memory manager, and a pile system manager. The device driver 323 may include a display driver, a camera driver, a Bluetooth driver, a common memory driver, a USB driver, a keypad driver, a Wi-Fi driver, an audio driver, and an inter-process communication (IPC) driver. The middleware 330 may provide a function for use by the applications in common and various functions for allowing the applications 370 to use the restricted system resources of the electronic device efficiently through the API 360. According to various embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module for use by a compiler to add new functions with a programming language while the applications 370 are in running. The runtime library 335 may perform input/output management, memory management, and arithmetic function processing. The application manager 341 may manage the life cycles of the applications 370 by way of example. The window manager 342 may manage the GUI resources in use for screens. The multimedia manager 343 may check the formats of media files to encode or decode the media files using the codecs proper to the corresponding formats. The resource manager 344 may manage source codes of the applications 370 and memory space. The power manager 345 may manage battery capacity and power by way of example and provide power information necessary for the operation of the electronic device. According to an embodiment, the power manager 345 may interoperate with a basic input/output system (BIOS). The database manager 346 may generate, search, and modify a database for use by the applications 370 by way of example. The package manager 347 may manage installation and update of application distributed in the form of a package file.

The connectivity manager 348 may manage a wireless connection by way of example. The notification manager 349 may provide the user with events such as incoming message alarm, appointment alarm, and proximity alarm by way of example. The location manager 350 may manage location information of the electronic device. The graphic manager 351 may manage graphical effects and user interfaces to be provided to user by way of example. The security manager 352 may responsible for system security and user authentication by way of example. According to an embodiment, the middleware 330 may include a telephony manager for managing voice and video call functions of the electronic device and a middleware module capable of combining the functions of the aforementioned components. According to an embodiment, the middleware 330 may provide operation system type-specific modules. The middleware 330 may delete part of the existing components or add new components dynamically. The API 360 may provide operating system type-specific API program functions sets by way of example. For example, it may be possible to a set of APIs per platform for the case of the android or iOS and two or more sets of APIs per platform for the case of the Tizen.

The applications 370 may include a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care (e.g., workout amount and blood sugar), environmental information provision application (e.g., atmospheric pressure, humidity, and temperature). According to an embodiment, the application 370 may include an information exchange application for supporting information exchange between the electronic device and an external electronic device. The information exchange application may include a notification relay application for relaying specific information to the external electronic device and a device management application for managing the external electronic device by way of example. The notification relay application may relay notification information generated by another application of the electronic device to the external electronic device or provide the user with the notification information received from the external electronic device. The device management application may manage the functions of the external electronic device (e.g., turn-on/off of the external electronic device in itself (or a component thereof) and brightness (or resolution) adjustment of the display) communicating with the electronic device and install, uninstall, or update the applications operating on the external electronic device by way of example. According to an embodiment, the application 370 may include an application (e.g., healthcare application of a mobile medical device) designated according to the property of the external electronic device. According to an embodiment, the applications 370 may include an application received from the external electronic device. At least part of the application module 310 may be implemented (e.g., executed) in the form of software, firmware, hardware, or a combination of at least two thereof and include a module, a program, a routine, a command set, or a process for performing at least one function.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions.

According to various embodiments, at least a part of the device (e.g., modules or functions thereof) or the method (e.g., operations) may be implemented as instructions stored in a non-transitory computer-readable storage medium (e.g., the memory 130) in a programming module form. When the instructions are executed by a processor (e.g., 120), the processor may perform a function corresponding to the instructions.

The non-transitory computer-readable recording medium may include magnetic media such as a hard disk, a floppy disk, and a magnetic tape, optical media such as a CD-ROM and a DVD, magneto-optical media such as a floptical disk, and hardware devices specially configured to store and perform a program instruction. In addition, the program instructions may include high class language codes, which can be executed in a computer by using an interpreter, as well as machine codes made by a compiler. A module or programming module according to various embodiments may include or exclude at least one of the above-discussed components or further include any other component.

According to various embodiments, the operations performed by the module, programming module, or any other component according to various embodiments may be executed sequentially, in parallel, repeatedly, or by a heuristic method.

In general, an artificial intelligence system refers to a computer system that implements a human-level intelligence, in which a machine learns and determines independently, and the recognition ratio is improved in proportion to the frequency of use. Artificial intelligence technologies include a machine learning (deep learning) technology that employs an algorithm for independently classifying/learning features of pieces of input data, and element technologies that simulate functions of human brains, such as recognition and determination, by using the machine leaning algorithm. The element technologies may include, for example, at least one of a linguistic learning technology for recognizing human languages/letters, a visual understanding technology for recognizing objects like the human visual sense, an inference/prediction technology for determining information and making logical inferences and predictions, a knowledge expression technology for processing human experience information as knowledge data, and a motion control technology for controlling autonomous driving of vehicles and movements of robots.

The linguistic understanding technology is for the purpose of recognizing human languages/letters and applying/processing the same, and includes natural language processing, machine translation, dialogue systems, questions-and-answers, speech recognition/synthesis, and the like.

The visual understanding technology is for the purpose of recognizing and processing things like the human visual sense, and includes object recognition, object tracking, image search, human recognition, scene understanding, space understanding, image improvement, and the like.

The inference/prediction technology is for the purpose of determining information and making logical inferences and predictions, and includes knowledge/probability-based inferences, optimized predictions, preference-based planning, recommendations, and the like.

The knowledge expression technology is for the purpose of automatically processing human experience information as knowledge data, and includes knowledge construction (data generation/classification), knowledge management (data utilization), and the like.

The motion control technology is for the purpose of controlling autonomous driving of vehicles and movements or robots, and includes motion control (navigation, collision, driving), manipulation control (behavior control), and the like.

Figure 4:
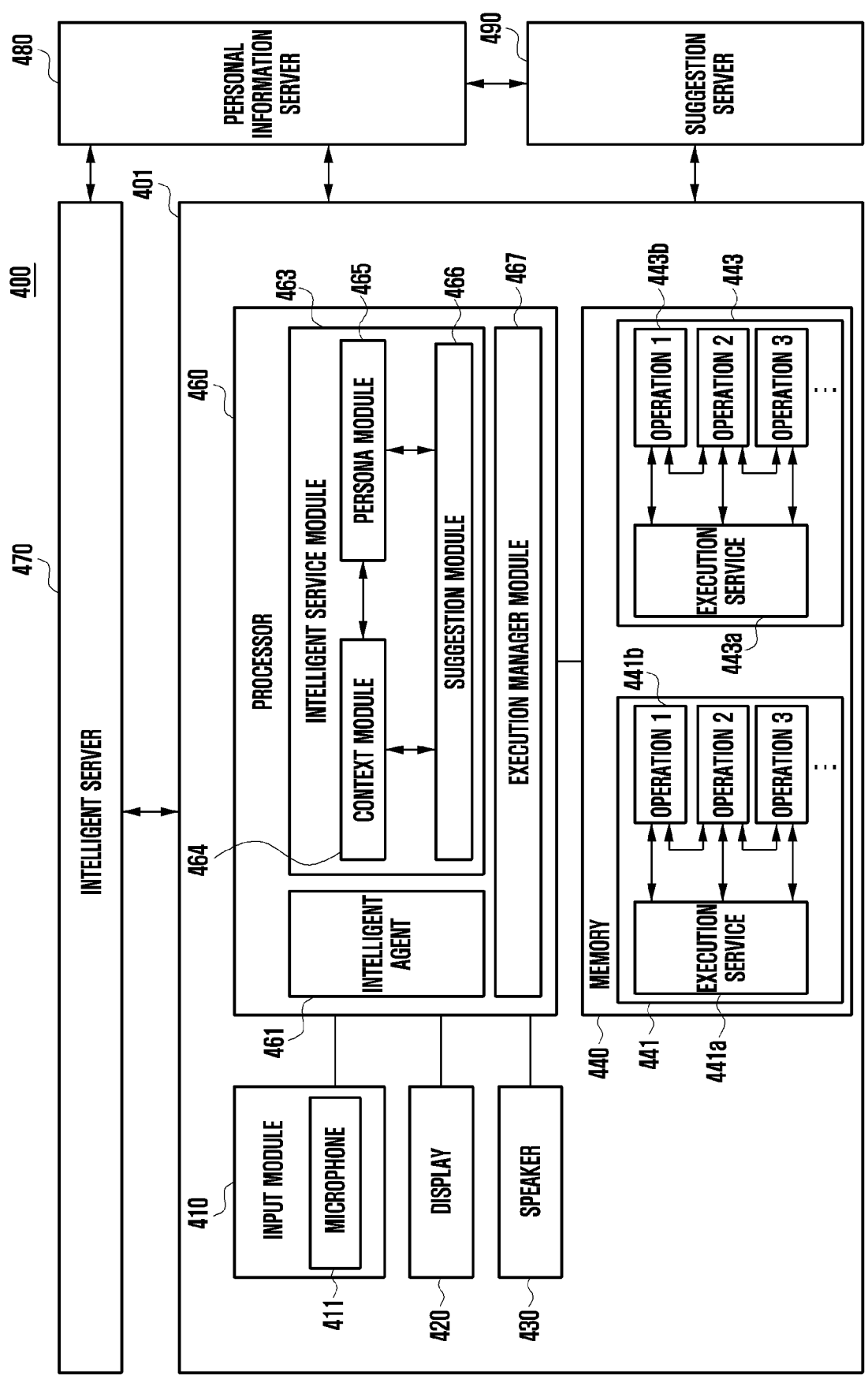
FIG. 4 is a block diagram illustrating an integrated intelligent system according to various embodiments of the disclosure.

FIG. 4 is a diagram illustrating an integrated intelligence system according to various embodiments of the disclosure.

Referring to FIG. 4, the integrated intelligence system 400 may include an electronic device 401, an intelligence server 470, a personal information server 480 and/or a suggestion server 490.

The electronic device 401 may further include a housing. The elements of the electronic device 401 may be seated in the housing or may be positioned on the housing.

The electronic device 401 may provide a user with a necessary service through an app (or an application program) (e.g., an alarm app, a message app or a photo (gallery) app) stored in the electronic device 401. For example, the electronic device 401 may execute and drive a different app through an intelligence app (or a voice recognition app) stored in the electronic device 401. The electronic device 401 may receive a user input for executing and driving the different app through the intelligence app of the electronic device 401. The user input may be received through a physical button, a touch pad, a voice input or a remote input, for example.

In accordance with an embodiment, the electronic device 401 may receive a user's speech as a user input. The electronic device 401 may receive a user's speech and generate a command for driving an app based on the user's speech. Accordingly, the electronic device 401 may drive the app using the command.

The intelligence server 470 may receive a user voice input from an electronic device 401 over a communication network, and may change the user voice input into text data. In another embodiment, the intelligence server 470 may generate (or select) a path rule based on the text data. The path rule may include information on an action (or operation) for performing the function of an app or information on a parameter necessary to execute the operation. Furthermore, the path rule may include the sequence of operations of the app. The electronic device 401 may receive the path rule, may select the app based on the path rule, and may execute the operations included in the path rule in the selected app.

For example, the electronic device 401 may execute the operation, and may display a screen corresponding to the state of the electronic device 401 that has executed the operation on the display (420). For another example, the electronic device 401 may execute the operation, and may not display the results of the execution of the operation on the display (420). For example, the electronic device 401 may execute a plurality of operations and display only the results of some of the plurality of operations on the display (420). For example, the electronic device 401 may display only the results of the execution of an operation in the last sequence on the display (420). For another example, the electronic device 401 may receive a user's input and display the results of the execution of an operation on the display (420).

The personal information server 480 may include a database in which user information is stored. For example, the personal information server 480 may receive user information (e.g., context information or app execution) from the electronic device 401 and store the user information in the database. The intelligence server 470 may receive the user information from the personal information server 480 over a communication network, and may use the received user information when it generates a path rule for a user input. In accordance with an embodiment, the electronic device 401 may receive user information from the personal information server 480 over a communication network, and may use the received user information as information for managing the database.

The suggestion server 490 may include a database in which information on the instruction of a function or application within a terminal or a function to be provided is stored. For example, the suggestion server 490 may include a database in which functions capable of being used by a user based on user information of the electronic device 401 received from the personal information server 480 are stored. The electronic device 401 may receive information on the function to be provided from the suggestion server 400 over a communication network, and may provide the information to the user.

In accordance with an embodiment, the electronic device 401 (e.g., 101 of FIG. 1, 201 of FIG. 2) may include an input module 410 (e.g., 250 of FIG. 2), a display 420 (e.g., 160 of FIG. 1, 260 of FIG. 2), a speaker 430 (e.g., 282 of FIG. 2), memory 440 (e.g., 130 of FIG. 1, 230 of FIG. 2), and/or a processor 460 (e.g., 120 of FIG. 1, 210 of FIG. 2) (e.g., including processing circuitry and/or program elements).

The input module 410 according to an embodiment may receive a user input from a user. For example, the input module 410 may receive a user input from an external device (e.g., a keyboard or a headset) connected thereto. For another example, the input module 410 may include various input circuitry, such as, for example, and without limitation, a touch screen (e.g., a touch screen display) combined with the display 420, or the like. For yet another example, the input module 410 may include input circuitry, such as, for example, and without limitation, a hardware key (e.g., 112 of FIG. 3) (or a physical key) positioned in the electronic device 401 (or the housing of the user terminal 401), or the like.

In accordance with an embodiment, the input module 410 may include a microphone 411 capable of receiving a user's speech as a voice signal. For example, the input module 410 includes a voice input system, and may receive a user's speech as a voice signal through the voice input system.

The display 420 according to an embodiment may display an execution screen of an image or video and/or an application. For example, the display 420 may display the graphic user interface (GUI) of an app.

According to various embodiments of the disclosure, when multiple applications are executed, the display 420 may display multiple user interfaces related to the multiple applications in at least one type of a multiwindow, an overlay, and a popup window.

According to various embodiments of the disclosure, when an input for performing a speech recognition function is sensed, the display 420 may display a user interface for performing the speech recognition function under the control of the processor 460.

According to various embodiments of the disclosure, if a user input for performing a task is received through the user interface for performing the speech recognition function, the display 420 may display a user input which has been adapted into text data under the control of the processor 460.

According to various embodiments of the disclosure, the display 420 may display a user interface performed on the basis of a sequence of states corresponding to a user input received from the intelligent server 470, under the control of the processor 460, on the determined window of the display 420.

In accordance with an embodiment, the speaker 430 may output a voice signal. For example, the speaker 430 may output a voice signal, generated in the electronic device 401, to the outside.

In accordance with an embodiment, the memory 440 (e.g., 130 of FIG. 1, 230 of FIG. 2) may store a plurality of application programs. The plurality of application programs stored in the memory 440 may be selected and executed in response to a user input, and may operate. The memory 440 may store a plurality of user interfaces corresponding to the plurality of application programs.

In accordance with an embodiment, the memory 440 may store a plurality of applications (e.g., apps) 441 and 443. The plurality of apps 441 and 443 stored in the memory 440 may be selected and executed in response to a user input, and may operate.

In accordance with an embodiment, the memory 440 may include a database (not shown) capable of storing information necessary to recognize a user input. For example, the memory 440 may include a log database capable of storing log information. For another example, the memory 440 may include a persona database capable of storing user information.

In accordance with an embodiment, the memory 440 may store the plurality of apps 441 and 443. The plurality of apps 441 and 443 may be loaded and operate. For example, the plurality of apps 441 and 443 stored in the memory 440 may be loaded by the execution manager module (e.g., including various processing circuitry and/or program elements) 467 of the processor 460, and may operate. The plurality of apps 441 and 443 may include execution services 441*a* and 443*a* or a plurality of operations (or unit operations) 441*b* and 443*b* that perform functions. The execution services 441*a* and 443*a* may be generated by the execution manager module 467 of the processor 460, and may execute the plurality of operations 441*b* and 443*b*.

In accordance with an embodiment, when the operations 441*b* and 443*b* of the apps 441 and 443 are executed, an execution state screen according to the execution of the operations 441*b* and 443*b* may be displayed on the display 420. The execution state screen may be a screen of the state in which the operations 441*b* and 443*b* have been completed, for example. For another example, the execution state screen may be a screen in which the execution of the operations 441*b* and 443*b* has been subjected to partial landing (e.g., if a parameter necessary for the operations 441*b* and 443*b* has not been received).

The execution services 441*a* and 443*a* according to an embodiment may include various processing circuitry and/or program elements and execute the operations 441*b* and 443*b* according to a path rule. For example, the execution services 441*a* and 443*a* may be executed by the execution manager module 467, may receive a execution request according to a path rule from the execution manager module 467, and may execute the operations 441*b* and 443*b* of the apps 441 and 443 in response to the execution request. When the execution of the operations 441*b* and 443*b* is completed, the execution services 441*a* and 443*a* may transmit completion information to the execution manager module 467.

In accordance with an embodiment, when the plurality of operations 441*b* and 443*b* is executed in the apps 441 and 443, they may be sequentially executed. When the execution of one operation (operation 1) is completed, the execution services 441*a* and 443*a* may open a next operation (operation 2) and transmit the completion information to the execution manager module 467. In this case, opening a given operation may be understood that the given operation shifts to an executable state or the execution of the given operation is prepared. In other words, when a given operation is not open, the corresponding operation cannot be executed. When the completion information is received, the execution manager module 467 may transmit an execution request for next operations 441*b* and 443*b* to an execution service (e.g., operation 2). In accordance with an embodiment, when the plurality of apps 441 and 443 is executed, they may be sequentially executed. For example, when the execution of the last operation of the first app 441 is completed and completion information is received, the execution manager module 467 may transmit an execution request for the first operation of the second app 443 to the execution service 443a.

In accordance with an embodiment, if the plurality of operations 441b and 443b has been executed in the apps 441 and 443, result screens based on the execution of the plurality of operations 441b and 443b may be displayed on the display 420. In accordance with an embodiment, only some of a plurality of result screens according to the execution of the plurality of operations 441b and 443b may be displayed on the display 420.

In accordance with an embodiment, the memory 440 may store an intelligence app (e.g., a voice recognition app) operating in conjunction with the intelligence agent (e.g., including various processing circuitry and/or program elements) 461. The app operating in conjunction with the intelligence agent 461 may receive a user's speech as a voice signal and process the voice signal. In accordance with an embodiment, the app operating in conjunction with the intelligence agent 461 may be driven in response to a specific input (e.g., an input through a hardware key, an input through a touch screen or a specific voice input) received through the input module 410.

In accordance with an embodiment, the processor 460 may include various processing circuitry and/or program elements and control an overall operation of the electronic device 401. For example, the processor 460 may control the input module 410 to receive a user input. The processor 460 may control the display 420 to display an image. The processor 460 may control the speaker 430 to output a voice signal. The processor 460 may control the memory 440 to fetch or store required information.

In accordance with an embodiment, the processor 460 may include an intelligence agent (e.g., including various processing circuitry and/or program elements) 461, an intelligence service module (e.g., including various processing circuitry and/or program elements) 463, and/or the execution manager module (e.g., including various processing circuitry and/or program elements) 467. In an example embodiment, the processor 460 may drive the intelligence agent 461, the intelligence service module 463, or the execution manager module 467 by executing instructions stored in the memory 140. Several modules described in various embodiments of the present disclosure may be implemented using hardware or software. In various embodiments of the present disclosure, an operation executed by the intelligence agent 461, the intelligence service module 463, or the execution manager module 467 may be construed as being an operation executed by the processor 460.

According to various embodiments of the disclosure, the processor 460 may display a user interface in response to application execution on the display 420. For example, when multiple applications are executed, the processor 460 may display multiple user interfaces related to the multiple applications in at least one type of a multiwindow, an overlay, and a popup window on the display 420.

According to various embodiments of the disclosure, the processor 460 may receive a user input for performing a task. For example, the user input may be an input for performing a task by using a specific application through the speech recognition function.

The intelligence agent 461 according to an embodiment may generate a command for driving an app based on a voice signal received as a user input. For example, the user input may include a user input for performing a task by using an application (a single application or a plurality of applications) displayed on the display 420, a user input for performing a task by using an application different from the application displayed on the display 420.

The execution manager module 467 according to an embodiment may receive the generated command from the intelligence agent 461, may select the apps 441 and 443 stored in the memory 440, and may execute and drive the selected apps. In accordance with an embodiment, the intelligence service module 463 may manage a user's information and use it to process a user input.

The intelligence agent 461 may transmit a user input, received through the input module 410, to the intelligence server 470 so that the user input is processed.

In accordance with an embodiment, the intelligence agent 461 may pre-process a user input before it transmits the user input to the intelligence server 470. In accordance with an embodiment, the intelligence agent 461 may include an adaptive echo canceller (AEC) module, a noise suppression (NS) module, an end-point detection (EPD) module or an automatic gain control (AGC) module in order to pre-process the user input. The AEC module may remove echo included in the user input. The NS module may suppress background noise included in the user input. The EPD module may find a portion including a user voice by detecting the end of the user voice included in the user input. The AGC module may adjust the volume of a user input so that the user input is suitable for being recognized and processed. In accordance with an embodiment, the intelligence agent 461 may include all of the pre-processing elements for performance. In another embodiment, the intelligence agent 461 may include some of the pre-processing elements in order to operate with low energy.

In accordance with an embodiment, the intelligence agent 461 may include a wakeup recognition module configured to recognize a user's calling. The wakeup recognition module may recognize a user's wakeup command through the voice recognition module. When the wakeup command is received, the wakeup recognition module may activate the intelligence agent 461 so as to receive a user input. In accordance with an embodiment, the wakeup recognition module of the intelligence agent 461 may be implemented in a low energy processor (e.g., a processor included in an audio codec). In accordance with an embodiment, the intelligence agent 461 may be activated in response to a user input through a hardware key. When the intelligence agent 461 is activated, an intelligence app (e.g., a voice recognition app) operating in conjunction with the intelligence agent 461 may be executed.

In accordance with an embodiment, the intelligence agent 461 may include a voice recognition module for executing a user input. The voice recognition module may recognize a user input for enabling an operation to be executed in an app. For example, the voice recognition module may recognize a limited user (or voice) input (e.g., speech, such as "click" that executes a photographing operation when a camera app is executed) that executes an operation, such as a wakeup command in the apps 441 and 443. The voice recognition module configured to recognize a user input by assisting the intelligence server 470 may recognize a user command that may be processed in the electronic device 401, for example, and may rapidly process the user command. In accordance with an embodiment, the voice recognition module for executing the user input of the intelligence agent 461 may be implemented in the app processor.

In accordance with an embodiment, the voice recognition module (including the voice recognition module of the wakeup module) of the intelligence agent 461 may recognize a user input using an algorithm for recognizing a voice. The algorithm used to recognize the voice may, for example, and without limitation, be any one of a hidden Markov model (HMM) algorithm, an artificial neural network (ANN) algorithm and/or a dynamic time warping (DTW) algorithm, or the like.

In accordance with an embodiment, the intelligence agent 461 may convert a user's voice input into text data. In accordance with an embodiment, the intelligence agent 461 may transfer a user's voice to the intelligence server 470 and receive converted text data. Accordingly, the intelligence agent 461 may display the text data on the display 420.

In accordance with an embodiment, the intelligence agent 461 may receive a path rule transmitted by the intelligence server 470. In accordance with an embodiment, the intelligence agent 461 may transmit the path rule to the execution manager module 467.

In accordance with an embodiment, the intelligence agent 461 may transmit an execution result log according to a path rule, received from the intelligence server 470, to the intelligence service module 463. The transmitted execution result log may be accumulated and managed in the user's preference information of a persona module (or persona manager) 465.

According to various embodiments of the disclosure, the processor 460 may receive information including a sequence of states for performing a task from the intelligent server 470. The processor 460 may determine a window of the display 420 to display a user interface related to the task performed on the basis of the received sequence of states.

According to various embodiments of the disclosure, the processor 460 may determine a window to display a user interface related to the task performed on the basis of the sequence of states by using window context information. For example, the window context information may include a currently executed application, information regarding whether a window displaying a user interface related to the currently executed application is active nor not, and information regarding whether or not the user interface related to the currently executed application has input characteristics. The processor 460 may display the user interface related to the performed task in the determined window.

The execution manager module 467 according to an embodiment may receive a path rule from the intelligence agent 461, may execute the apps 441 and 443, so the apps 441 and 443 execute the operations 441b and 443b included in the path rule. For example, the execution manager module 467 may transmit command information for executing the operations 441b and 443b to the apps 441 and 443, and may receive completion information of the operations 441b and 443b from the apps 441 and 443.

In accordance with an embodiment, the execution manager module 467 may transmit/receive command information for executing the operations 441b and 443b of the apps 441 and 443 between the intelligence agent 461 and the apps 441 and 443. The execution manager module 467 may bind the apps 441 and 443 to be executed according to the path rule, and may transmit the command information of the operations 441b and 443b included in the path rule to the apps 441 and 443. For example, the execution manager module 467 may sequentially transmit the operations 441b and 443b included in the path rule to the apps 441 and 443, so the operations 441b and 443b of the apps 441 and 443 are sequentially executed according to the path rule.

In accordance with an embodiment, the execution manager module 467 may manage the execution state of the operations 441b and 443b of the apps 441 and 443. For example, the execution manager module 467 may receive information on the execution state of the operations 441b and 443b from the apps 441 and 443. If the execution state of the operations 441b and 443b is partial landing, for example (e.g., if a parameter necessary for the operations 441b and 443b has not been received), the execution manager module 467 may transmit information on the partial landing to the intelligence agent 461. The intelligence agent 461 may request the input of required information (e.g., parameter information) from a user using the received information. If the execution state of the operations 441b and 443b is an operating state, for another example, the intelligence agent 461 may receive a speech from a user. The execution manager module 467 may transmit information on the executed apps 441 and 443 and the execution state of the apps 441 and 443 to the intelligence agent 461. The intelligence agent 461 may receive parameter information of the user's speech through the intelligence server 470, and may transmit the received parameter information to the execution manager module 467. The execution manager module 467 may change the parameter of the operations 441b and 443b into a new parameter using the received parameter information.

In accordance with an embodiment, the execution manager module 467 may transfer parameter information, included in a path rule, to the apps 441 and 443. When the plurality of apps 441 and 443 is sequentially executed according to the path rule, the execution manager module 467 may transfer the parameter information included in the path rule from one app to the other app.

In accordance with an embodiment, the execution manager module 467 may receive a plurality of path rules. The execution manager module 467 may select a plurality of path rules based on a user's speech. For example, if a user's speech has specified some app 441 that will execute some operation 441a, but has not specified other apps 443 that will execute the remaining operations 443b, the execution manager module 467 may receive a plurality of different path rules on which the same app 441 (e.g., a gallery app) that will execute some operation 441a is executed and other apps 443 (e.g., a message app and a Telegram app) that will execute the remaining operations 443b are separately executed. For example, the execution manager module 467 may execute the same operations 441b and 443b (e.g., the contiguous and identical operations 441b and 443b) of the plurality of path rules. If up to the same operation has been executed, the execution manager module 467 may display a state screen in which different apps 441 and 443 included in the plurality of path rules may be selected on the display 420.

In accordance with an embodiment, the intelligence service module 463 may include the context module 464, the persona module 465, or a suggestion module 466.

The context module 464 may include various processing circuitry and/or program elements and collect the current states of the apps 441 and 443 from the apps 441 and 443. For example, the context module 464 may collect the current states of the apps 441 and 443 by receiving context information indicative of the current states of the apps 441 and 443.

The persona module 465 may include various processing circuitry and/or program elements and manage personal information of a user who uses the electronic device 401. For example, the persona module 465 may collect use information and the results of the execution of the electronic device 401 and manage the personal information of the user.

The suggestion module 466 may include various processing circuitry and/or program elements and predict a user's intent and recommend the intent to the user. For example, the suggestion module 466 may recommend a command to the user by taking into consideration the current state (e.g., time, a place, a situation or an app) of the user.

According to various embodiments of the disclosure, the intelligent server 470 may generate a sequence of states for performing a task corresponding to a user input received from the processor 460 of the electronic device 401, and may transmit the generated sequence of states to the electronic device 401.

According to various embodiments of the disclosure, the states may include at least one action (or operation) for performing the function of at least one application.

The above-mentioned intelligent server 470 will be described in detail with reference to FIG. 5A.

Figure 5A:
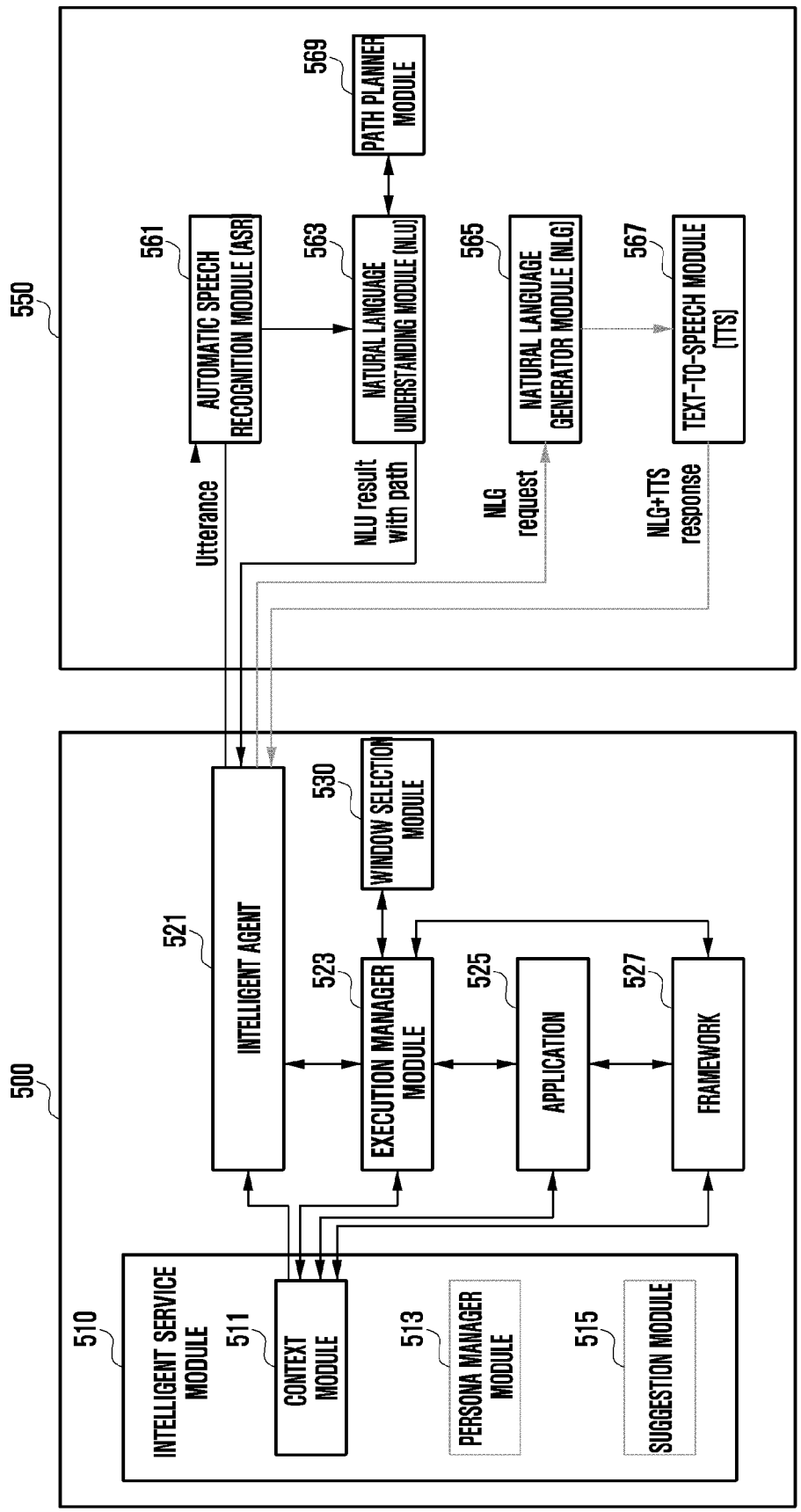
FIG. 5A is a block diagram illustrating an integrated intelligent system according to various embodiments of the disclosure.

FIG. 5A is a block diagram illustrating an integrated intelligent system according to various embodiments of the disclosure.

Referring to FIG. 5A, the processor (for example, the processor 460 in FIG. 4) of the electronic device 500 (for example, the electronic device 401 in FIG. 4) may include an intelligent service module 510 (for example, the intelligent service module 463 in FIG. 4), an intelligent agent 521 (for example, the intelligent agent 461 in FIG. 4), an execution manager module 523 (for example, the execution manager module 467 in FIG. 4), an application 525, a framework 527, or a window selection module 530.

According to various embodiments of the disclosure, the intelligent agent 521 may receive a user input, for example, a user utterance, and may transmit the same to the intelligent server 550 (for example, the intelligent server 470 in FIG. 4).

According to various embodiments of the disclosure, the intelligent service module 510 may include a context module 511, a persona manager module 513, or a suggestion module 515.

According to various embodiments of the disclosure, if a context request is received from the intelligent agent 521, the context module 511 may request the application 525 (for example, the first application 441 or the second application 443 in FIG. 4) to provide context information indicating the current state of the application 525 (for example, 441 or 443). According to various embodiments of the disclosure, the context module 511 may receive the context information from the application 525 (for example, 441 or 443) and may transmit the same to the intelligent agent 521.

According to various embodiments of the disclosure, the context module 511 may receive multiple pieces of context information through the application 525 (for example, 441 or 443). For example, the context information may be information regarding the most recently executed application (for example, 441 or 443). As another example, the context information may be information regarding the current state inside the application 525 (for example, 441 or 443) (for example, when viewing a photo inside a gallery, information regarding the corresponding photo).

According to an embodiment, the context module 511 may receive context information indicating the current state of the electronic device 500 not only from the application 525 (for example, 441 or 443) but also from the device platform. The context information may include normal context information, user context information, or device context information.

The normal context information may include normal information regarding the electronic device 500. The normal context information may be confirmed through an internal algorithm after receiving data through a sensor hub or the like of the device platform. For example, the context information may include information regarding the current spacetime. The information regarding the current spacetime may include, for example, information regarding the current time or the current location of the electronic device 500. The current time may be confirmed with reference to the time on the electronic device 500, and the information regarding the current location may be confirmed through the global positioning system (GPS). As another example, the normal context information may include information regarding physical motion. The information regarding physical motion may include, for example, information regarding walking, running, ongoing driving, and the like. The physical motion information may be confirmed through a motion sensor. In connection with the information regarding ongoing driving, not only can driving be confirmed through the motion sensor, but getting in and parking can also be confirmed by sensing Bluetooth connection inside the vehicle. As another example, the normal context information may include user activity information. The user activity information may include, for example, information regarding going to/returning from work, shopping, traveling, and the like. The user activity information may be confirmed by using information regarding a place registered in a database by the user or the application.

The user context information may include information regarding the user. For example, the user context information may include information regarding the emotional state of the user. The information regarding the emotional state may include, for example, information regarding the user's happiness, sadness, anger, and the like. As another example, the user context information may include information regarding the current state of the user. The information regarding the current state may include information regarding interests, intents and the like (for example, shopping).

The device context information may include information regarding the state of the electronic device 500. For example, the device context information may include information regarding a path rule executed by the execution manager module 523. As another example, the information regarding the state of the electronic device 500 may include information regarding the battery. The information regarding the battery may be confirmed, for example, through the charging and discharging state of the battery. As another example, the information regarding the state of the electronic device 500 may include information regarding a connected device and a network. The information regarding a connected device may be confirmed, for example, through a communication interface to which the device is connected.

According to various embodiments of the disclosure, the context module 511 may further acquire window context information regarding a window currently displayed on the display (for example, the display 420 in FIG. 4) from the framework 527 of the electronic device 500.

According to various embodiments of the disclosure, the window context information may include information regarding the number of windows displayed on the display, information regarding an active window, information regarding an application displayed in the window, information regarding the state of the application, and information regarding the input state of windows (for example, whether or not an input is made using the keypad).

According to various embodiments of the disclosure, the window context information may be used to determine a window to perform an operation corresponding to a user input, for example, an utterance, received from the intelligent agent 521, the execution manager module 523, or the natural language understanding (NLU) module 563 and the path planner module 569 inside the intelligent server 550.

According to various embodiments of the disclosure, the persona manager module 513 and the suggestion module 515 are identical to the persona module 465 and the suggestion module 466 in FIG. 4, and detailed descriptions thereof will be omitted herein.

According to various embodiments of the disclosure, the window selection module 530 may compare information regarding a domain (application) to perform a task and information regarding an active window, among the window context information, on the basis of a path rule received from the intelligent server 550. Through the comparing operation, the window selection module 530 may determine a window to perform a task corresponding to a user input (for example, an utterance).

According to various embodiments of the disclosure, the intelligent server 550 may include an automatic speech recognition (ASR) module 561, a natural language understanding (NLU) module 563, a natural language generator (NLG) module 565, a text-to-speech (TTS) module 567, or a path planner module 569.

According to various embodiments of the disclosure, the automatic speech recognition module 561 may adapt a user input (for example, an utterance) received from the electronic device 500 into text data. The automatic speech recognition module 561 may transfer the text data to the natural language understanding module 563.

According to various embodiments of the disclosure, the natural language understanding module 563 may perform syntactic analysis and sematic analysis so as to identify the user intent with regard to the user input. The natural language understanding module 563 may analyze the user input so as to acquire the domain to which the user input belongs, the intent, and the slot (for example, parameter) necessary to express the intent. For example, the natural language understanding module 563 may identify the user's intent by matching the domain, the intent, and the slot with respective cases by using a matching rule included in a rule-based algorithm.

The natural language understanding module 563 will be described in detail with reference to FIG. 5B.

According to various embodiments of the disclosure, the path planner module 569 may generate (or select) a path rule by using the user's intent identified by the natural language understanding module 563. The path rule may include multiple operations regarding one application, or may include multiple operations regarding multiple applications. The path rule may include an execution order following the intent of a user input.

According to various embodiments of the disclosure, the natural language generator module 565 may change designated information into a text type. The text type may be a natural language utterance type. For example, the designated information may include information for an additional input, information that guides operation completion, and the like. The information changed into a text type may be transmitted to the electronic device 500 and displayed on the display, or may be transmitted to the text-to-speech module 567 and changed into a speech type.

According to various embodiments of the disclosure, the text-to-speech module 567 may change text-type information into speech-type information. The text-to-speech module 567 may receive text-type information from the natural language generator module 565, may change the text-type information to speech-type information, and may transmit the same to the electronic device 500. The electronic device 500 may output the speech-type information to a speaker (for example, the speaker 430 in FIG. 4).

Figure 5B:
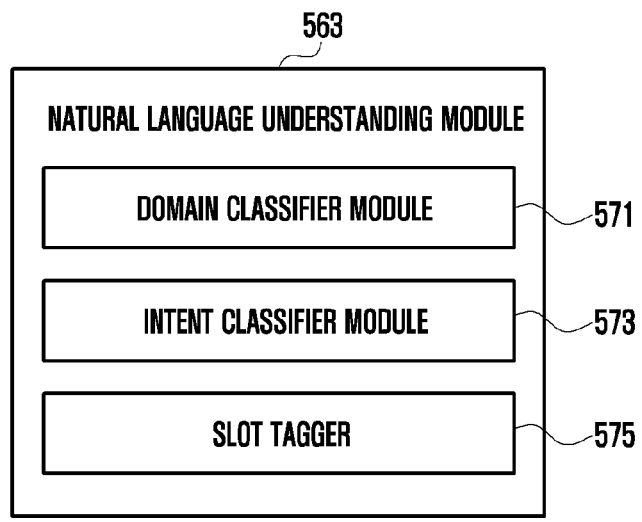
FIG. 5B is a block diagram illustrating a natural language understanding module according to various embodiments of the disclosure.

FIG. 5B is a block diagram illustrating a natural language understanding module according to various embodiments of the disclosure.

Referring to FIG. 5B, the natural language understanding module (for example, the natural language understanding module in FIG. 5A) may include a domain classifier module 571, an intent classifier module 573, and a slot tagger 575 (for example, a parameter).

According to various embodiments of the disclosure, the natural language understanding module 563 may identify the user's intent by using a matching rule which is divided into a domain, an intent, and a slot. The natural language understanding module 563 may identify the meaning of a word extracted from a user input by using a linguistic feature (for example, a syntactic element) such as a morpheme or a phrase, and may match the identified meaning of the word with a rule, thereby identifying the user's intent. For example, the natural language understanding module 563 may identify the user's intent by calculating how many words extracted from a user input are included, by using information regarding rules included in respective domains and intents.

According to various embodiments of the disclosure, if a user utterance is received, the automatic speech recognition module (for example, the automatic speech recognition module 561 in FIG. 5A) may recognize the user utterance. The domain classifier module 571 of the natural language understanding module 563 may determine which application (or application category) will be used to perform a task corresponding to the recognized utterance. The intent classifier module 573 may identify the intent of the utterance, and the slot tagger 575 may perform a tagging operation regarding which portion of the path rule uses each parameter (for example, slot). The above operations may occur simultaneously, and may be processed as a single action.

According to various embodiments of the disclosure, the natural language understanding module 563 may learn the user's utterance on the basis of rule-based natural language understanding or deep natural language understanding. For example, if an utterance "Find photos from Hawaii" is received from the user, the natural language understanding module 563 may perform a tagging operation like "domain: gallery, intent: photo finding (gallery_rule2), slot: Hawaii photos (location@searchviewresult)". The natural language understanding module 563 may search for a related path rule in the path rule database, may add "Hawaii" to a location parameter corresponding to "searchviewresult", and may transmit the corresponding path rule to the electronic device 500.

According to various embodiments of the disclosure, if deep natural language understanding is used, the natural language understanding module 563 may process a change in the utterance by forming a concept through learning. Accordingly, when deep natural language understanding is used, processing may be possible even if there is no rule to which the content of the user's utterance is accurately mapped.

According to various embodiments of the disclosure, if rule-based natural language understanding is used, the natural language understanding module 563 may input utterances corresponding to respective rules, may determine whether or not the user utterance matches with the corresponding utterances, thereby determining the intent, and may acquire a path rule conforming to the corresponding intent. The natural language understanding module 563 may perform an operation of matching the user utterance until the same accurately matches with stored utterance patterns.

According to various embodiments of the disclosure, the user utterance (input) is highly likely to be associated with applications that are being executed by the electronic device 500. On the basis thereof, the natural language understanding module 563 may perform an operation of matching from an utterance pattern related to the domain displayed on the display on the basis of window context information received from the electronic device 500.

According to various embodiments of the disclosure, the window context information may include priority information regarding applications. For example, the natural language understanding module 563 may assign the highest priority to an application displayed in the active window of the display. The natural language understanding module 563 may assign priority to an application displayed in a window executed by the speech recognition function. The natural language understanding module 563 may assign priority to an application displayed in the most recently executed window. When it is determined that the corresponding utterance matches with multiple utterance patterns, the natural language understanding module 563 may assign priority to an utterance pattern belonging to a domain displayed in windows of the display.

According to various embodiments of the disclosure, if deep natural language understanding is used, and if it is determined that an uttered sentence is associated with multiple intents, the natural language understanding module 563 may conduct a control such that the same is interpreted as an utterance pattern belonging to a domain displayed in windows of the display.

Figure 6:
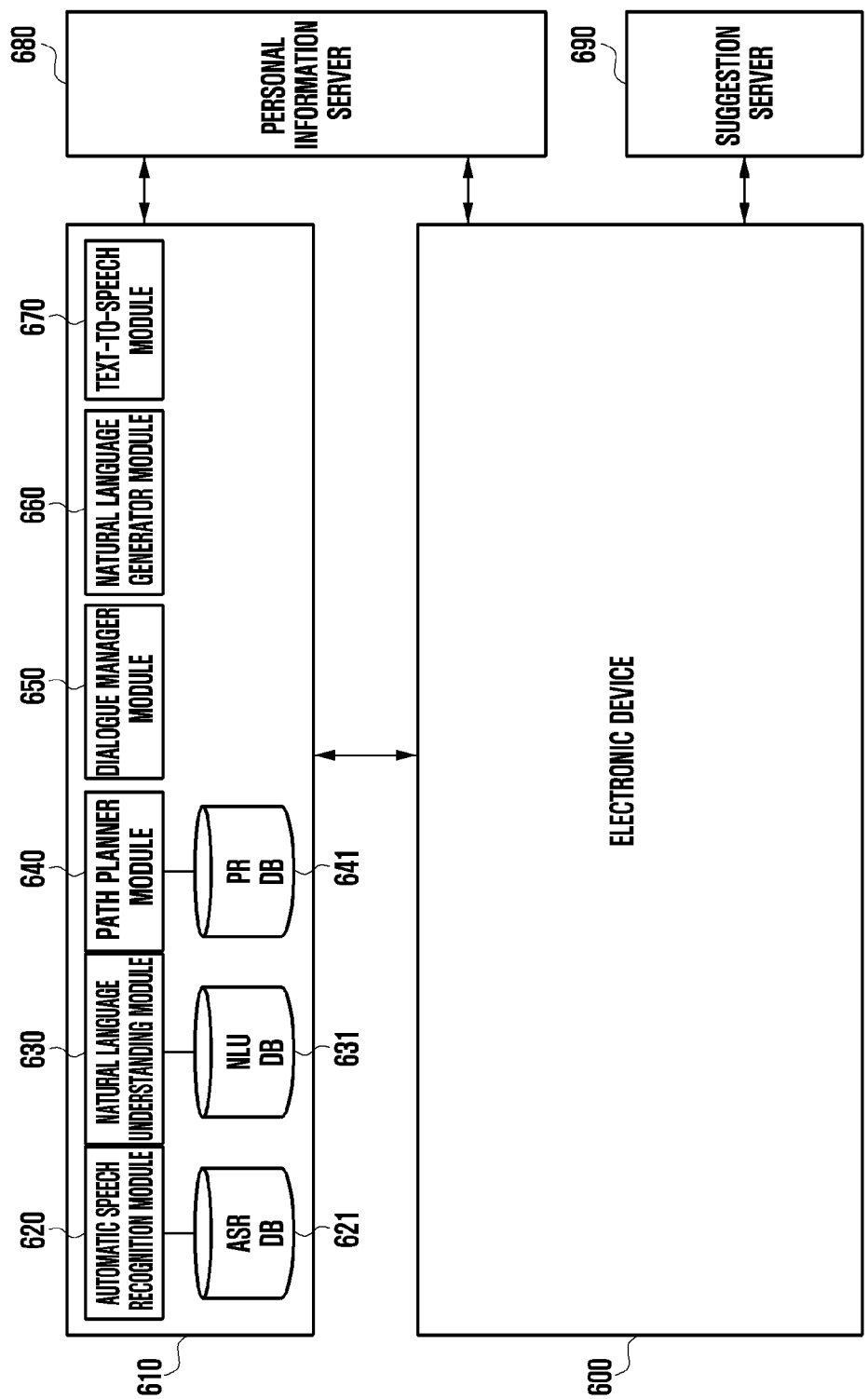
FIG. 6 is a block diagram illustrating an intelligent server of an integrated intelligent system according to an embodiment of the disclosure.

FIG. 6 is a block diagram illustrating the intelligence server of the integrated intelligence system according to an embodiment of the disclosure.

Referring to FIG. 6, an intelligence server 610 (e.g., 550 of FIG. 5A) may include an automatic speech recognition (ASR) module (e.g., including various processing circuitry and/or program elements) 620 (e.g., 561 of FIG. 5A), a natural language understanding (NLU) module (e.g., including various processing circuitry and/or program elements) 630 (e.g., 563 of FIG. 5A), a path planner module (e.g., including various processing circuitry and/or program elements) 640 (e.g., 569 of FIG. 5A), a dialogue manager (DM) module (e.g., including various processing circuitry and/or program elements) 650, a natural language generator (NLG) module (e.g., including various processing circuitry and/or program elements) 660 (e.g., 565 of FIG. 5A), or a text-to-speech (TTS) module (e.g., including various processing circuitry and/or program elements) 670 (e.g., 567 of FIG. 5A).

The NLU module 630 or path planner module 640 of the intelligence server 610 may include various processing circuitry and/or program elements and generate a path rule.

In accordance with an embodiment, the ASR module 620 may include various processing circuitry and/or program elements and convert a user input, received from the electronic device 600 (e.g., 500 of FIG. 5A), into text data.

In accordance with an embodiment, the automatic speech recognition module 620 may include various processing circuitry and/or program elements and convert a user input, received from the electronic device 600, into text data. For example, the automatic speech recognition module 620 may include a speech recognition module. The speech recognition module may include an acoustic model and a language model. For example, the acoustic model may include information on vocalization. The language model may include unit phoneme information and information on a combination of unit phoneme information. The speech recognition module may convert a user speech into text data using information related to vocalization and information on unit phoneme information. Information on the acoustic model and the language model may be stored in an automatic speech recognition database (ASR DB) 621, for example.

In accordance with an embodiment, the NLU module 630 may include various processing circuitry and/or program elements and identify user intent by performing syntactic analysis or semantic analysis. In the syntactic analysis, a user input may be divided into syntactic units (e.g., a word, a phrase or a morpheme), and what the divided unit has which syntactic element may be identified. The semantic analysis may be performed using semantic matching, rule matching, formula matching and so on. Accordingly, the NLU module 630 may obtain a domain, intent or a parameter (or slot) necessary to express the intent from the user input.

In accordance with an embodiment, the NLU module 630 may identify a user's intent and a parameter using a matching rule divided into a domain, intent and a parameter (or slot) necessary to identify the intent. For example, one domain (e.g., alarm) may include a plurality of intents (e.g., alarm setting or alarm release), and one intent may include a plurality of parameters (e.g., time, a repetition number or a alarm sound). A plurality of rules may include one or more essential element parameters, for example. The matching rule may be stored in a natural language understanding database (NLU DB) 631.

In accordance with an embodiment, the NLU module 630 may identify the meaning of a word obtained from a user input using linguistic characteristics (e.g., a syntactic element), such as a morpheme and a phrase, and may identify the user's intent by matching the identified meaning of the word with a domain and intent. For example, the NLU module 630 may identify the user's intent by calculating how many words obtained from the user input are included in each domain and intent. In accordance with an embodiment, the NLU module 630 may identify the parameter of the user input using a word, that is, a basis for identifying the intent. In accordance with an embodiment, the NLU module 630 may identify the user's intent using the NLU DB 631 in which linguistic characteristics for identifying the intent of the user input have been stored. In accordance with another embodiment, the NLU module 630 may identify the user's intent using a personal language model (PLM). For example, the NLU module 630 may identify the user's intent using personal information (e.g., a contact information list or a music list). The personal language model may be stored in the NLU DB 631, for example. In accordance with an embodiment, in addition to the NLU module 630, the automatic speech recognition module 620 may recognize a user's voice with reference to the personal language model stored in the NLU DB 631.

In accordance with an embodiment, the NLU module 630 may generate a path rule based on the intent of a user input and a parameter. For example, the NLU module 630 may select an app to be executed based on the intent of a user input, and may identify an operation to be executed in the selected app. The NLU module 630 may identify a parameter corresponding to the identified operation and generate a path rule. In accordance with an embodiment, the path rule generated by the NLU module 630 may include information on an app to be executed, an operation to be executed in the app, and a parameter necessary to execute the operation.

In accordance with an embodiment, the NLU module 630 may generate one path rule or a plurality of path rules based on the intent of a user input and a parameter. For example, the NLU module 630 may receive a path rule set corresponding to the electronic device 600 from the path planner module 640, and may identify a path rule by mapping the intent of a user input and a parameter to the received path rule set.

In accordance with another embodiment, the NLU module 630 may identify an app to be executed, an operation to be executed in the app, and a parameter necessary to execute the operation based on the intent of a user input and a parameter, and may generate one path rule or a plurality of path rules. For example, the NLU module 630 may generate a path rule by arranging the app to be executed and the operation to be executed in the app in an ontology or graph model form based on the intent of the user input using information of the electronic device 600. The generated path rule may be stored in a path rule database (PR DB) 641 through the path planner module 640, for example. The generated path rule may be added to a path rule set of the database 641.

In accordance with an embodiment, the NLU module 630 may select at least one of a plurality of generated path rules. For example, the NLU module 630 may select an optimum one of the plurality of path rules. For another example, the NLU module 630 may select a plurality of path rules if only some operations are given based on a user speech. The NLU module 630 may identify one of the plurality of path rules based on a user's additional input.

In accordance with an embodiment, the NLU module 630 may transmit a path rule to the electronic device 600 in response to a request for a user input. For example, the NLU module 630 may transmit one path rule corresponding to a user input to the electronic device 600. For another example, the NLU module 630 may transmit a plurality of path rules corresponding to a user input to the electronic device 600. The plurality of path rules may be generated by the NLU module 630 if only some operations are given based on a user speech, for example.

In accordance with an embodiment, the path planner module 640 may include various processing circuitry and/or program elements and select at least one of a plurality of path rules.

In accordance with an embodiment, the path planner module 640 may transmit a path rule set, including a plurality of path rules, to the NLU module 630. The plurality of path rules of the path rule set may be stored in a table form in the PR DB 641 connected to the path planner module 640. For example, the path planner module 640 may transmit a path rule set, corresponding to information (e.g., OS information or app information) of the electronic device 600 received from the intelligence agent, to the NLU module 630. The table stored in the PR DB 641 may be stored for each domain or each version of a domain, for example.

In accordance with an embodiment, the path planner module 640 may select one path rule or a plurality of path rules in a path rule set and transmit the selected path rule or path rules to the NLU module 630. For example, the path planner module 640 may select one path rule or a plurality of path rules by matching a user's intent and a parameter to a path rule set corresponding to the electronic device 600, and may transmit the path rule or path rules to the NLU module 630.

In accordance with an embodiment, the path planner module 640 may generate one path rule or a plurality of path rules using a user's intent and a parameter. For example, the path planner module 640 may identify an app to be executed and an operation to be executed in the app a user's intent and a parameter, and may generate one path rule or a plurality of path rules. In accordance with an embodiment, the path planner module 640 may store the generated path rule in the PR DB 641.

In accordance with an embodiment, the path planner module 640 may store a path rule, generated in the NLU module 630, in the PR DB 641. The generated path rule may be added to a path rule set stored in the PR DB 641.

In accordance with an embodiment, a table stored in the PR DB 641 may include a plurality of path rules or a plurality of path rule sets. The plurality of path rules or the plurality of path rule sets may incorporate the kind, version, type or characteristics of a device that performs each path rule.

In accordance with an embodiment, the DM module 650 may include various processing circuitry and/or program elements and determine whether a user's intent identified by the NLU module 630 is clear. For example, the DM module 650 may determine whether a user's intent is clear based on whether information of a parameter is sufficient. The DM module 650 may determine whether a parameter identified by the NLU module 630 is sufficient to perform a task. In accordance with an embodiment, if a user's intent is not clear, the DM module 650 may perform feedback that requests necessary information from the user. For example, the DM module 650 may perform feedback that requests information on a parameter for determining a user's intent.

In accordance with an embodiment, the DM module 650 may include a content provider module. If an operation can be performed based on an intent and parameter identified by the NLU module 630, the content provider module may generate the results of the execution of a task corresponding to a user input. In accordance with an embodiment, the DM module 650 may transmit results generated by the content provider module to the electronic device 600 as a response to a user input.

In accordance with an embodiment, the NLG module 660 may include various processing circuitry and/or program elements and change selected information in a text form. The information changed in a text form may be a form of a natural language speech. The selected information may be information on an additional input, information that provides guidance of the completion of an operation corresponding to a user input, or information (e.g., feedback information on a user input) that provides guidance of a user's additional input, for example. The information changed in a text form may be transmitted to the electronic device 600 and displayed on the display (e.g., 420 of FIG. 4) or may be transmitted to the text-to-speech module 670 and changed in a speech form.

In accordance with an embodiment, the text-to-speech module 670 may include various processing circuitry and/or program elements and change information of a text form into information of a speech form. The text-to-speech module 670 may receive information of a text form from the NLG module 660, may change the information of a text form into information of a speech form, and may transmit the information of a speech form to the electronic device 600. The electronic device 600 may output the information of a speech form to the speaker (e.g., 430 of FIG. 4).

In accordance with an embodiment, the NLU module 630, the path planner module 640 and the DM module 650 may be implemented as a single module. For example, the NLU module 630, the path planner module 640 and the DM module 650 may be implemented as a single module. The single module may identify a user's intent and a parameter and generate a response (e.g., a path rule) corresponding to the identified user's intent and parameter. Accordingly, the generated response may be transmitted to the electronic device 600.

Figure 7:
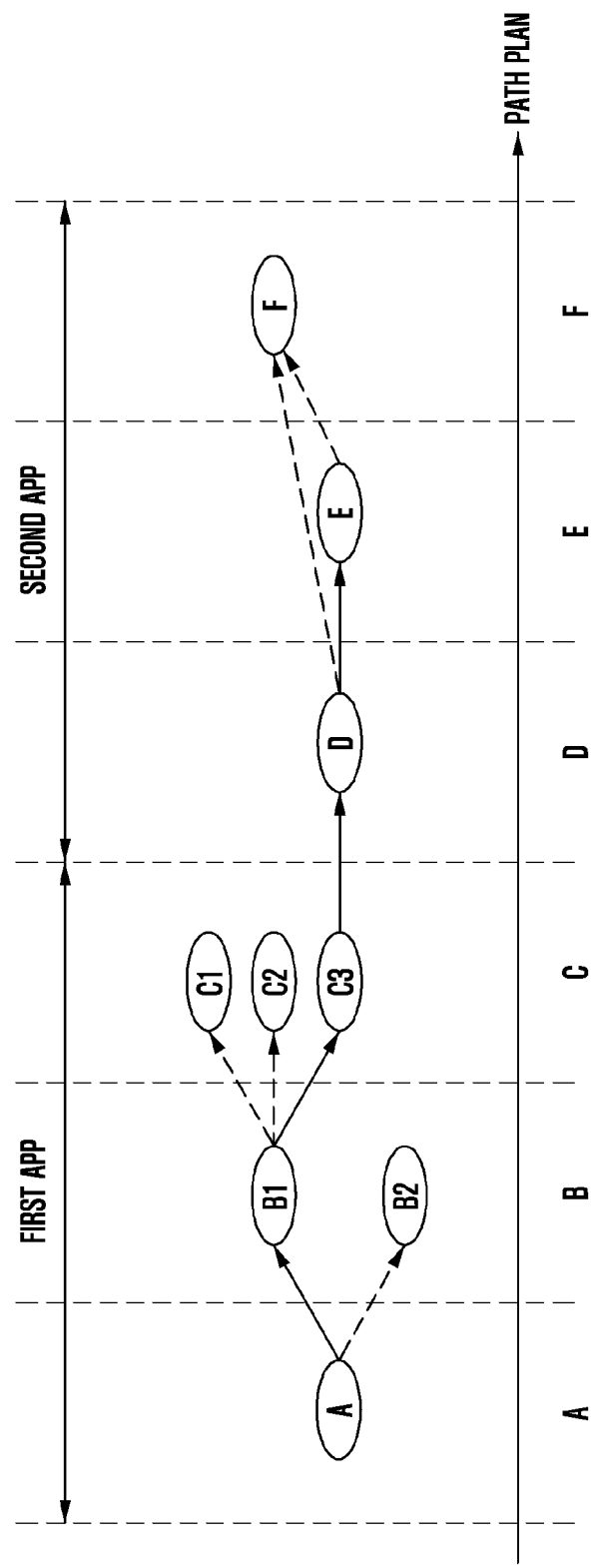
FIG. 7 is a diagram illustrating a method for generating a path rule by a path planner module according to an embodiment of the disclosure.

FIG. 7 is a diagram illustrating a method for generating a path rule by a path planner module according to an embodiment of the disclosure.

Referring to FIG. 7, in one embodiment, the natural language understanding module (e.g., 630 of FIG. 6) may divide the function of an application into one or more actions (e.g., state A to state F) and store the same in the path rule database (e.g., 641 of FIG. 6). For example, the natural language understanding module may store in the path rule database 231 a path rule set including plural path rules (A-B1-C1, A-B1-C2, A-B1-C3-D-F, A-B1-C3-D-E-F) divided into one or more actions (e.g., states).

In one embodiment, the path rule database of the path planner module (e.g., 640 of FIG. 6) may store a set of path rules for performing the function of an application. The path rule set may include multiple path rules each including a plurality of actions (e.g., a sequence of states). In the path rule, a plurality of actions to be performed according to corresponding input parameters may be arranged in sequence. The plural path rules may be represented in the form of an ontology model or a graph model and stored in the path rule database.

In one embodiment, the natural language understanding module can select the optimal path rule (A-B1-C3-D-F) among the plural path rules (A-B1-C1, A-B1-C2, A-B1-C3-D-F, A-B1-C3-D-E-F) corresponding to the intention and parameters of the user input.

In one embodiment, if there is no path rule perfectly matching the user input, the natural language understanding module may transmit plural path rules to the electronic device (e.g., 600 of FIG. 6). For example, the natural language understanding module may select a path rule (e.g., A-B1) partially matching the user input. The natural language understanding module may select one or more path rules (e.g., A-B1-C1, A-B1-C2, A-B1-C3-D-F, A-B1-C3-D-E-F) containing the path rule (e.g., A-B1) partially matching the user input and transmit the selected path rules to the electronic device.

In one embodiment, the natural language understanding module may select one of plural path rules based on an additional input from the electronic device and transmit the selected path rule to the electronic device. For example, the natural language understanding module may select one path rule (e.g., A-B1-C3-D-F) among the plural path rules (e.g., A-B1-C1, A-B1-C2, A-B1-C3-D-F, A-B1-C3-D-E-F) according to an additional user input (e.g., input for selecting C3) from the electronic device, and transmit the selected path rule to the electronic device.

In another embodiment, the natural language understanding module may determine a user's intention and parameters corresponding to an additional user input (e.g., input for selecting C3) from the electronic device, and transmit the determined user intention and parameters to the electronic device. The electronic device 100 may select one path rule (e.g., A-B1-C3-D-F) among the plural path rules (e.g., A-B1-C1, A-B1-C2, A-B1-C3-D-F, A-B1-C3-D-E-F) according to the received user intention and parameters.

Consequently, the electronic device can complete the operation of the application (e.g., 441 or 443 of FIG. 4) by using the selected path rule.

In one embodiment, when the intelligent server (e.g., 610 of FIG. 6) receives a user input that lacks information, the natural language understanding module may generate a path rule partially matching the user input. For example, the natural language understanding module may send the partially-matched path rule to the intelligent agent (e.g., 521 of FIG. 5A). The intelligent agent may send the partially-matched path rule to the execution manager module (e.g., 523 of FIG. 5A). The execution manager module may execute the first application 441 according to the path rule. While running the first application 441, the execution manager module may transmit information about the missing parameters to the intelligent agent. The intelligent agent may request the user for additional input based on the information on the missing parameters. When an additional input is received from the user, the intelligent agent may send the additional user input to the intelligent server for processing. The natural language understanding module may generate an additional path rule based on the user intention and parameters of the additional user input and transmit the generated path rule to the intelligent agent. The intelligent agent may execute the second application 443 by sending the path rule to the execution manager module.

In one embodiment, if a user input lacking some information is received by the intelligent server, the natural language understanding module may send a request for user information to the personalization information server (e.g., 680 of FIG. 6). The personalization information server may transmit the user information stored in the persona database to the natural language understanding module. The natural language understanding module can use this user information to select a path rule corresponding to the incomplete user input. Hence, although a user input lacking some information is received by the intelligent server, the natural language understanding module may determine the path rule corresponding to the user input by obtaining further information as a response to an additional input request or using the stored user information.

Figure 8A:
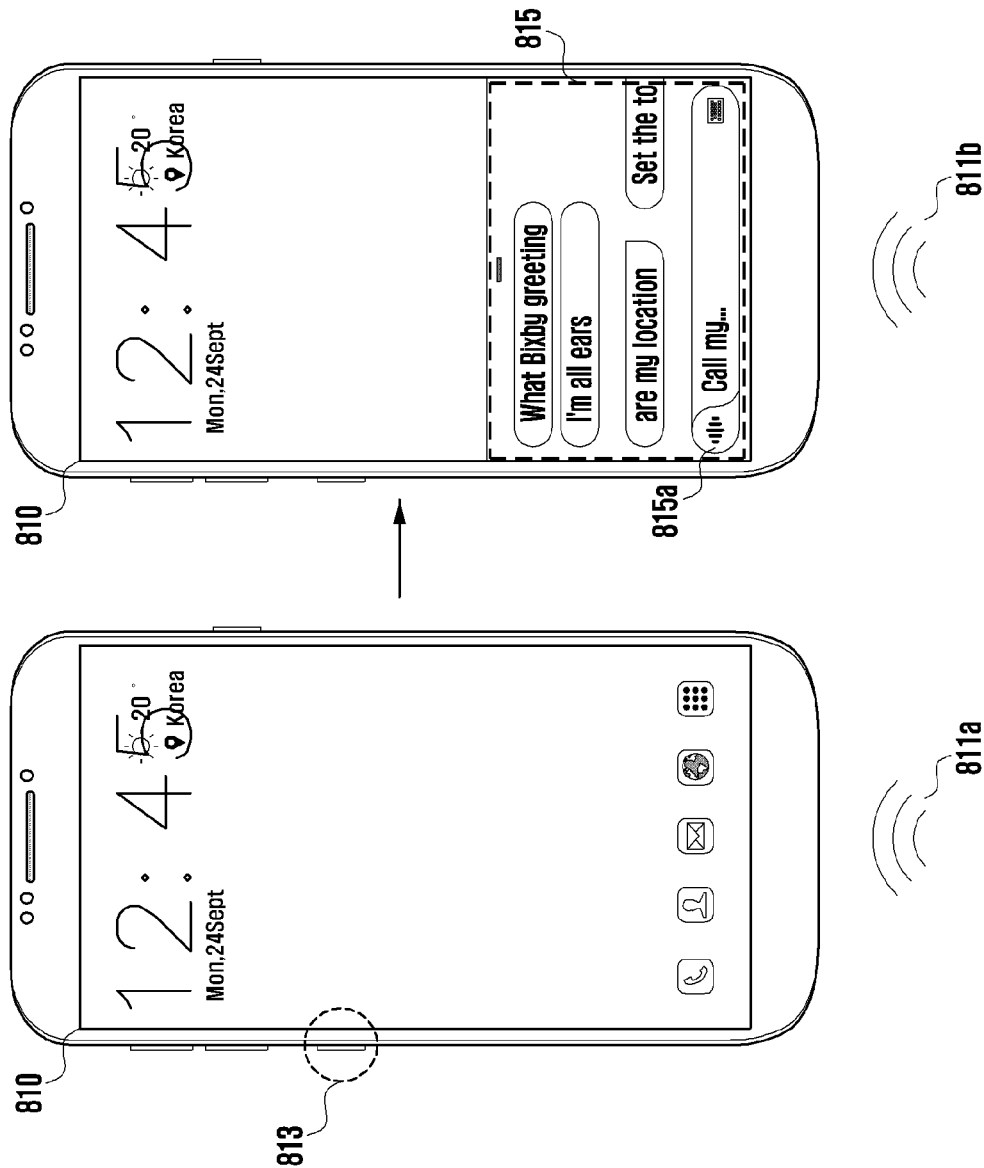
FIG. 8A is a diagram illustrating execution of an intelligent application by an electronic device according to an embodiment of the disclosure.

FIG. 8A is a diagram illustrating execution of an intelligent application by an electronic device according to an embodiment of the disclosure.

In one embodiment, FIG. 8A illustrate a situation where the electronic device (e.g., 600 of FIG. 6) receives a user input and executes an intelligent application (e.g., speech recognition application) associated with the intelligent agent (e.g., 521 of FIG. 5A).

In one embodiment, the electronic device may invoke an intelligent application for speech recognition through a hardware key 813 (or a physical key). For example, upon receiving a user input via the hardware key 813, the electronic device may display the user interface (UI) 815 of the intelligent application on the display (e.g., 420 of FIG. 4). For example, the user can touch a voice recognition button 815a of the UI 815 of the intelligent application to input a voice signal 811b while the UI 815 of the intelligent application is output on the display. As another example, the user can continuously press the hardware key 813 to input a voice signal 811b.

In one embodiment, the electronic device may invoke an intelligent application for speech recognition through the microphone (e.g., 411 of FIG. 4). For example, the electronic device may display the UI 815 of the intelligent application on the display when a designated voice signal 811a (e.g., "wake up!") is input via the microphone.

Figure 8B:
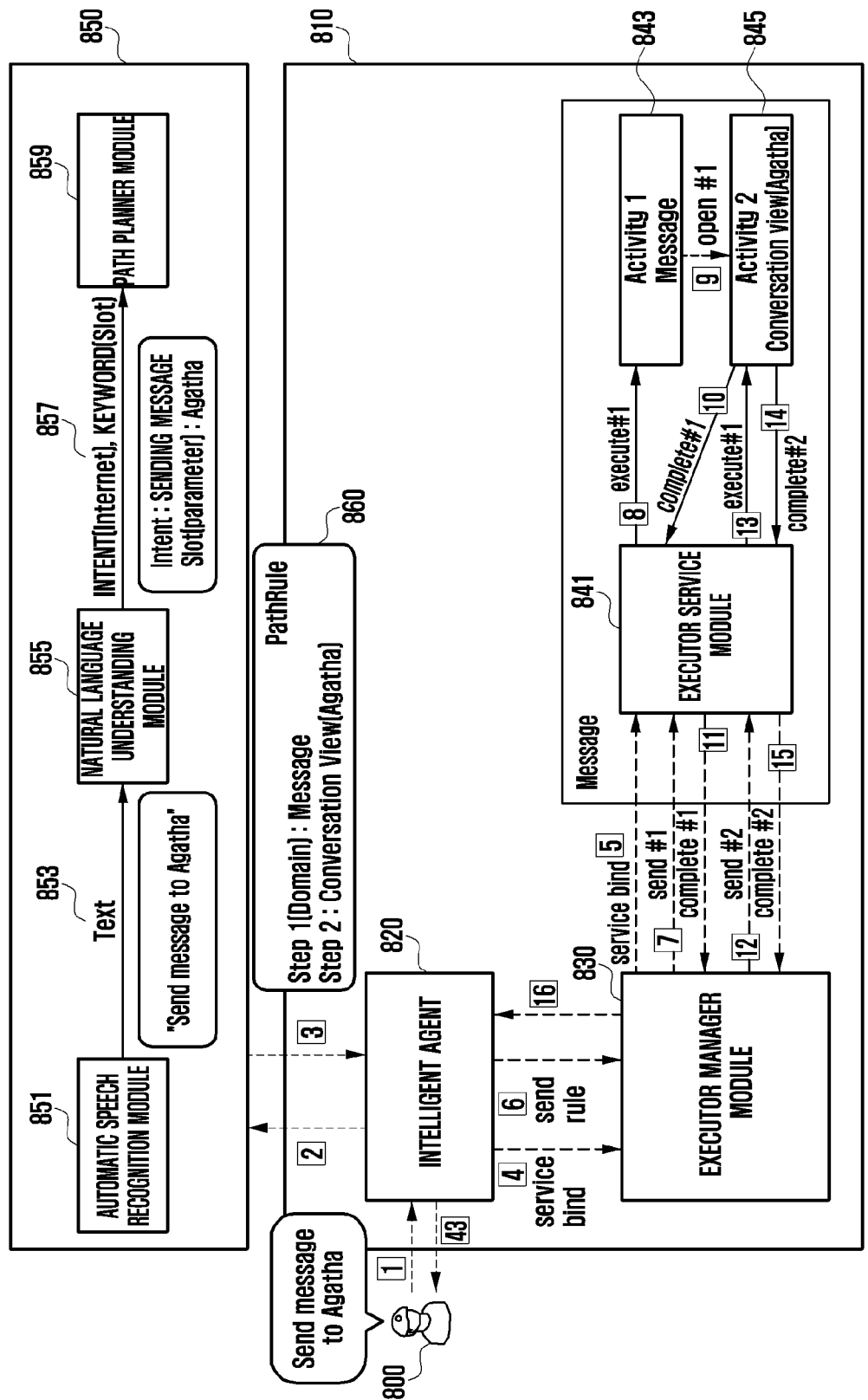
FIG. 8B is a block diagram illustrating an integrated intelligent system according to various embodiments of the disclosure.

FIG. 8B is a block diagram illustrating an integrated intelligent system according to various embodiments of the disclosure.

Referring to FIG. 8B, the intelligent agent 820 (for example, the intelligent agent 521 in FIG. 5A) of the electronic device 810 (for example, the electronic device 600 in FIG. 6) may receive (1) a user input "Send message to Agatha" from the user 800. The intelligent agent 820 may transmit (2) the user input "Send message to Agatha" to the intelligent server 850 (for example, the intelligent server 550 in FIG. 5A). According to various embodiments of the disclosure, the automatic speech recognition module 851 (for example, the automatic speech recognition module 620 in FIG. 6) of the intelligent server 850 may adapt (853) a user input (for example, an utterance) received from the electronic device 810 into text data. The automatic speech recognition module 851 may transfer the adapted text data "Send message to Agatha" to the natural language understanding module 855 (for example, the natural language understanding module 630 in FIG. 6). The natural language understanding module 855 may generate (857), from the received text data "Send message to Agatha", domain information "message", intent "send message", and parameter (for example, slot) "Agatha", and may transmit the same to the path planner module 859 (for example, the path planner module 640 in FIG. 6).

According to various embodiments of the disclosure, the path planner module 859 may generate a path rule 860 "state1: message-state2: conversation view(parameter: Agatha)" on the basis of the pieces of information received from the natural language understanding module 855, and may transmit (3) the same to the intelligent agent 820.

According to various embodiments of the disclosure, a path rule refers to a task which is to be performed by using an application, and which is defined as a state-based set. For example, the above states may include a movement to a specific screen, and each state may include a parameter.

According to various embodiments of the disclosure, while the user input is being processed by the intelligent server 850, the electronic device 810 may display the fact that the same is being processed on the display (for example, the display 420 in FIG. 4). In addition, the electronic device 810 may receive a user input, which has been recognized in a text type, from the intelligent agent 820, and may display the same on the display.

According to various embodiments of the disclosure, the intelligent agent 820 of the electronic device 810 may transfer (6) a path rule received from the intelligent server 850 to the executor manager module 830.

According to various embodiments of the disclosure, the executor manager module 830 may transmit a state-requesting signal to the executor service module 841 on the basis of two states (first state and second state) corresponding to the path rule of the user input "Send message to Agatha". When there are multiple states, the executor manager module 830 may transit the state-requesting signal after completing one state. In other words, the executor manager module 830 may conduct a control such that the two states (first state 843 and second state 845) corresponding to the path rule are executed successively according to the user input.

For example, if a signal that requests the first state 843 is received (7), the executor service module 841 may execute (8) the first state 843. When the first state 843 is completed, the executor service module 841 may open (9) the second state 845 and may transmit (11) completion information (10) regarding the first state (843) to the executor manager module 830. If the completion information is received, the executor manager module 830 may transmit (12) a signal that requests the second state 845 to the executor service module 841. If the signal that requests the second state 845 is received, the executor service module 841 may execute (13) the second state 845. If completion information regarding the second state 845 is received from the executor service module 841 after the second sate 845 is completed (14), the executor manager module 830 may transmit (16) path rule completion information to the intelligent server 850.

According to various embodiments of the disclosure, the intelligent server 850 may inform the user of the ending through the natural language generator module (not illustrated) (for example, the natural language generator module 660 in FIG. 6) and the text-to-speech module (not illustrated) (for example, the text-to-speech module 670 in FIG. 6) of the intelligent server 850.

Figure 9:
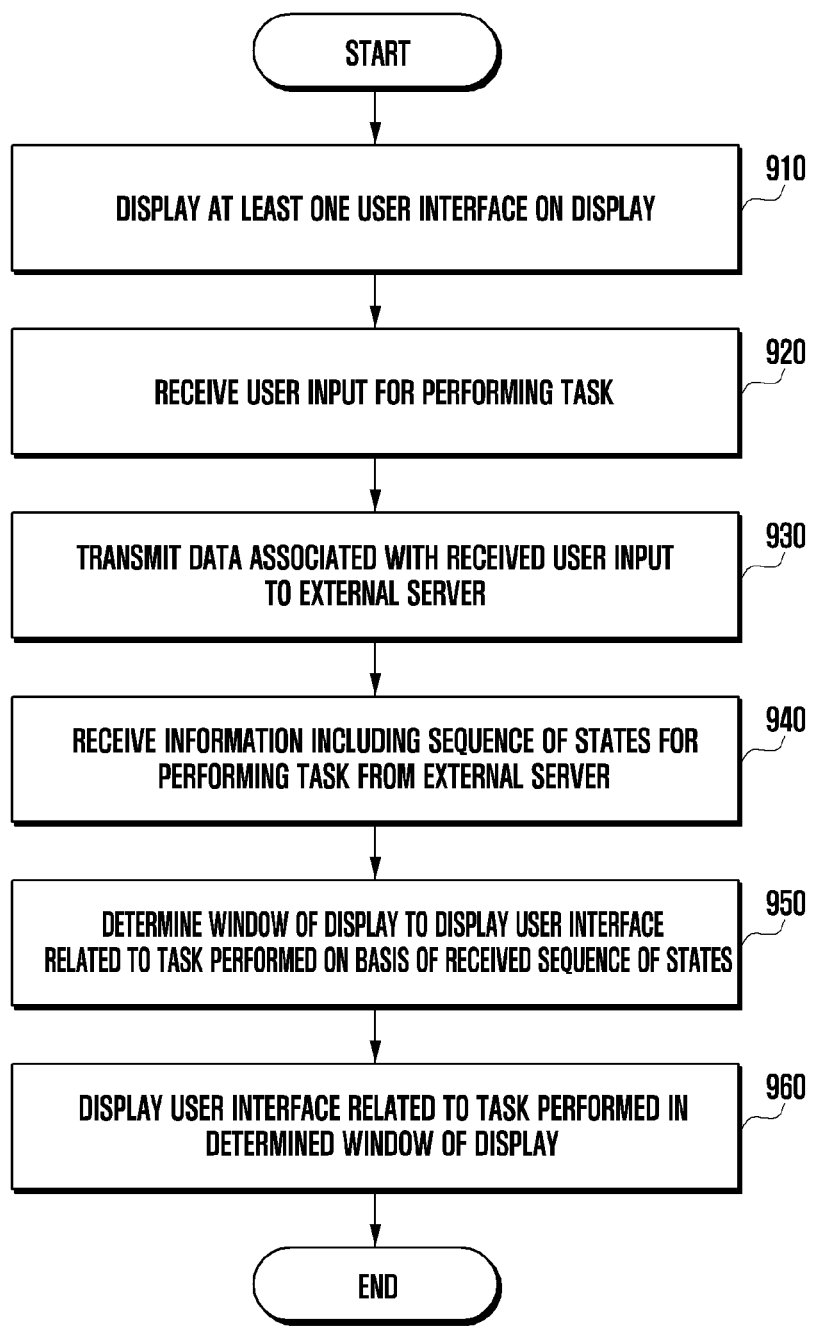
FIG. 9 is a flowchart illustrating a method for controlling a screen according to a user input according to various embodiments of the disclosure.

FIG. 9 is a flowchart illustrating a method for controlling a screen according to a user input according to various embodiments of the disclosure.

Referring to FIG. 9, the electronic device (for example, the processor 460 in FIG. 4) may display at least one user interface on the display (for example, the display 420 in FIG. 4) in operation 910. For example, the electronic device (for example, the processor 460 in FIG. 4) may display a user interface following application execution. When multiple applications are executed, the electronic device (for example, the processor 460 in FIG. 4) may display multiple user interfaces regarding the multiple applications on the display. For example, the electronic device (for example, the processor 460 in FIG. 4) may display the multiple user interfaces on the screen in at least one type of a multiwindow, an overlay, and a popup window on the display.

According to various embodiments of the disclosure, the electronic device (for example, the intelligent agent 820 in FIG. 8B) may receive a user input for performing a task in operation 920. For example, the user input may be an input for performing a task by using a specific application through the speech recognition function.

According to various embodiments of the disclosure, if a signal generated by pressing a hardware key (for example, the hardware key 813 in FIG. 8A) (or a physical key) separately provided on the electronic device for performing the speech recognition function is sensed, the electronic device (for example, the processor 460 in FIG. 4) may display a user interface for performing the speech recognition function. The method for performing the speech recognition function is not limited thereto, and the electronic device (for example, the processor 460 in FIG. 4) may display a user interface for performing the speech recognition function if a designated speech (for example, "Wake up") is input through the microphone (for example, the microphone 411 in FIG. 4), or if a signal generated by selecting an icon for executing the speech recognition function, displayed on the display, is sensed. It will be assumed in the following description that a signal generated by pressing a hardware key separately provided on the electronic device is the input for performing the speech recognition function.

According to various embodiments of the disclosure, the electronic device (for example, the intelligent agent 820 in FIG. 8B) may receive a user input, for example, an utterance, through the microphone (for example, the microphone 411 in FIG. 4) on the basis of the user interface for performing the speech recognition function.

According to various embodiments of the disclosure, the electronic device (for example, the intelligent agent 820 in FIG. 8B) may receive a user input for performing a task by using an application (a single application or multiple applications) displayed on the display, or may receive a user input for performing a task by using an application different from the application displayed on the display.

According to various embodiments of the disclosure, the electronic device (for example, the intelligent agent 820 in FIG. 8B) may transmit external data associated with the received user input to an external server (for example, the automatic speech recognition module 851 of the intelligent server 850 in FIG. 8B) in operation 930.

According to various embodiments of the disclosure, the electronic device (for example, the intelligent agent 820 in FIG. 8B) may transmit window context information on the current display, together with the data associated with the user input, to a server (for example, the automatic speech recognition module 851 of the intelligent server 850 in FIG. 8B). For example, the window context information may include the currently executed application, information regarding whether the window that displays a user interface related to the currently executed application is active or not, and information regarding whether or not the user interface related to the currently displayed application has input characteristics.

According to various embodiments of the disclosure, the electronic device (for example, the intelligent agent 820 in FIG. 8B) may receive information regarding a sequence of states for performing a task from the external server (for example, the natural language understanding module 855 of the intelligent server 850 in FIG. 8B) in operation 940. For example, the sequence of states for performing a task may denote a path rule generated by the path planner module of the intelligent server (for example, the path planner module 859 of the intelligent server 850 in FIG. 8B). In other words, the sequence of states may include the order of operations for performing the function of an application corresponding to the user input.

According to various embodiments of the disclosure, the states may include at least one operation for performing the function of at least one application.

According to various embodiments of the disclosure, the electronic device (for example, the window selection module 530 in FIG. 5A) may determine a window of the display to display a user interface related to the task performed on the basis of the received sequence of states in operation 950.

According to various embodiments of the disclosure, the electronic device (for example, the window selection module 530 in FIG. 5A) may determine a window of the display to display a user interface related to the task performed on the basis of the received sequence of states by using window context information.

According to various embodiments of the disclosure, when an application associated with the application matching with the sequence of states is displayed on the display, the electronic device (for example, the executor manager module 830 in FIG. 8B) may perform the sequence of states in a region of the display in which the associated application is displayed.

According to various embodiments of the disclosure, when the application to be landed finally (for example, when there are multiple applications to be performed on the basis of the sequence of states, the application executed finally) is displayed, the electronic device (for example, the executor manager module 830 in FIG. 8B) may perform the sequence of states in the corresponding region of the display.

According to various embodiments of the disclosure, when each application displayed in a multiwindow is associated with the application matching with the sequence of states, the electronic device (for example, the executor manager module 830 in FIG. 8B) may perform the sequence of states in each region.

According to various embodiments of the disclosure, the electronic device (for example, the executor manager module 830 in FIG. 8B) may perform the sequence of states in a nonactive window, not an active window, of the display in a multiwindow state. For example, if there are multiple nonactive windows, the electronic device may perform the sequence of states in the oldest deactivated window.

According to various embodiments of the disclosure, if a text input is received from a user interface displayed in a partial region of the display in the multiwindow state, the electronic device (for example, the executor manager module 830 in FIG. 8B) may perform the sequence of states in another region of the display.

According to various embodiments of the disclosure, the electronic device (for example, the processor 460 in FIG. 4) may display a user interface related to the task performed in the determined window in operation 960.

According to various embodiments of the disclosure, FIG. 10 to FIG. 11B described below are diagrams illustrating a screen control method if a user input is received while a user interface related to an application is being displayed on the display, and if the application is identical to the application that will perform a task corresponding to the user input.

Figure 10:
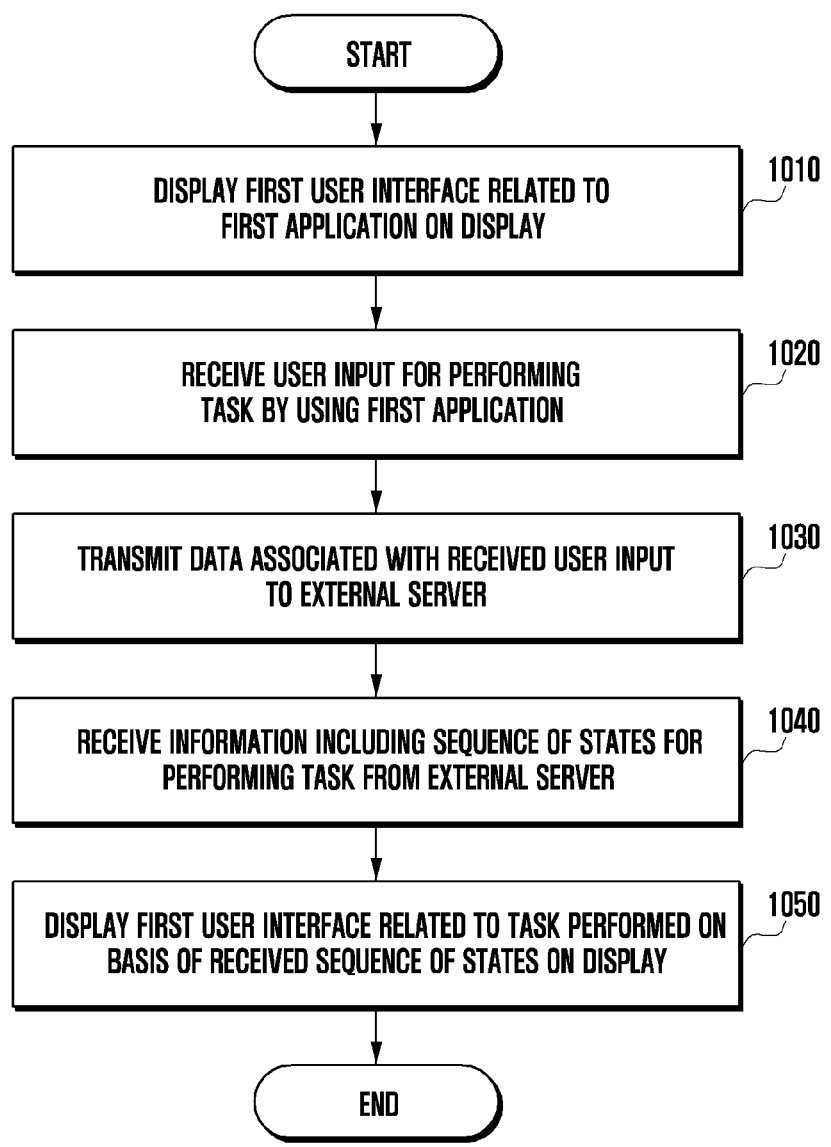
FIG. 10 is a flowchart illustrating a method for controlling a screen according to a user input received while a single user interface is displayed according to various embodiments of the disclosure.

FIG. 10 is a flowchart illustrating a method for controlling a screen according to a user input received while a single user interface is displayed according to various embodiments of the disclosure.

Referring to FIG. 10, the electronic device (for example, the processor 460 in FIG. 4) may display a first user interface related to a first application on the display (for example, the display 420 in FIG. 4) in operation 1010.

According to various embodiments of the disclosure, the electronic device (for example, the intelligent agent 820 in FIG. 8B) may receive a user input for performing a task by using the first application in operation 1020.

According to various embodiments of the disclosure, the electronic device (for example, the intelligent agent 820 in FIG. 8B) may transmit data associated with the received user input to an external server (for example, the intelligent server 850 in FIG. 8B) in operation 1030.

According to various embodiments of the disclosure, the electronic device (for example, the intelligent agent 820 in FIG. 8B) may receive information regarding a sequence of states of the electronic device for performing a task from the external server (for example, the intelligent server 850 in FIG. 8B) in operation 1040.

According to various embodiments of the disclosure, the electronic device (for example, the processor 460 in FIG. 4) may display a first user interface related to the task performed on the basis of the received sequence of states on the display in operation 1050.

This will be described in detail with reference to FIG. 11A and FIG. 11B.

Figure 11A:
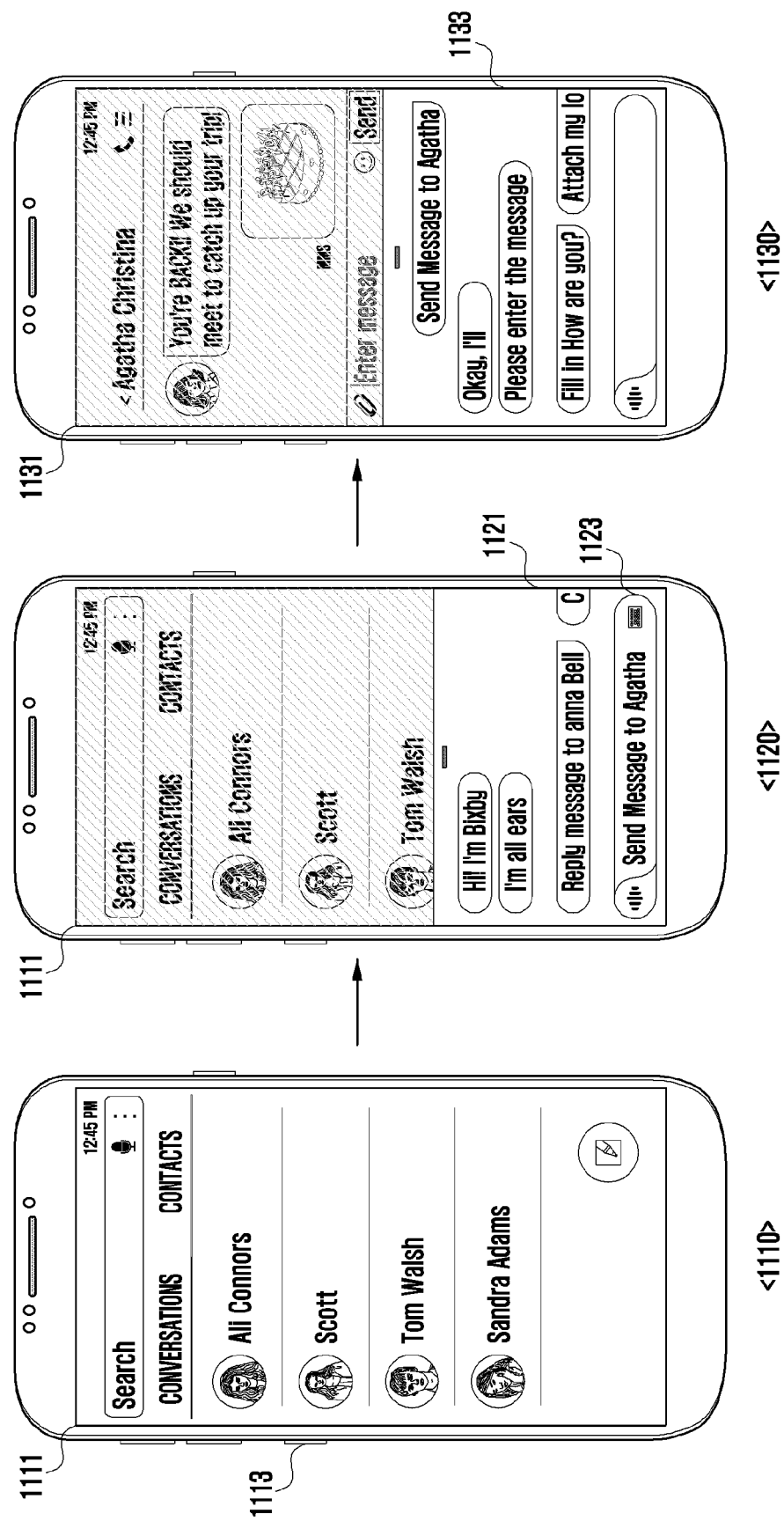
FIG. 11A and FIG. 11B are diagrams illustrating a method for controlling a screen according to a user input received while a single user interface is displayed according to various embodiments of the disclosure.
Figure 11B:
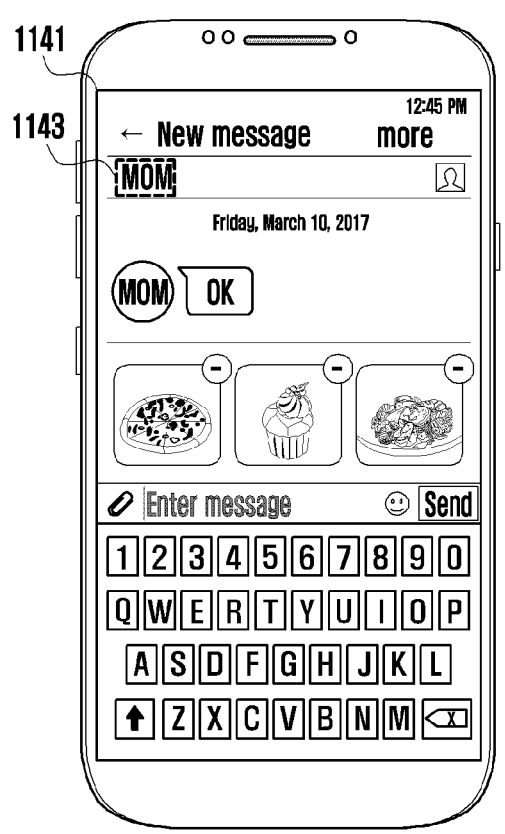

FIG. 11A and FIG. 11B are diagrams illustrating a method for controlling a screen according to a user input received while a single user interface is displayed according to various embodiments of the disclosure.

Referring to FIG. 11A, the electronic device (for example, the electronic device 810 in FIG. 8B) may display a user interface 1111 following execution of an application, for example, a message application, on the display (for example, the display 420 in FIG. 4) as illustrated in <1110>.

According to various embodiments of the disclosure, the electronic device may receive a user input for performing a task by using the message application while the user interface 1111 is displayed on the display.

For example, if a signal generated by pressing a hardware key 1113 (for example, the hardware key 813 in FIG. 8A) separately provided on the electronic device is sensed, the electronic device may perform a speech recognition function in response thereto as illustrated in <1120>, and may display a user interface 1121 related thereto on the display.

According to various embodiments of the disclosure, the electronic device may display a user interface 1121 for performing the speech recognition function as an upper layer on the display. For example, the electronic device may display a user interface 1121 for performing the speech recognition function as an upper layer of the user interface 1111 related to the message application. When the user interface 1121 for performing the speech recognition function is displayed as an upper layer, the electronic device may subject the user interface 1111 related to the message application to graphical processing (for example, shading) such that the same is displayed while being distinguished from the user interface 1121 displayed as an upper layer.

According to various embodiments of the disclosure, the electronic device may receive a user utterance as a user input for performing a task through the user interface 1121 for performing the speech recognition function. For example, the electronic device may receive a user utterance, for example "Send message to Agatha", through the user interface 1121 for performing the speech recognition function as illustrated in <1120>.

According to various embodiments of the disclosure, the electronic device may transmit the user utterance "Send message to Agatha" 1123 to the intelligent server (for example, the intelligent server 850 in FIG. 8B). The intelligent server (for example, the natural language understanding module of the intelligent server (for example, the natural language understanding module 855 in FIG. 8B)) may generate "message" as domain information, "send message" as an intent, and "Agatha" as a parameter (for example, slot) on the basis of the user utterance "Send message to Agatha" 1123 received from the electronic device. The intelligent server (for example, the path planner module of the intelligent server (for example, the path planner module 859 in FIG. 8B)) may generate a sequence of states of "state1: message-state2: conversation view(parameter: Agatha)" on the basis of the domain information, the intent, and the parameter, and may transmit the same to the electronic device.

According to various embodiments of the disclosure, the electronic device may determine whether or not the application to perform a task is the application displayed on the electronic device on the basis of the sequence of states "state1: message-state2: conversation view(parameter: Agatha)" received from the intelligent server. For example, the electronic device may determine whether or not the user interface 1111 following execution of the message application displayed on the display is identical to the domain information of the states, for example, the application.

According to various embodiments of the disclosure, when the domain information of the states is "message", the electronic device may determine on the basis thereof that the application to perform the states is the message application. Accordingly, the electronic device may determine that the domain information of the states and the message application currently displayed on the display are identical. The electronic device may successively perform the states according to the sequence of states by using the message application currently displayed on the displayed. For example, the electronic device may automatically select "Agatha" from the user interface (1111 in <1110>) related to the message application as illustrated in <1130>, thereby displaying a user interface 1131 which has been switched to "Agatha conversation view". In addition, the electronic device may display, together with a user interface 1131 for composing a message to be transmitted to the recipient Agatha, a user interface 1133 for awaiting an additional input through the speech recognition function.

Referring to FIG. 11B, the electronic device may receive, while displaying a user interface 1141 related to a message composition window on the display, a user input including a command that requests processing on a specific screen, for example, the user interface 1141. For example, a user input including a command for entering a text in a recipient field on the message composition window may be received as the user input.

According to various embodiments of the disclosure, if a user input "Add Mon to message recipients" is received, the electronic device may transmit a request for natural language understanding processing to the intelligent server. The electronic device may transmit window context information, together with the user input, to the intelligent server. In addition, the electronic device may request information regarding whether or not the user input can be processed on the user interface displayed on the display of the electronic device.

According to various embodiments of the disclosure, the intelligent server may determine whether or not the user input "Add Mom to message recipients" can be performed on the user interface, for example, the user interface 1141 related to the message composition window, on the basis of the user input and the window context information. When it is determined that the user input can be performed, the intelligent server may generate a sequence of states related thereto, and may transmit the generated sequence of states to the electronic device. The electronic device may display the user interface 1141 related to the message composition window, which has "Mom" added (1143) to the recipient field, on the basis of the sequence of states received form the intelligent server.

According to various embodiments of the disclosure, if the corresponding utterance can be processed in at least one application, the electronic device may conduct a control such that the same is processed by an application executed in the active window, may conduct a control such that the same is processed in the application of the most recently activated window, or may conduct a control such that the user is requested to select an application to process the corresponding command.

According to various embodiments of the disclosure, FIG. 12 to FIG. 13B described below are diagrams illustrating a screen control method if a user input is received while a user interface related to an application is being displayed on the display, and if the application is different from the application that will perform a task related to the user input.

Figure 12:
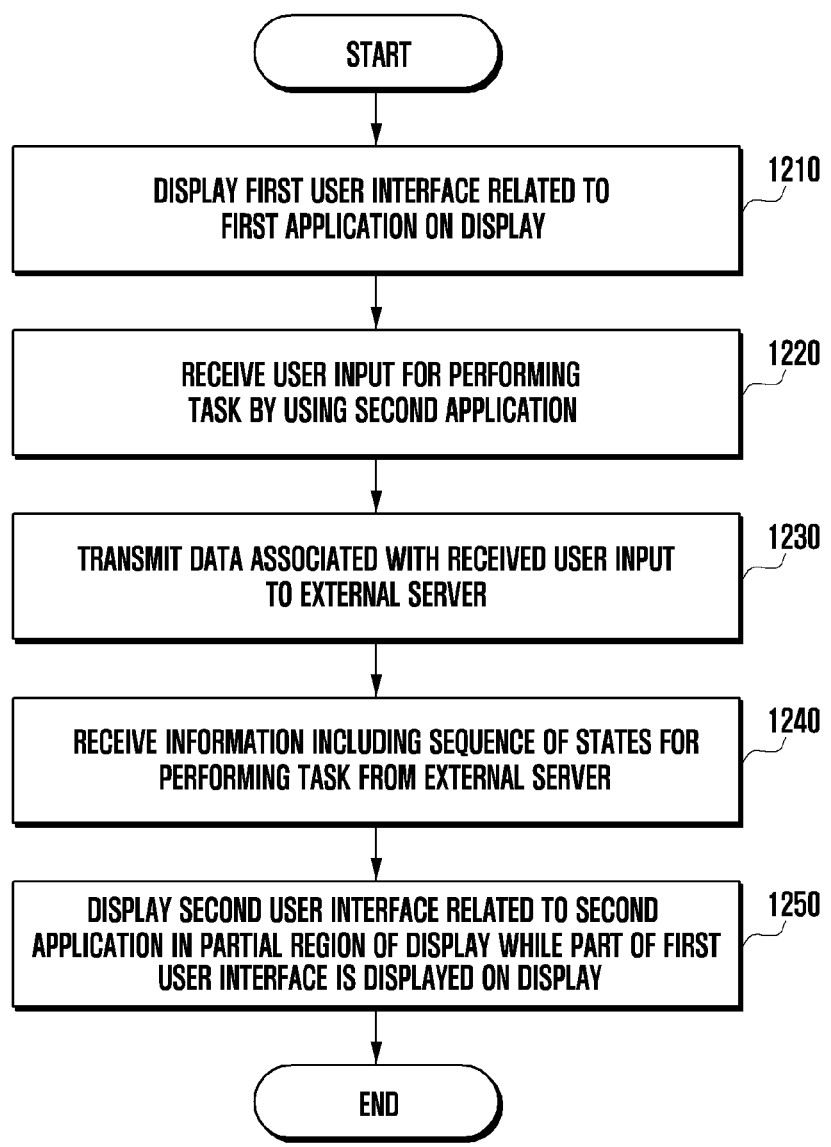
FIG. 12 is a flowchart illustrating a method for controlling a screen according to a user input received while a single user interface is displayed according to various embodiments of the disclosure.

FIG. 12 is a flowchart illustrating a method for controlling a screen according to a user input received while a single user interface is displayed according to various embodiments of the disclosure.

Referring to FIG. 12, the electronic device (for example, the processor 460 in FIG. 4) may display a first user interface related to a first application on the display (for example, the display 420 in FIG. 4) in operation 1210.

According to various embodiments of the disclosure, the electronic device (for example, the intelligent agent 820 in FIG. 8B) may receive a user input for performing a task by using a second application in operation 1220.

According to various embodiments of the disclosure, the electronic device (for example, the intelligent agent 820 in FIG. 8B) may transmit data associated with the received user input to an external server (for example, the intelligent server 850 in FIG. 8B) in operation 1230.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 1240.

According to various embodiments of the disclosure, the electronic device (for example, the processor 460 in FIG. 4) may keep displaying a first user interface on the display and may display a second user interface related to second application in a partial region of the display in operation 1250.

This will be described in detail with reference to FIG. 13A and FIG. 13B.

Figure 13A:
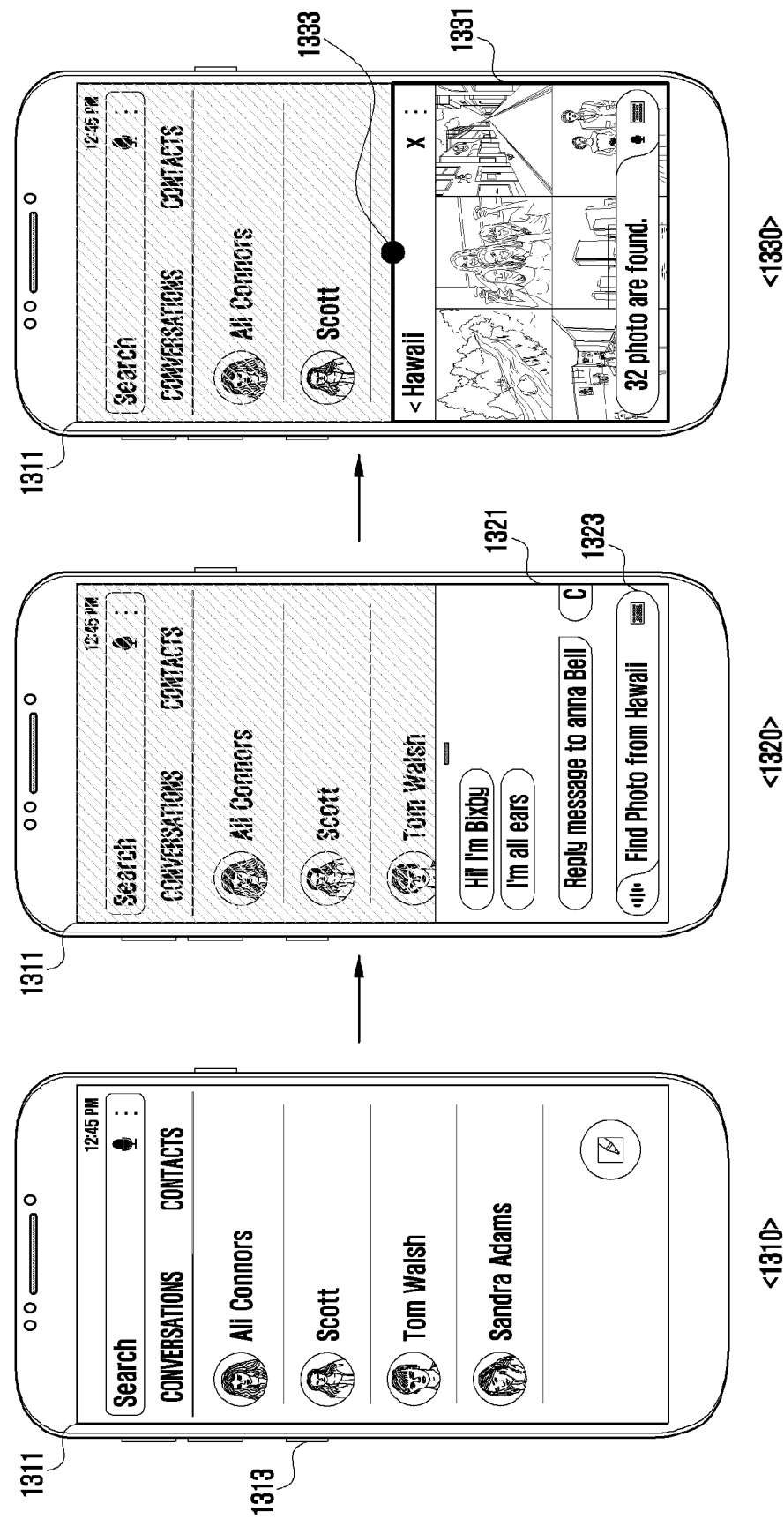
FIG. 13A and FIG. 13B are diagrams illustrating a method for controlling a screen according to a user input received while a single user interface is displayed according to various embodiments of the disclosure.
Figure 13B:
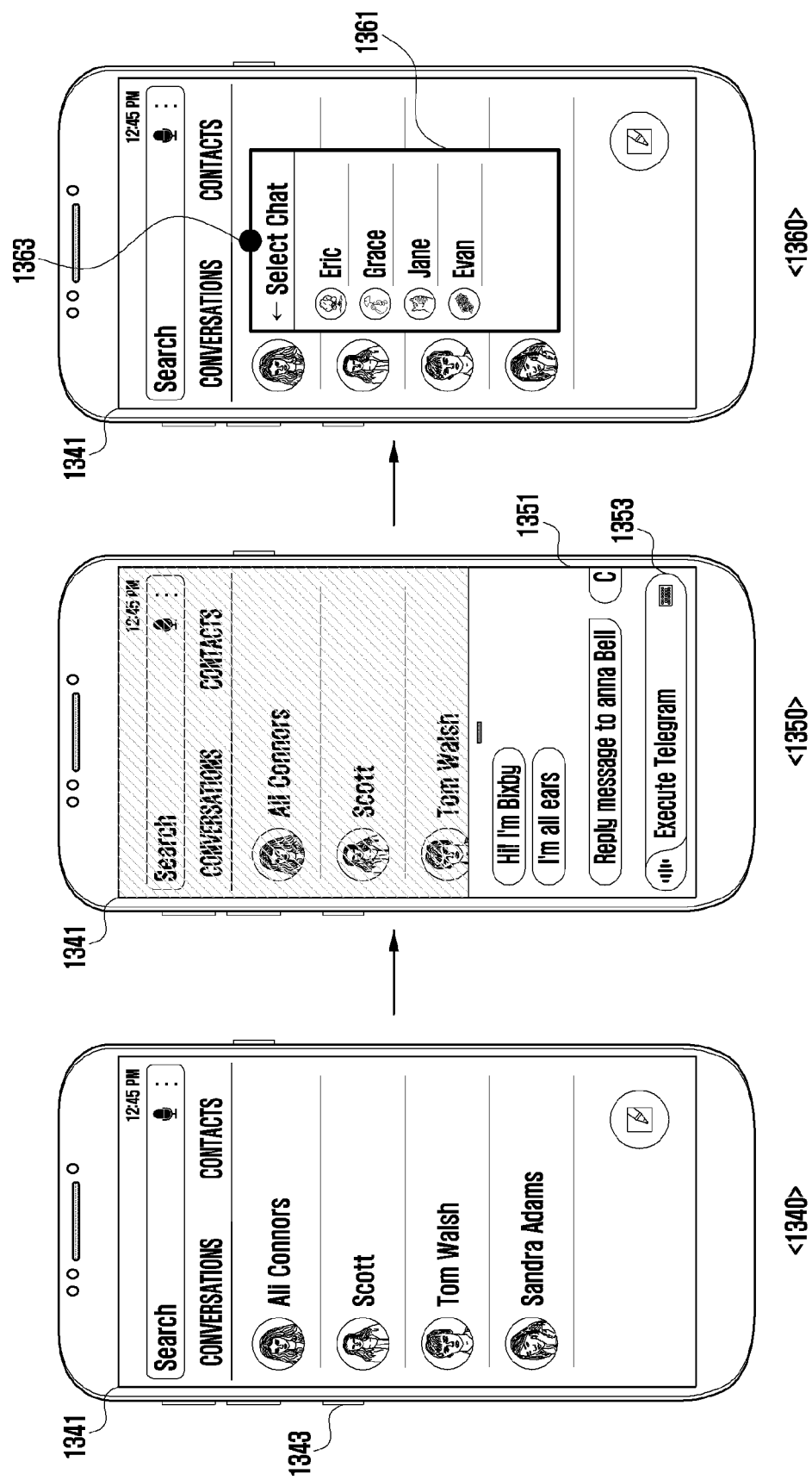

FIG. 13A and FIG. 13B are diagrams illustrating a method for controlling a screen according to a user input received while a single user interface is displayed according to various embodiments of the disclosure.

Referring to FIG. 13A, the electronic device (for example, the electronic device 810 in FIG. 8B) may display a user interface 1311 following execution of an application, for example, a message application, on the display (for example, the display 420 in FIG. 4) as illustrated in <1310>.

According to various embodiments of the disclosure, the electronic device may receive a user input for performing a task by using an application different from the message application while the user interface 1311 following execution of the message application is being displayed on the display.

For example, if a signal generated by pressing a hardware key 1313 (for example, the hardware key 813 in FIG. 8A) separately provided on the electronic device is sensed, the electronic device may display a user interface 1321 for performing the speech recognition function in response thereto as illustrated in <1320>.

According to various embodiments of the disclosure, the electronic device may receive a user utterance as a user input for performing a task through the user interface 1321 for performing the speech recognition function. For example, the electronic device may receive a user utterance, for example "Find photo from Hawaii" 1323 through the user interface 1321 related to a speech recognition application as illustrated in <1320>.

According to various embodiments of the disclosure, the electronic device may transmit the user utterance "Find photo from Hawaii" 1323 to the intelligent server (for example, the intelligent server 850 in FIG. 8B). The electronic device may receive a sequence of states related to the user utterance "Find photo from Hawaii" 1323 from the intelligent server. For example, the sequence of states may include "photo" as domain information, "find photo" as an intent, and "state1: gallery-state2: search-state3: search result(Hawaii)" based on "Hawaii" as a parameter (for example, slot).

According to various embodiments of the disclosure, the electronic device may determine whether or not the application to perform a task on the basis of the sequence of states is the application already displayed on the electronic device, for example, the message application. For example, the electronic device may determine whether or not the user interface 1311 following execution of the message application displayed on the display is identical to the application (for example, domain information) for performing the task.

According to various embodiments of the disclosure, the electronic device may determine that the application for performing the states is the gallery application and, since the same is different from the message application currently displayed on the display, may generate the gallery application as a new window and display the same as displayed in <1330>. The electronic device may successively perform the states on the basis of the sequence of states by using the gallery application, and may display a user interface 1331 as a result of performing the same. The size of the window for displaying the user interface 1331 may be adjusted by an item 1333.

According to various embodiments of the disclosure, the electronic device may determine the window that displays the user interface for performing the sequence of states as the active window.

According to various embodiments of the disclosure, if the sequence of states is completely performed, the electronic device may change the active window from the user interface for performing the sequence of states to the user interface that has been active prior to the user input (utterance).

Referring to FIG. 13B, the electronic device may display a user interface 1341 following execution of an application, for example, the message application, on the display as illustrated in <1340>. If a signal generated by pressing a hardware key 1343 (for example, the hardware key 813 in FIG. 8A) separately provided on the electronic device is sensed, the electronic device may display a user interface 1351 for performing the speech recognition function in response thereto as illustrated in <1350>. The electronic device may receive a user input for performing a task by using an application different from the message application through the user interface 1351 related to the speech recognition application. For example, the electronic device may receive a user utterance, for example, "Execute Telegram" 1353.

According to various embodiments of the disclosure, the electronic device may transmit the user utterance "Execute Telegram" 1353 to the intelligent server (for example, the intelligent server 850 in FIG. 8B). The electronic device may receive a sequence of states related to the "Execute Telegram" 1353 from the intelligent server. For example, the sequence of states may include "Telegram" as domain information and "state1: Telegram-state2: execute" based on "execute" as an intent.

According to various embodiments of the disclosure, the electronic device may determine that the application for performing the states on the basis of the sequence of states is the telegram application and, since the same is different from the message application currently displayed on the display, may generate a new window and display a user interface related to the telegram application as displayed in <1360>. For example, if the application for executing the states does not support a multiwindow, the electronic device may display the user interface related to the telegram application as a popup window 1361 as illustrated in <1360>. The size of the popup window may be adjusted by an item 1363.

Figure 14:
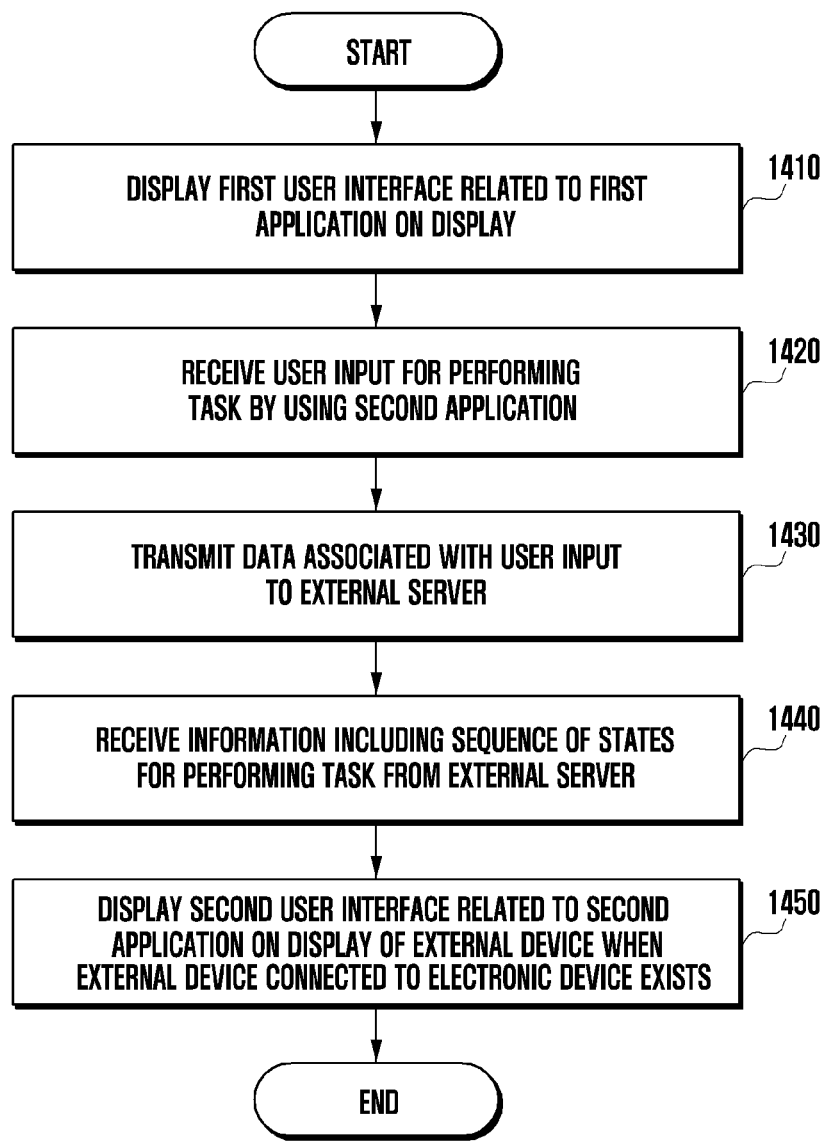
FIG. 14 is a flowchart illustrating a method for controlling a screen according to a user input received while a single user interface is displayed according to various embodiments of the disclosure.

FIG. 14 is a flowchart illustrating a method for controlling a screen according to a user input received while a single user interface is displayed according to various embodiments of the disclosure.

Referring to FIG. 14, the electronic device (for example, the processor 460 in FIG. 4) may display a first user interface related to a first application on the display (for example, the display 420 in FIG. 4) in operation 1410.

According to various embodiments of the disclosure, the electronic device (for example, the intelligent agent 820 in FIG. 8B) may receive a user input for performing a task by using a second application in operation 1420.

According to various embodiments of the disclosure, the electronic device (for example, the intelligent agent 820 in FIG. 8B) may transmit data associated with the received user input to an external server (for example, the intelligent server 850 in FIG. 8B) in operation 1430.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 1440.

According to various embodiments of the disclosure, if there exists an external device connected to the electronic device (for example, the processor 460 in FIG. 4), the electronic device may display a second user interface related to second application on the display of the external device in operation 1450.

This will be described in detail with reference to FIG. 15A and FIG. 15B.

Figure 15A:
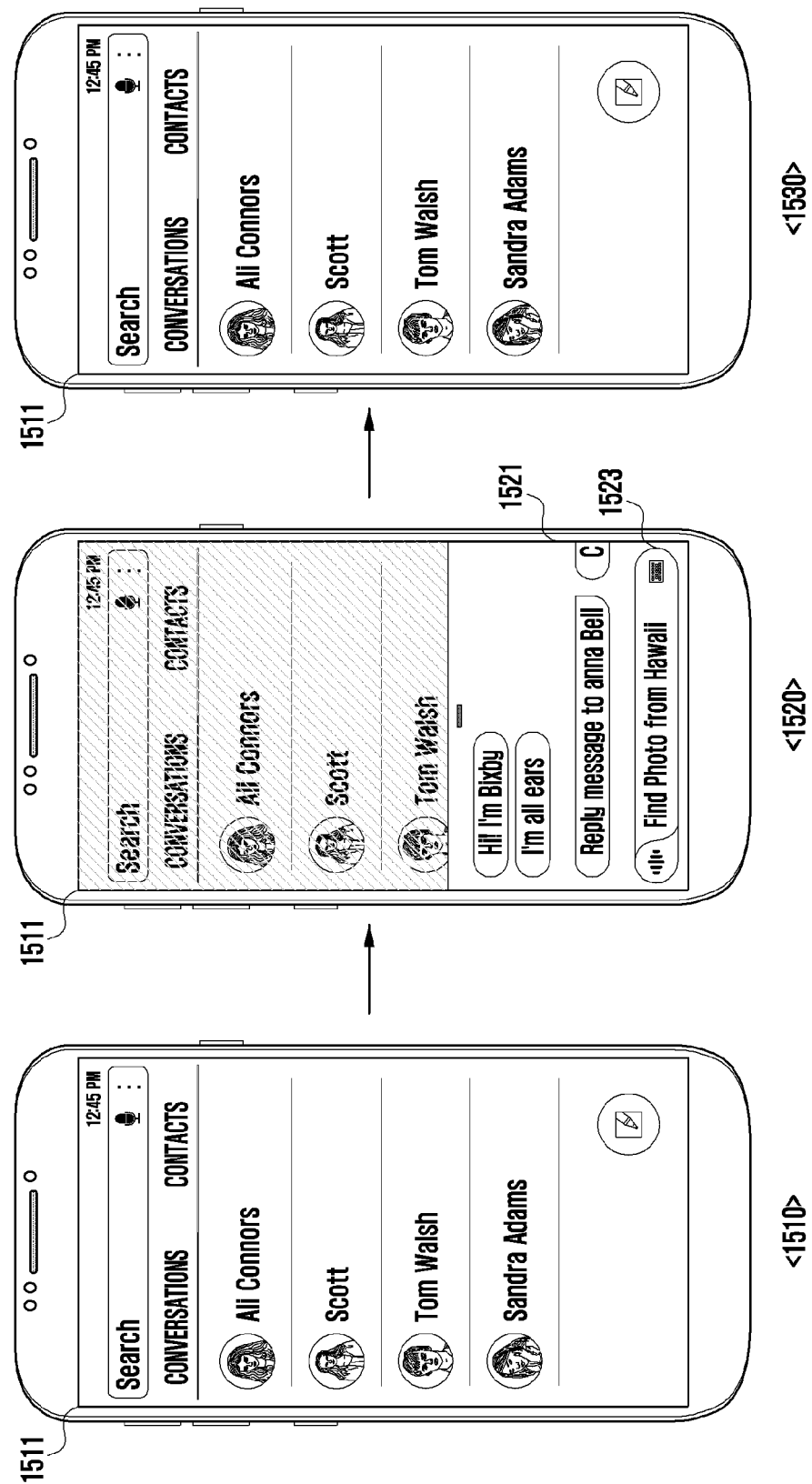
FIG. 15A and FIG. 15B are diagrams illustrating a method for controlling a screen according to a user input received while a single user interface is displayed according to various embodiments of the disclosure.
Figure 15B:
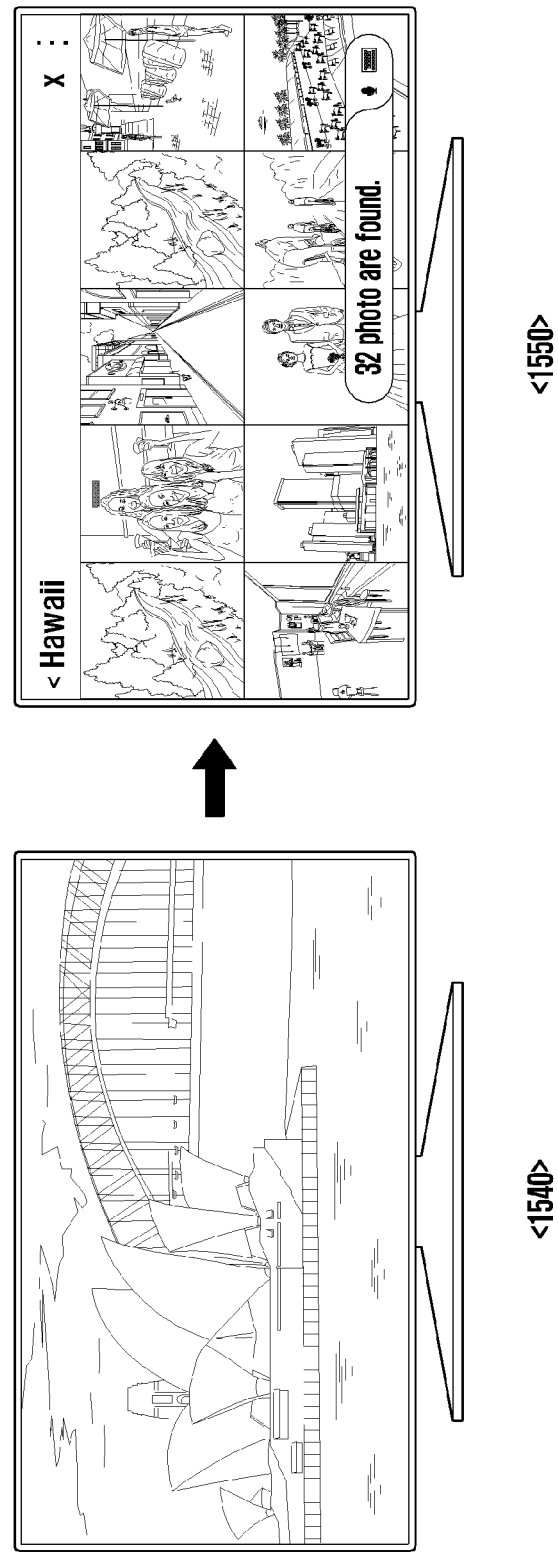

FIG. 15A and FIG. 15B are diagrams illustrating a method for controlling a screen according to a user input received while a single user interface is displayed according to various embodiments of the disclosure.

Referring to FIG. 15A and FIG. 15B, the electronic device (for example, the electronic device 810 in FIG. 8B) may display a user interface 1511 related to a message application on the display (for example, the display 420 in FIG. 4) as illustrated in <1510>.

According to various embodiments of the disclosure, the electronic device may display a user interface 1521 for performing a speech recognition function in a partial region of the display as illustrated in <1520>. The electronic device may receive a user input, for example "Find photo from Hawaii" 1523 through the user interface 1521.

According to various embodiments of the disclosure, the electronic device may transmit the user input "Find photo from Hawaii" 1523 to an intelligent server (for example, the intelligent server 850 in FIG. 8B). The electronic device may receive a sequence of states related to the user input "Find photo from Hawaii" 1523 from the intelligent server. For example, the sequence of states may include "photo" as domain information, "find" as an intent, and "state1: gallery-state2: search"-state3: search result(Hawaii)" based on "Hawaii" as a parameter (for example, slot). According to various embodiments of the disclosure, the electronic device may determine that the application for performing the states on the basis of the sequence of states is the gallery application.

According to various embodiments of the disclosure, the electronic device may determine whether or not the same is connected to an external device 1540. For example, the electronic device and the external device 1540 may be connected through a wireless communication circuit (for example, the communication interface 170 in FIG. 1 or the communication module 220 in FIG. 2). When connection with the external device 1540 is confirmed, the electronic device may keep displaying a user interface related to the message application on the display of the electronic device as illustrated in <1350>, and may transmit information regarding execution of an application corresponding to the user input, for example, a gallery application (for example, a user interface performed by using the gallery application according to the sequence of states) to the external device 1540. The external device 1540 may display the user interface related to the gallery application, from which photos from Hawaii photos are discovered, as illustrated in <1550> on the basis of the information regarding execution of the gallery application.

According to various embodiments of the disclosure, FIG. 16 to FIG. 17C described below are diagrams illustrating an embodiment in which there are multiple domains to be executed according to a path rule.

Figure 16:
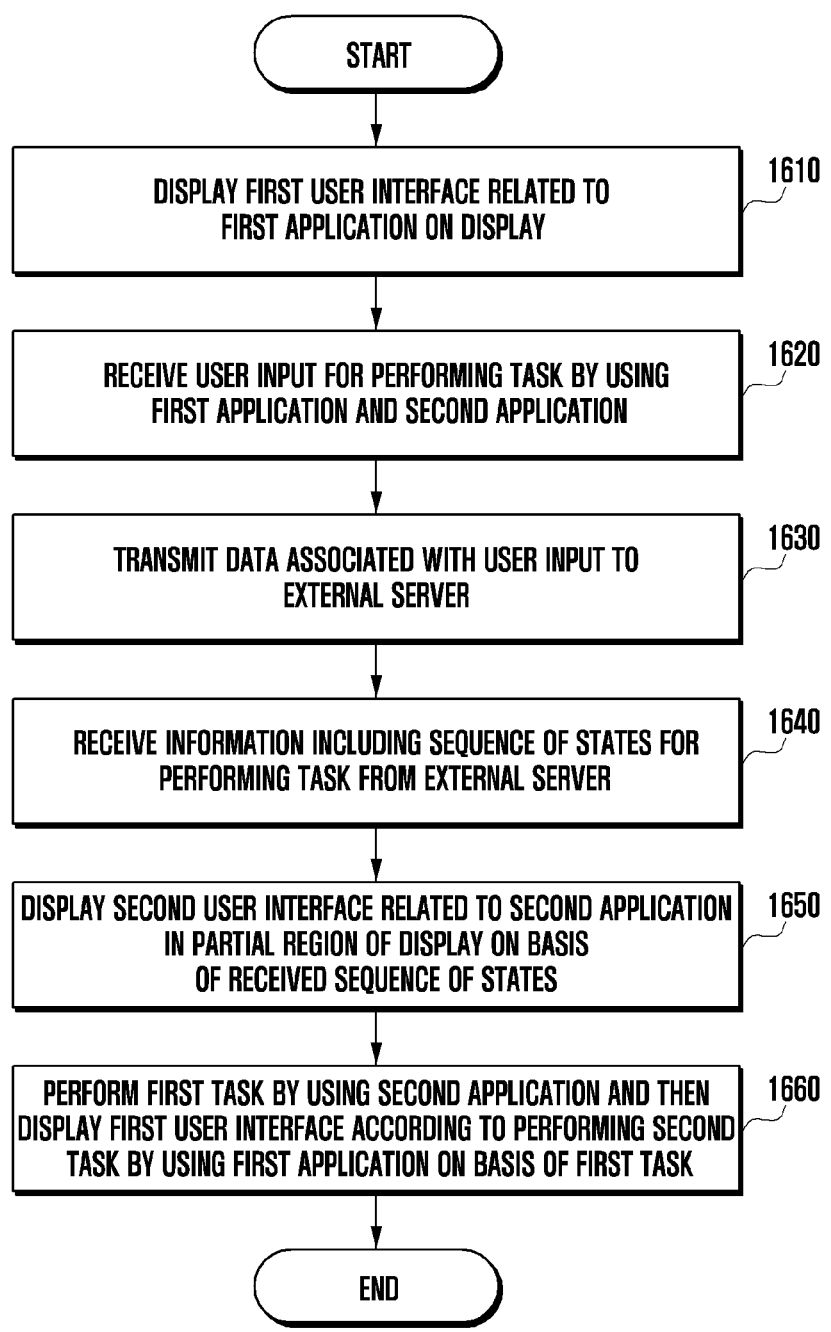
FIG. 16 is a flowchart illustrating a method for controlling a screen when there are multiple applications to be performed according to a user input received while a single user interface is displayed according to various embodiments of the disclosure.

FIG. 16 is a flowchart illustrating a method for controlling a screen when there are multiple applications to be performed according to a user input received while a single user interface is displayed according to various embodiments of the disclosure.

Referring to FIG. 16, the electronic device (for example, the processor 460 in FIG. 4) may display a first user interface related to a first application on the display (for example, the display 420 in FIG. 4) in operation 1610.

According to various embodiments of the disclosure, the electronic device (for example, the intelligent agent 820 in FIG. 8B) may receive a user input for performing a task by using a first application and a second application in operation 1620.

According to various embodiments of the disclosure, the electronic device (for example, the intelligent agent 820 in FIG. 8B) may transmit data associated with the received user input to an external server (for example, the intelligent server 850 in FIG. 8B) in operation 1630.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 1640.

According to various embodiments of the disclosure, the electronic device (for example, the intelligent agent 820 in FIG. 8B) may display a second user interface related to the second application in a partial region of the display on the basis of the received sequence of states in operation 1650.

According to various embodiments of the disclosure, the electronic device (for example, the intelligent agent 820 in FIG. 8B) may perform a first task by using the second application and may display the first user interface following performing of a second task using the first application on the basis of the first task in operation 1660.

This will be described in detail with reference to FIG. 17A to FIG. 17C.

Figure 17A:
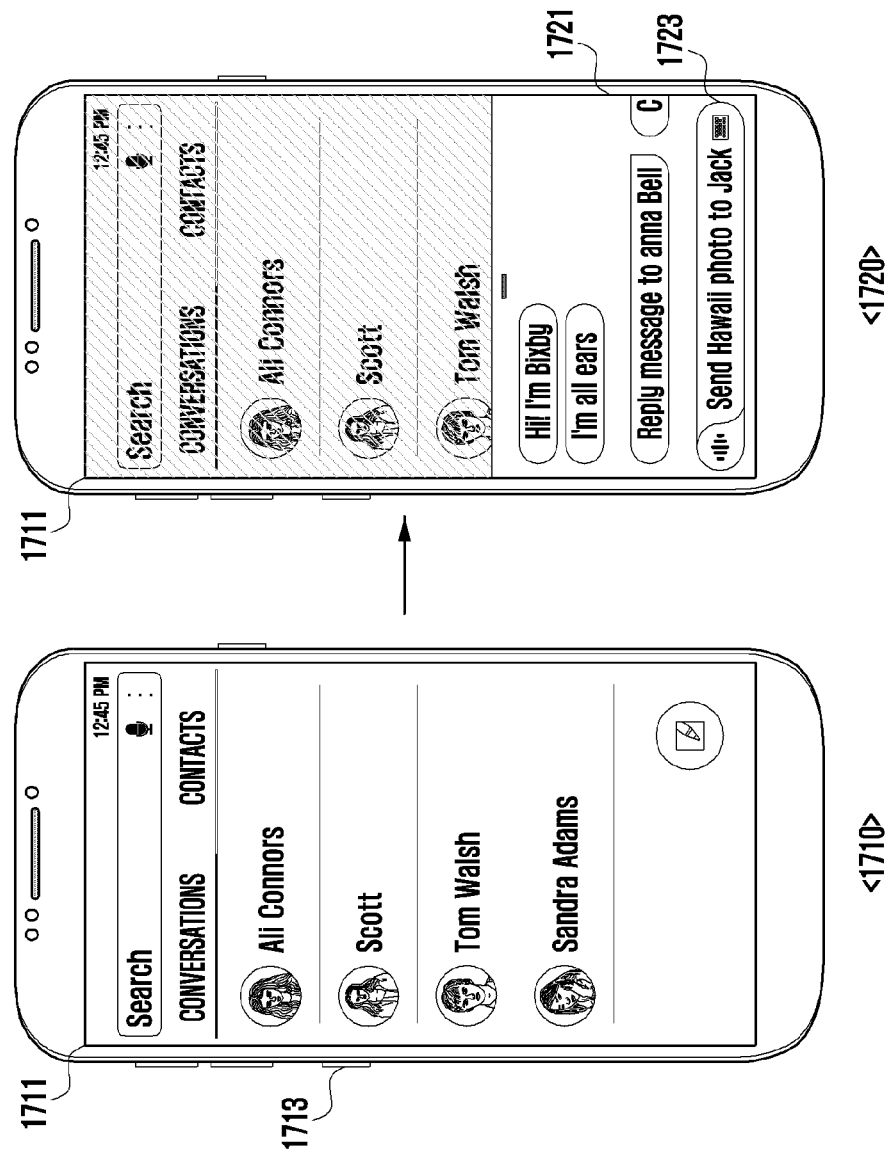
FIG. 17A to FIG. 17C are diagrams illustrating a method for controlling a screen when there are multiple applications to be performed according to a user input received while a single user interface is displayed according to various embodiments of the disclosure.
Figure 17B:
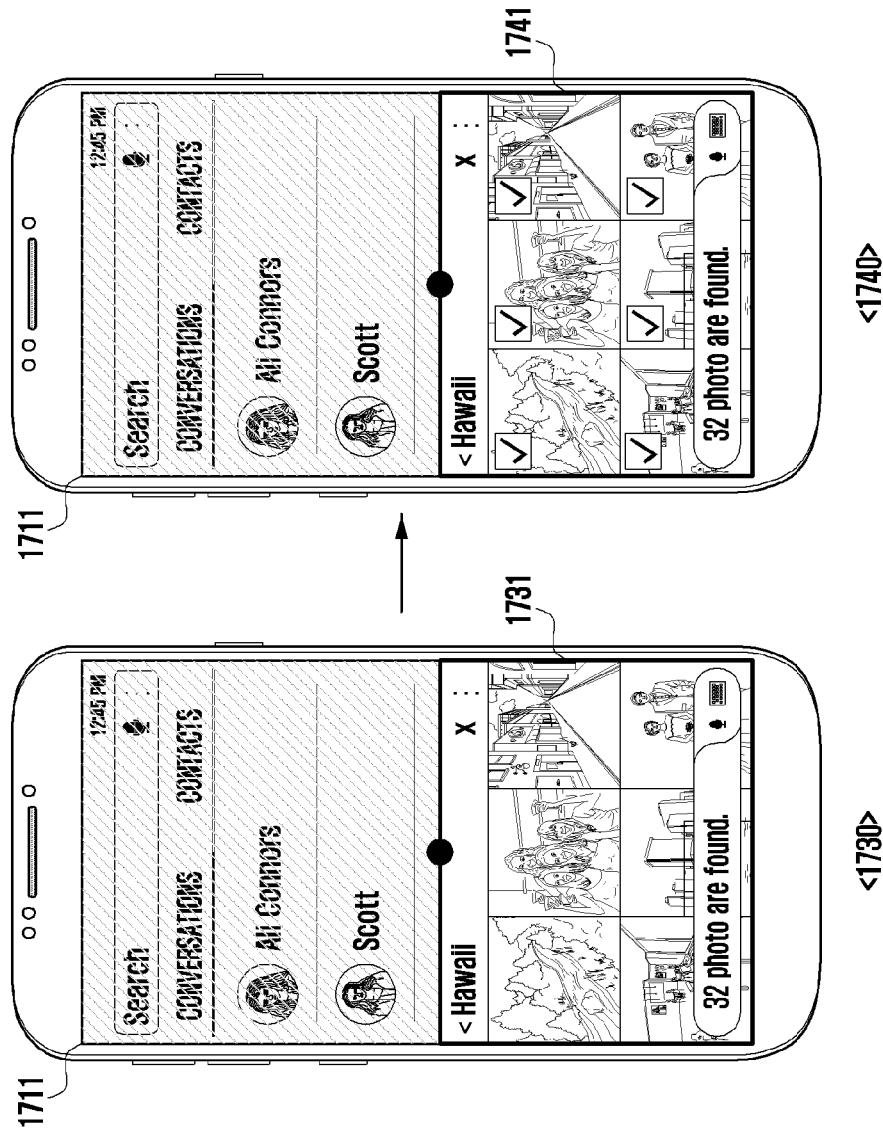
Figure 17C:
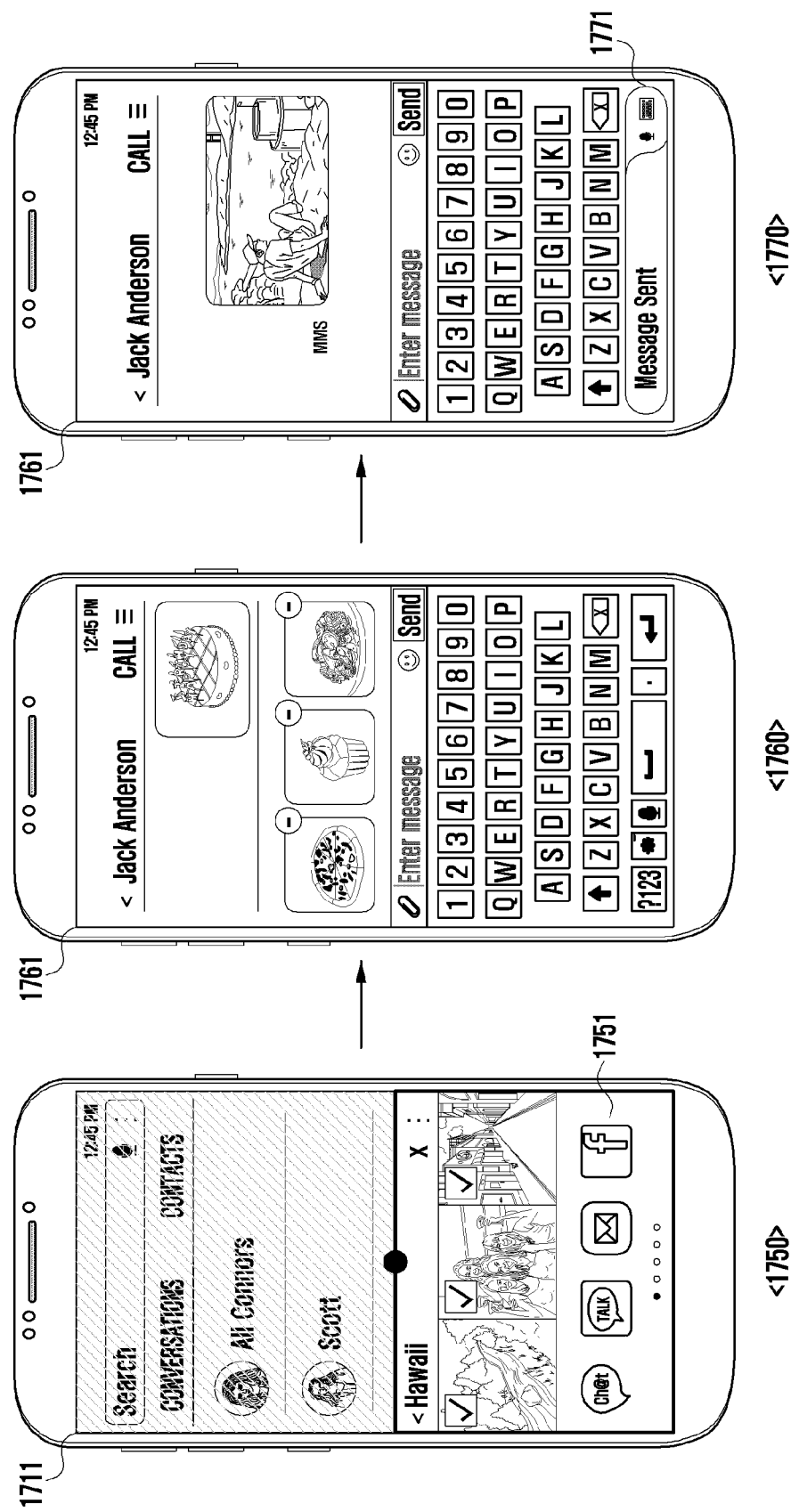

FIG. 17A to FIG. 17C are diagrams illustrating a method for controlling a screen when there are multiple applications to be performed according to a user input received while a single user interface is displayed according to various embodiments of the disclosure.

Referring to FIG. 17A to FIG. 17C, the electronic device (for example, the electronic device 810 in FIG. 8B) may display a user interface 1711 related to a message application on the display (for example, the display 420 in FIG. 4) as illustrated in <1710>. If a signal generated by pressing a hardware key 1713 (for example, the hardware key 813 in FIG. 8A) separately provided on the electronic device is sensed, the electronic device may display a user interface 1721 for performing a speech recognition function as illustrated in <1720>. A user input, for example, "Send Hawaii photo to Jack", 1723 may be received through the user interface 1721. The electronic device may transmit the user input "Send Hawaii photo to Jack" 1723 to an intelligent server (for example, the intelligent server 850 in FIG. 8B).

According to various embodiments of the disclosure, the natural language understanding module (for example, the natural language understanding module 855 in FIG. 8B) of the electronic device may generate domain information, an intent, and a parameter on the basis of the user input "Send Hawaii photo to Jack" 1723. The natural language understanding module of the intelligent server may transmit the generated domain information, intent, and parameter to the path planner module (for example, the path planner module 859 in FIG. 8B) of the intelligent server.

According to various embodiments of the disclosure, if there are multiple pieces of domain information corresponding to the user input "Send Hawaii photo to Jack" 1723 generated by the natural language understanding module of the intelligent server, the path planner module may generate multiple path rules on the basis of the multiple pieces of domain information. For example, the path planner module of the intelligent server may generate a first path rule "message-conversation view(Jack)-attach-search-search result (Hawaii)-select Hawaii photo-send" and a second path rule "gallery-search-search result(Hawaii)-select Hawaii photo-share via message-send" with regard to the user input "Send Hawaii photo to Jack" 1723. The server may transmit the generated first path rule and second path rule to the electronic device.

According to various embodiments of the disclosure, the electronic device may successively perform states by using one of the first path rule and the second path rule received from the intelligent server. For example, the electronic device may determine a path rule for performing states on the basis of window usage history information and window context information.

According to various embodiments of the disclosure, the first path rule may be related to the order of executing a message application, performing state by using the same, executing a gallery application, and performing states by using the same. The electronic device may successively perform states according to the first path rule by using the message application currently displayed on the display, may execute the gallery application, and may successively perform states by using the same.

According to various embodiments of the disclosure, the second path rule may be related to the order of executing a gallery application, performing stated by using the same, executing a message application, and performing states by using the same. When states are performed on the basis of the second path rule, the electronic device may generate a user interface 1731 related to the gallery application as a new window, besides the user interface 1711 related to the message application currently displayed, and may display the same in a multiwindow as illustrated in <1730>.

According to various embodiments of the disclosure, the electronic device may execute the gallery application by using the generated window as an active window as illustrated in <1740> and <1750> such that states related to operations corresponding to the second path rule, for example, selecting (1741) photos to be shared from Hawaii photos found from the gallery application and selecting (1751) an application to share the selected photos, are performed successively.

According to various embodiments of the disclosure, if the states to be performed through the user interface 1731 related to the gallery application are ended, and if states to be performed through the user interface 1711 related to the message application are started, the electronic device may end the gallery application as illustrated in <1760>, may display only the user interface 1761 related to the message application, and may perform a state of transmitting photos to Jack through the user interface 1761 related to the message application. After states following the second path rule are completely performed, the electronic device may display a message 1771 that completes message transmission as illustrated in <1770>.

Figure 18:
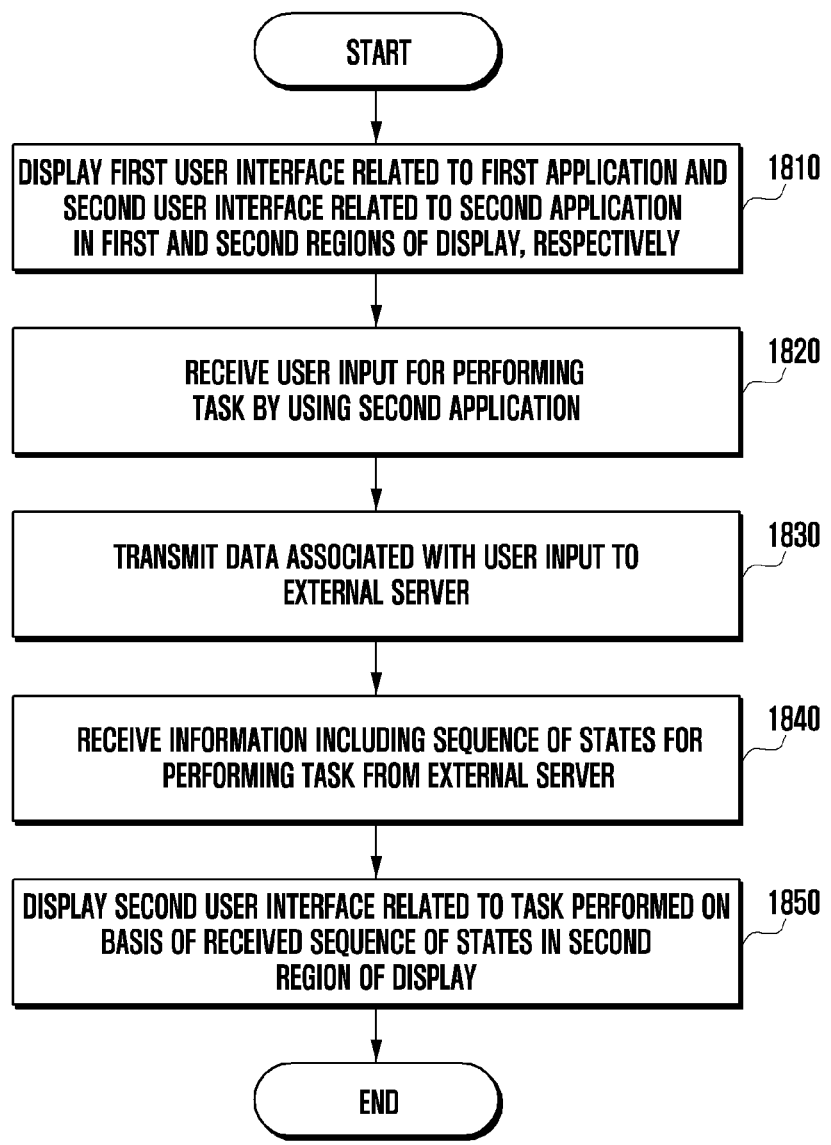
FIG. 18 is a flowchart illustrating a method for controlling a screen according to a user input received from a multi-window according to various embodiments of the disclosure.

FIG. 18 is a flowchart illustrating a method for controlling a screen according to a user input received from a multi-window according to various embodiments of the disclosure.

Referring to FIG. 18, the electronic device (for example, the processor 460 in FIG. 4) may display a first user interface related to a first application and a second user interface related to a second application in a first region and in a second region of the display (for example, the display 420 in FIG. 4), respectively, in operation 1810.

According to various embodiments of the disclosure, the electronic device (for example, the intelligent agent 820 in FIG. 8B) may receive a user input for performing a task by using the second application in operation 1820.

According to various embodiments of the disclosure, the electronic device (for example, the intelligent agent 820 in FIG. 8B) may transmit data associated with the received user input to an external server (for example, the intelligent server 850 in FIG. 8B) in operation 1830.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 1840.

According to various embodiments of the disclosure, the electronic device (for example, the intelligent agent 820 in FIG. 8B) may display the second user interface related to the task performed on the basis of the received sequence of states in the second region of the display in operation 1850.

This will be described in detail with reference to FIG. 19.

Figure 19:
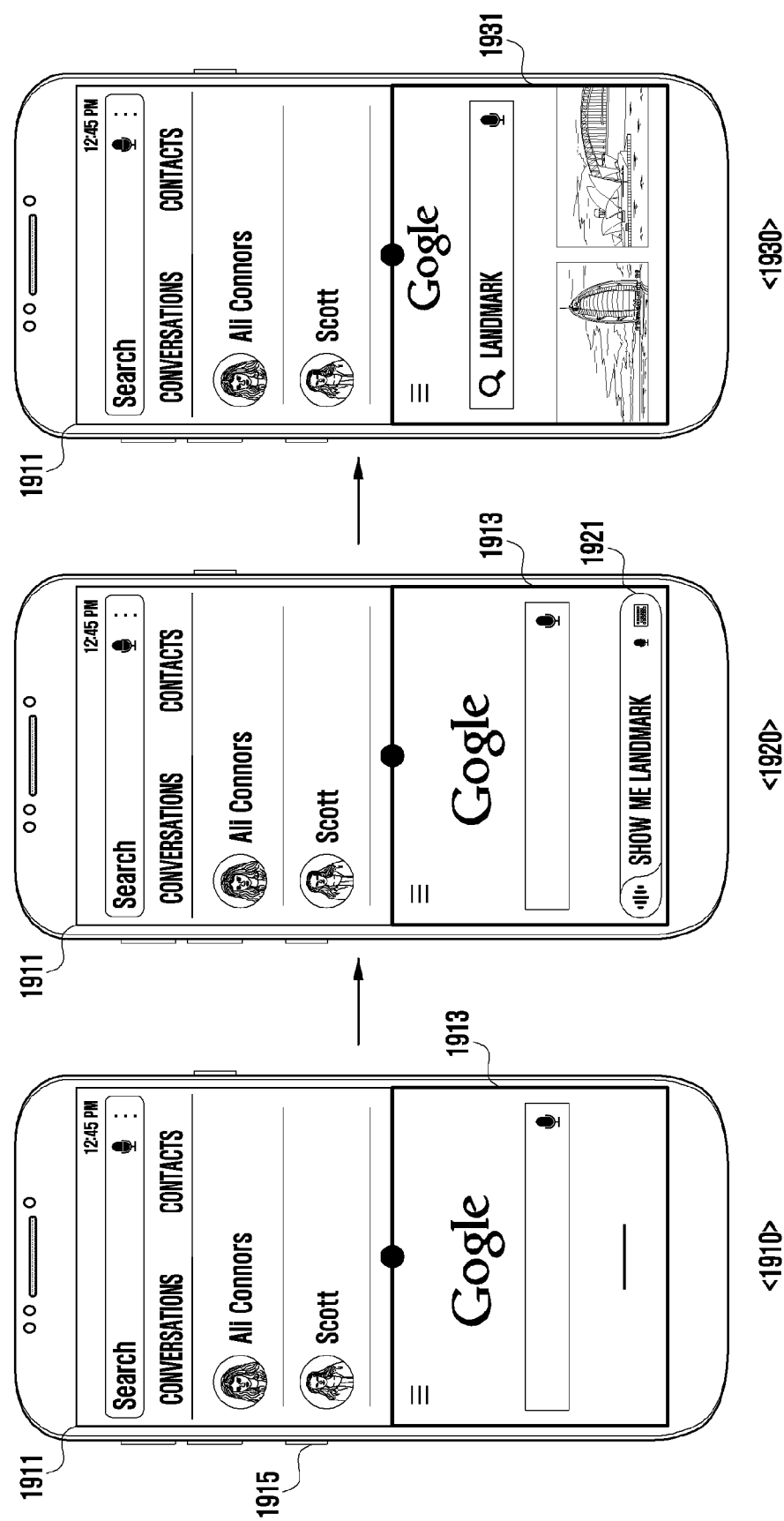
FIG. 19 is a diagram illustrating a method for controlling a screen according to a user input received from a multi-window according to various embodiments of the disclosure.

FIG. 19 is a diagram illustrating a method for controlling a screen according to a user input received from a multi-window according to various embodiments of the disclosure.

Referring to FIG. 19, the electronic device (for example, the electronic device 810 in FIG. 8B) may display a user interface 1911 related to a message application in the first region of the display (for example, the display 420 in FIG. 4) and may display a user interface 1913 related to a browser application in the second region of the display as illustrated in <1910>.

According to various embodiments, the electronic device may determine the user interface 1913 related to the browser application displayed in the second region, among the first region and the second region of the display, as an active window.

According to various embodiments of the disclosure, the electronic device may display a user interface 1921 for performing the speech recognition function as illustrated in <1920>, in response to a signal generated by pressing a hardware key 1915 (for example, the hardware key 813 in FIG. 8A) separately provided on the electronic device. The electronic device may receive a user input "Show me landmarks" through the user interface 1921.

According to various embodiments of the disclosure, if the application displayed in the active window among the applications displayed in the multiwindow is identical to domain information for performing a task, the electronic device may successively perform states related to the user input by using the application displayed in the active window. For example, since the domain information for performing a sequence of states related to the user input "Show me landmarks" is identical to the browser application displayed in the active window of the display, for example, in the second region, the electronic device may search for "landmarks" by using the browser application displayed in the second region as illustrated in <1930>, and may display the user interface 1931 including the search result.

Figure 20:
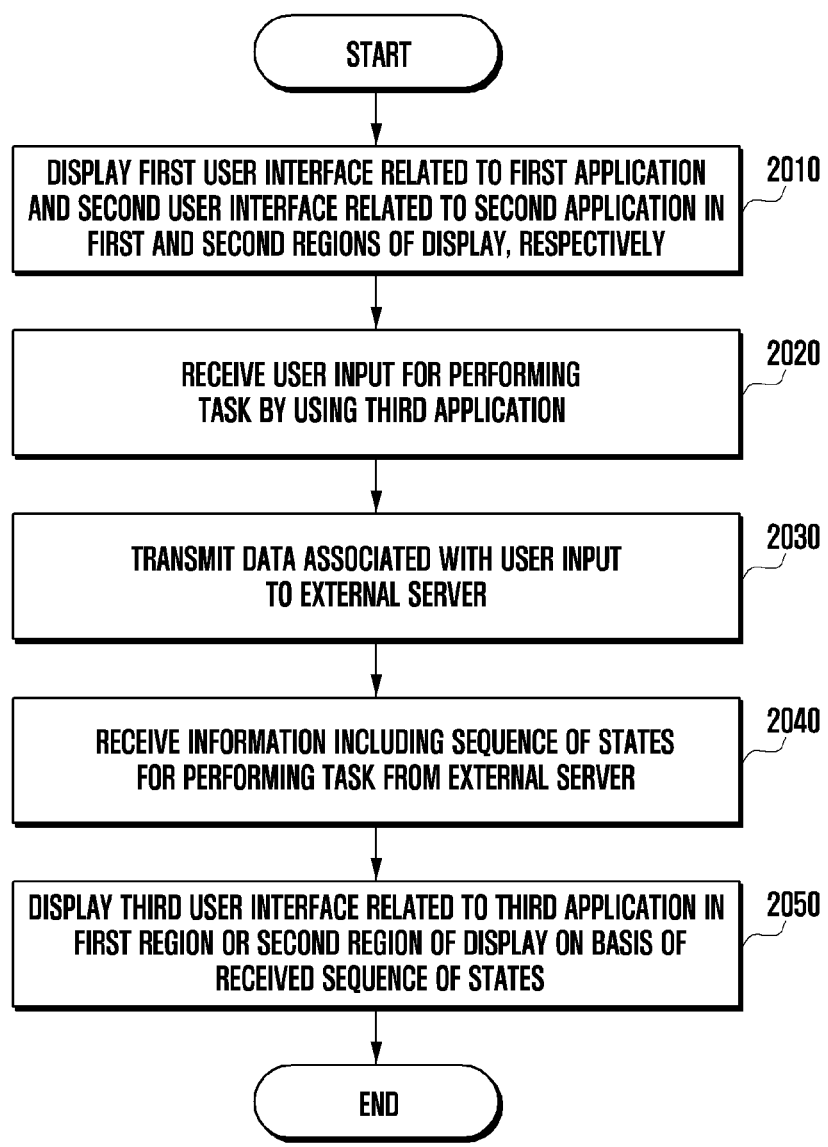
FIG. 20 is a flowchart illustrating a method for controlling a screen according to a user input received from a multi-window according to various embodiments of the disclosure.

FIG. 20 is a flowchart illustrating a method for controlling a screen according to a user input received from a multiwindow according to various embodiments of the disclosure.

Referring to FIG. 20, the electronic device (for example, the processor 460 in FIG. 4) may display a first user interface related to a first application and a second user interface related to a second application in a first region and in a second region of the display (for example, the display 420 in FIG. 4), respectively, in operation 2010.

According to various embodiments of the disclosure, the electronic device (for example, the intelligent agent 820 in FIG. 8B) may receive a user input for performing a task by using a third application in operation 2020.

According to various embodiments of the disclosure, the electronic device (for example, the intelligent agent 820 in FIG. 8B) may transmit data associated with the received user input to an external server (for example, the intelligent server 850 in FIG. 8B) in operation 2030.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 2040.

According to various embodiments of the disclosure, the electronic device (for example, the intelligent agent 820 in FIG. 8B) may display a third user interface related to the third application in the first region or in the second region of the display on the basis of the received sequence of states in operation 2050.

This will be described in detail with reference to FIG. 21A and FIG. 21B.

Figure 21A:
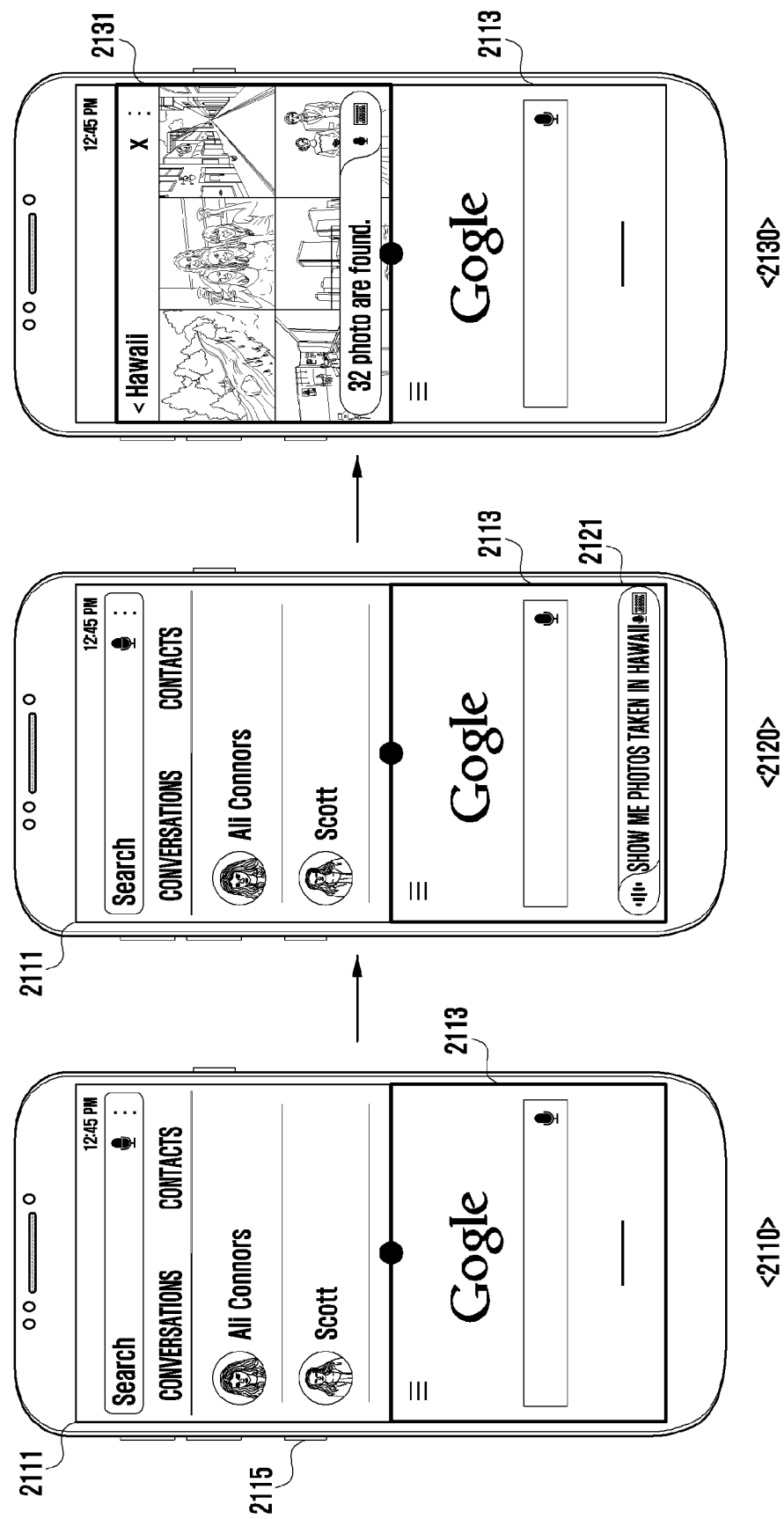
FIG. 21A and FIG. 21B are diagrams illustrating a method for controlling a screen according to a user input received from a multiwindow according to various embodiments of the disclosure.
Figure 21B:
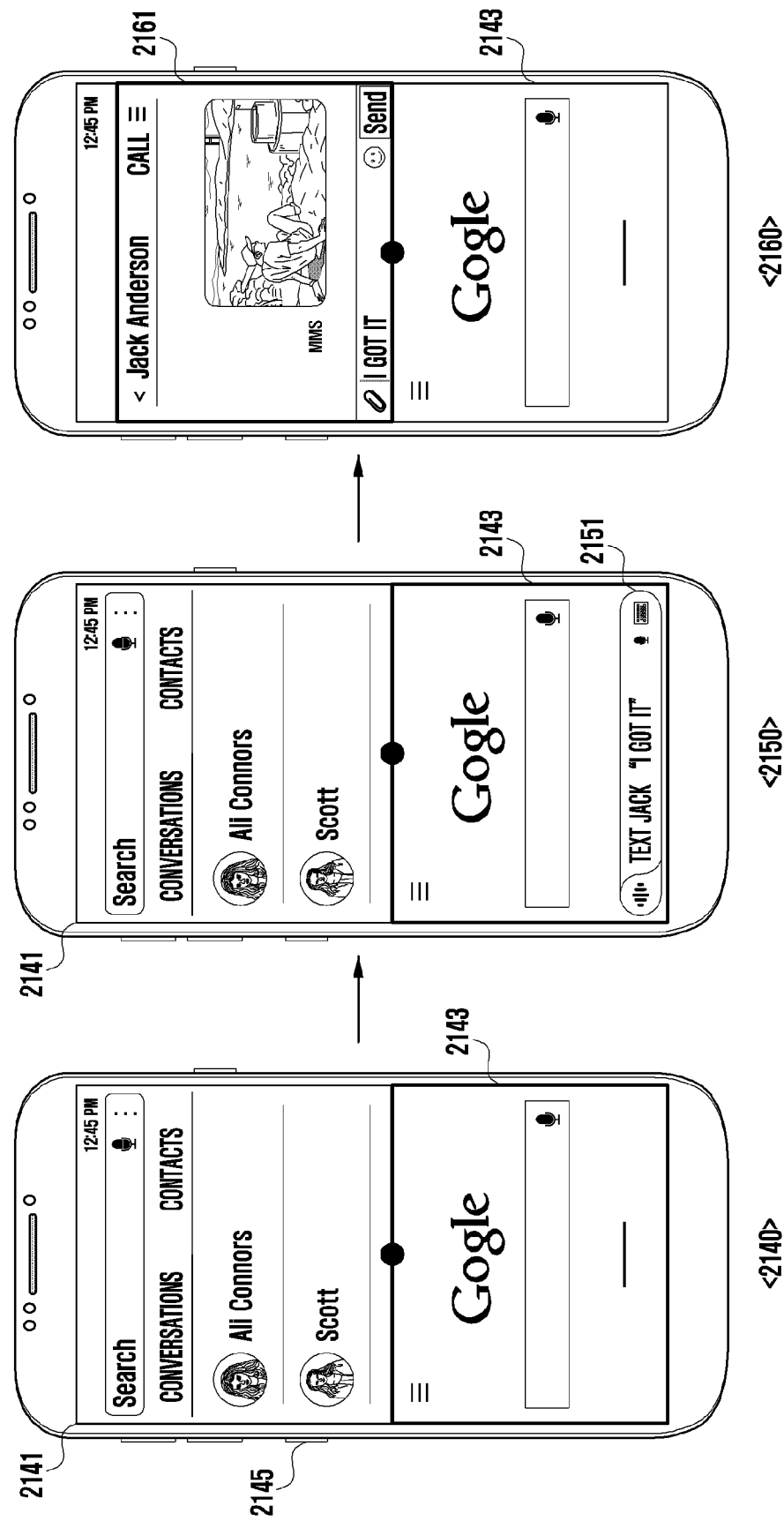

FIG. 21A and FIG. 21B are diagrams illustrating a method for controlling a screen according to a user input received from a multiwindow according to various embodiments of the disclosure.

Referring to FIG. 21A, the electronic device may display a user interface 2111 related to a message application and a user interface 2113 related to a browser application as a multiwindow in the first region and the second region of the display, respectively, as illustrated in <2110>.

According to various embodiments, the electronic device may display a user interface 2121 for performing the speech recognition function as illustrated in <2120>, in response to a signal generated by pressing a hardware key 2115 (for example, the hardware key 813 in FIG. 8A) separately provided on the electronic device. The electronic device may receive a user input "Show me photos taken in Hawaii" through the user interface 2121.

According to various embodiments of the disclosure, the electronic device may transmit the user input "Show me photos taken in Hawaii" to the intelligent server (for example, the intelligent server 850 in FIG. 8B). The electronic device may receive a sequence of states related to the user input "Show me photos taken in Hawaii" from the intelligent server.

According to various embodiments of the disclosure, the electronic device may determine whether or not the application corresponding to the active user interface among the user interfaces displayed as a multiwindow on the display, for example, the user interface 2113 displayed in the second region of the display, is identical to domain information related to the user input, for example, the application.

According to various embodiments of the disclosure, if the application corresponding to the user interface 2113 displayed in the second region of the display is different from the domain information related to the user input, for example, the application, the electronic device may keep displaying the user interface 2113 related to the browser application in the second region of the display, which is active, may execute the gallery application in a nonactive region, for example, in the first region of the display as illustrated in <2130>, and may successively perform states related to the user input by using the gallery application. The electronic device may determine the user interface 2131 related to the gallery application in the first region, in which states related to the user input are performed successively, as an active window.

According to various embodiments of the disclosure, if the sequence of states is completely performed by using the gallery application, the electronic device may change the active window to the second region, which has been an active window prior to receiving the user input.

Referring to FIG. 21B, the electronic device may display a user interface 2141 related to a message application and a user interface 2143 related to a browser application as a multiwindow in the first region and the second region of the display, respectively, as illustrated in <2140>.

According to various embodiments, the electronic device may display a user interface 2151 for performing the speech recognition function as illustrated in <2150>, in response to a signal generated by pressing a hardware key 2145 (for example, the hardware key 813 in FIG. 8A) separately provided on the electronic device. The electronic device may receive a user input "Text Jack 'I got it'" through the user interface 2151.

According to various embodiments of the disclosure, the electronic device may transmit the user input "Text Jack 'I got it'" to the intelligent server (for example, the intelligent server 850 in FIG. 8B). The electronic device may receive a sequence of states related to the user input "Text Jack 'I got it'" from the intelligent server.

According to various embodiments of the disclosure, the electronic device may determine whether or not the application corresponding to the active user interface among the user interfaces displayed as a multiwindow on the display, for example, the user interface 2143 displayed in the second region of the display, is identical to domain information related to the user input, for example, the application.

According to various embodiments of the disclosure, if the application corresponding to the user interface 2143 displayed in the second region of the display is identical to the domain information related to the user input, for example, the application, the electronic device may keep displaying the user interface 2143 related to the browser application in the second region of the display, which is active, may perform states according to the sequence of states by using the message application corresponding to the user interface displayed in the first region of the display as illustrated in <2160>, and may display a user interface 2161 related to the message application following the result of performing the same (for example, an interface used to transmit a message "I got it" to Jack).

According to various embodiments of the disclosure, the electronic device may determine the user interface 2161 related to the message application in the first region, in which the states are performed, as an active window.

According to various embodiments of the disclosure, if the sequence of states is completely performed by using the message application, the electronic device may change the active window from the first region in which the states are performed to the second region, which has been an active window prior to receiving the user input.

According to various embodiments of the disclosure, FIG. 22 to FIG. 23C described below are diagrams illustrating an embodiment in which there are multiple path rule domains corresponding to a user input in a multiwindow state.

Figure 22:
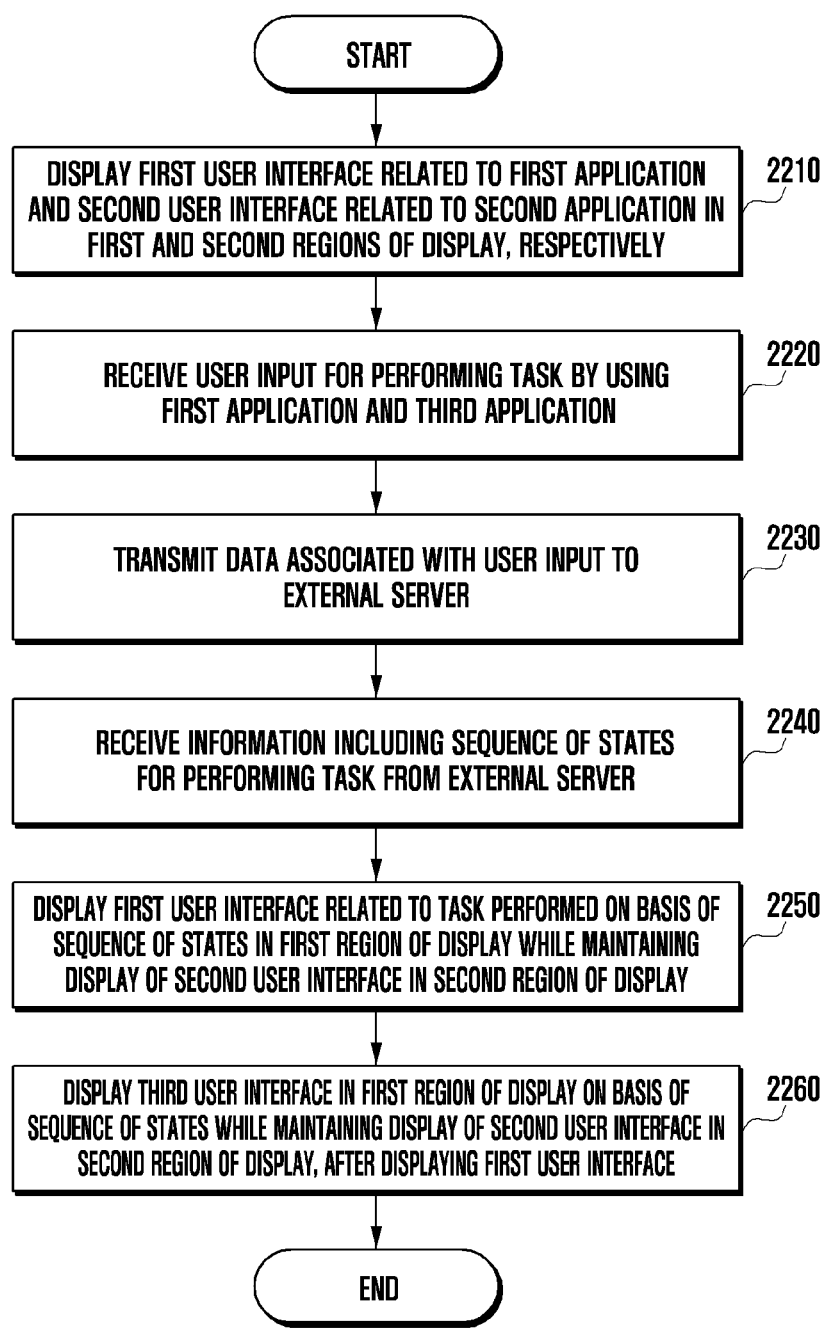
FIG. 22 is a flowchart illustrating a method for controlling a screen when there are multiple applications to be performed according to a user input received from a multiwindow according to various embodiments of the disclosure.

FIG. 22 is a flowchart illustrating a method for controlling a screen when there are multiple applications to be performed according to a user input received from a multiwindow according to various embodiments of the disclosure.

Referring to FIG. 22, the electronic device (for example, the processor 460 in FIG. 4) may display a first user interface related to a first application and a second user interface related to a second application in the first and second regions of the display (for example, the display 420 in FIG. 4), respectively, in operation 2210.

According to various embodiments of the disclosure, the electronic device (for example, the intelligent agent 820 in FIG. 8B) may receive a user input for performing a task by using the first application and a third application in operation 2220.

According to various embodiments of the disclosure, the electronic device (for example, the intelligent agent 820 in FIG. 8B) may transmit data associated with the received user input to an external server (for example, the intelligent server 850 in FIG. 8B) in operation 2230.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 2240.

According to various embodiments of the disclosure, the electronic device (for example, the intelligent agent 820 in FIG. 8B) may display the first user interface related to the task performed on the basis of the sequence of states while maintaining display of the second user interface in the second region of the display in operation 2250.

According to various embodiments of the disclosure, the electronic device (for example, the intelligent agent 820 in FIG. 8B) may display the first user interface and may then display the third user interface in the first region of the display on the basis of the sequence of states while maintaining the display of the second user interface in the second region of the display in operation 2260.

This will be described in detail with reference to FIG. 23A to FIG. 23C.

Figure 23A:
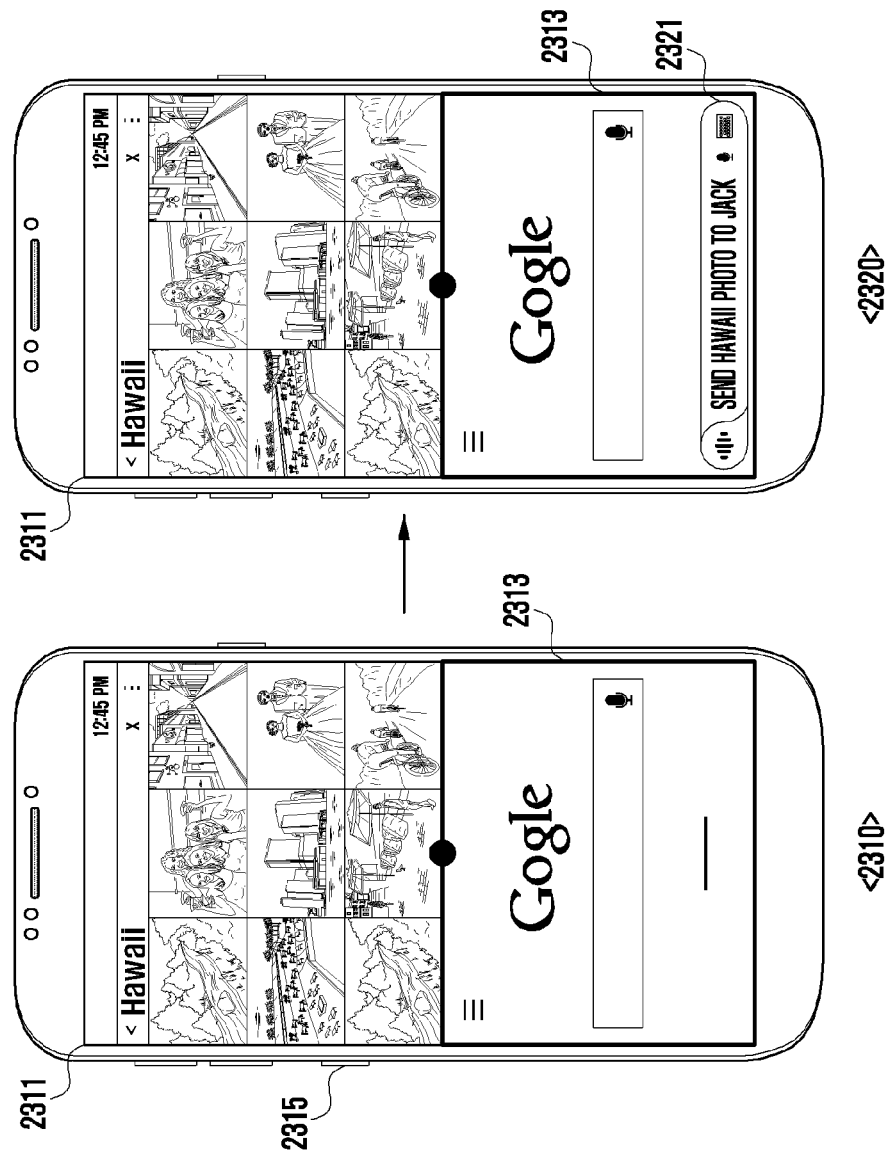
FIG. 23A to FIG. 23C are diagrams illustrating a method for controlling a screen when there are multiple applications to be performed according to a user input received from a multiwindow according to various embodiments of the disclosure.
Figure 23B:
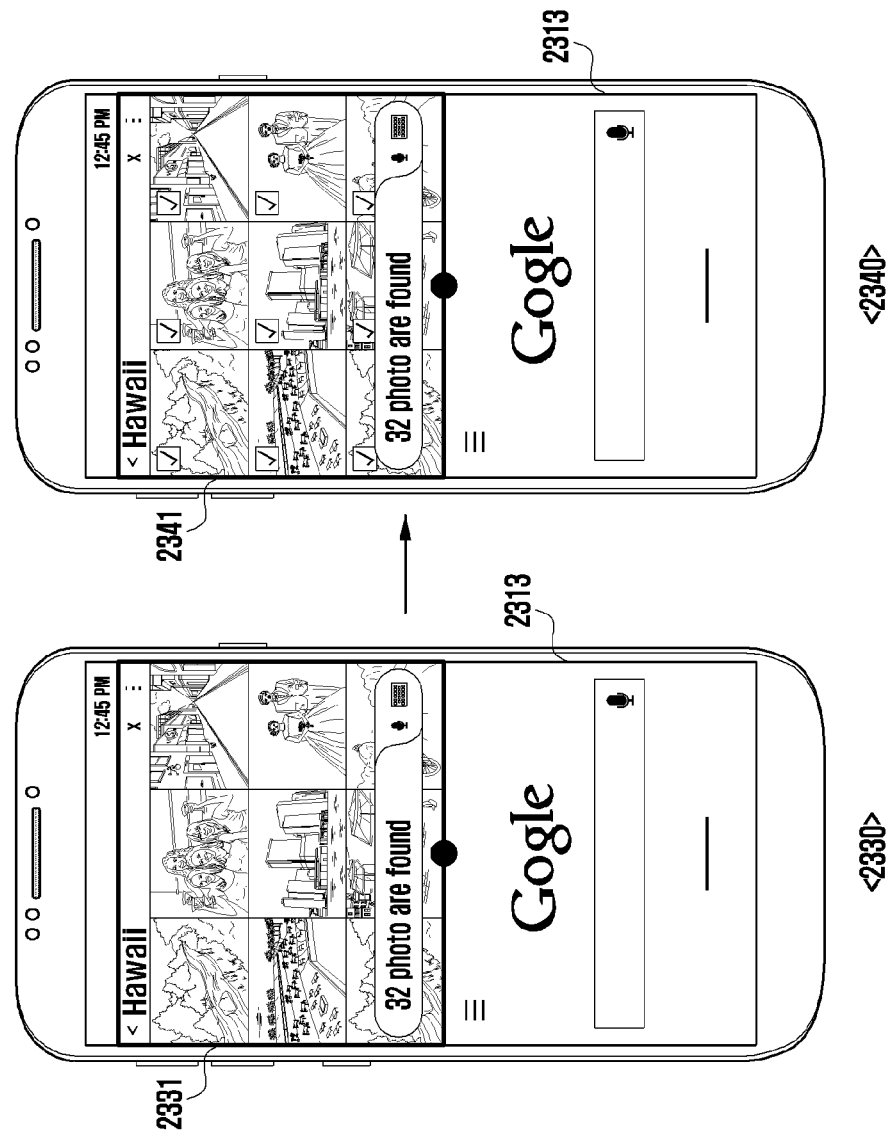
Figure 23C:
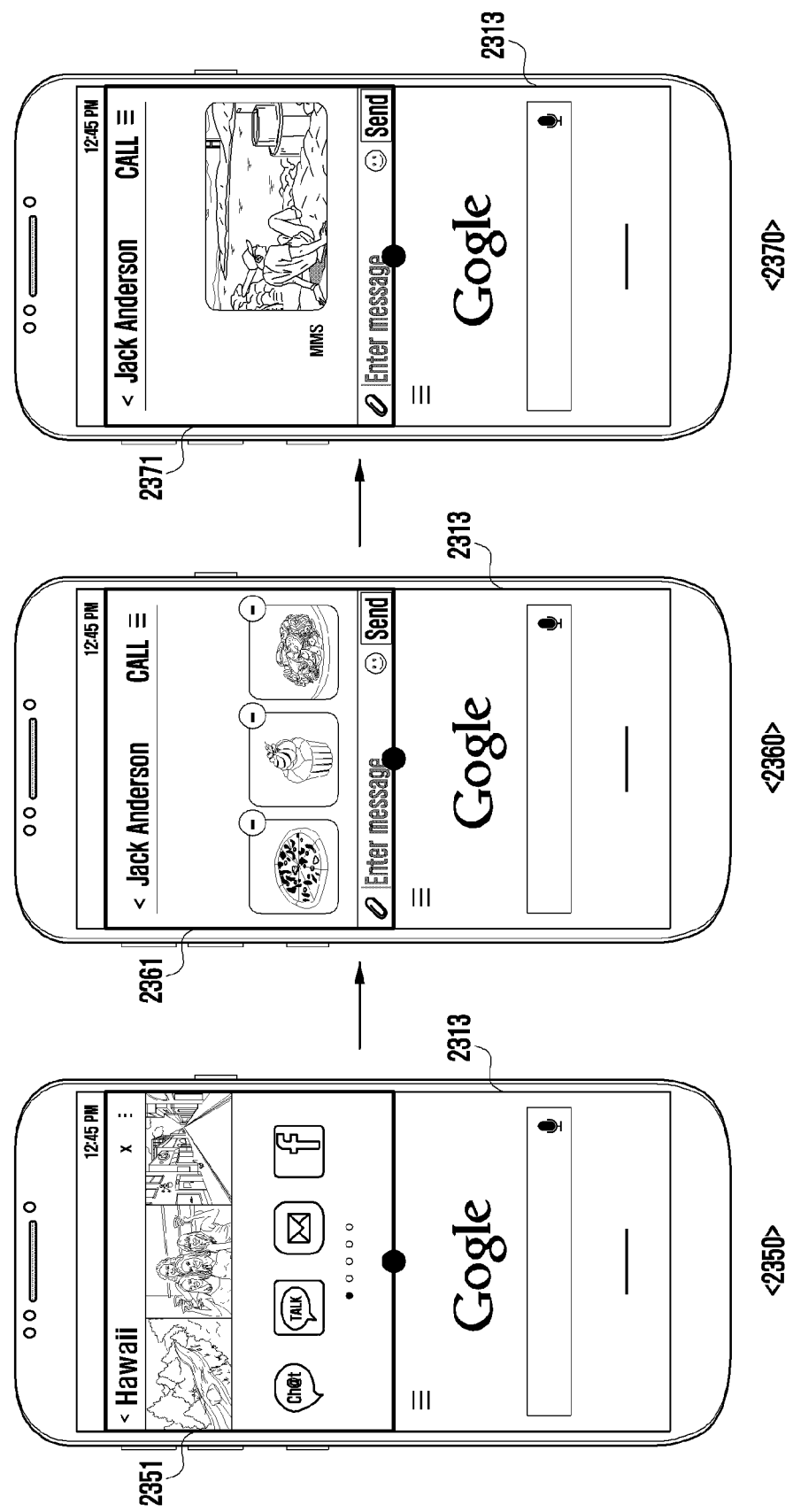

FIG. 23A to FIG. 23C are diagrams illustrating a method for controlling a screen when there are multiple applications to be performed according to a user input received from a multiwindow according to various embodiments of the disclosure.

Referring to FIG. 23A to FIG. 23C, the electronic device (for example, the electronic device 810 in FIG. 8B) may display a user interface 2311 related to a gallery application and a user interface 2313 related to a browser application as a multiwindow in the first region and the second region of the display (for example, the display 420 in FIG. 4), respectively, as illustrated in <2310>.

According to various embodiments of the disclosure, the electronic device may display a user interface 2321 for performing the speech recognition function as illustrated in <2320> in response to a signal generated by pressing a hardware key 2315 (for example, the hardware key 813 in FIG. 8A) separately provided on the electronic device. The electronic device may receive a user input "Send Hawaii photos to Jack" through the user interface 2321. The electronic device may transmit the user input "Send Hawaii photos to Jack" to an intelligent server (for example, the intelligent server 850 in FIG. 8B).

According to various embodiments of the disclosure, the natural language understanding module (for example, the natural language understanding module 855 in FIG. 8B) of the intelligent server may generate domain information, an intent, and a parameter on the basis of the user input "Send Hawaii photos to Jack". The natural language understanding module of the server may transmit the generated domain information, intent, and parameter to the path planner module (for example, the path planner module 859 in FIG. 8B) of the intelligent server.

According to various embodiments of the disclosure, if there are multiple pieces of domain information corresponding to the user input "Send Hawaii photos to Jack" generated by the natural language understanding module of the intelligent server, the path planner module may generate multiple path rules on the basis of the multiple pieces of domain information. For example, the path planner module of the intelligent server may generate a first path rule "message-conversation view(Jack)-attach-search-search result (Hawaii)-select Hawaii photo-send" and a second path rule "gallery-search-search result(Hawaii)-select Hawaii photo-share via message-send" with regard to the user input "Send Hawaii photos to Jack". The intelligent server may transmit the generated first path rule and second path rule to the electronic device.

According to various embodiments of the disclosure, the electronic device may successively perform states by using one of the first path rule and the second path rule received from the intelligent server.

According to various embodiments of the disclosure, if states are successively performed on the basis of the first path rule, the electronic device may compare the gallery application displayed in the first region of the display, which is not active, among the multiwindow with domain information for performing the first state on the basis of the first path rule, that is, the message application. If it is determined as a result of the comparison that the same are different, the electronic device may change the active window to the first region of the display in which the gallery application is displayed, and may successively perform states, for example, "message-conversation view(jack)-attach-search-search result(Hawaii)-select Hawaii photo-send" in the first region.

According to various embodiments of the disclosure, if states are successively performed on the basis of the second path rule, the electronic device may compare the gallery application displayed in the first region of the display, which is not active, among the multiwindow with domain information for performing the first state on the basis of the second path rule, that is, the gallery application. If it is determined as a result of the comparison that the same are identical, the electronic device may change the active window to the first region of the display in which the gallery application is displayed, and may successively perform states, for example, "gallery-search-search result(Hawaii) (2331)-select Hawaii photo(2341)-share via message (2351)" in the second region as illustrated in <2330> to <2350>.

According to various embodiments of the disclosure, if states to be performed by using the message application is started after successively performing states by using the gallery application, the electronic device may execute the message application in the first region of the display, in which the user interface related to the gallery application has been displayed, as illustrated in <2360> and may perform (2361) the remaining states of the second path rule, for example, "send". The electronic device may display a user interface 2371 according to the result of transmitting a message as illustrated in <2370>.

Figure 24:
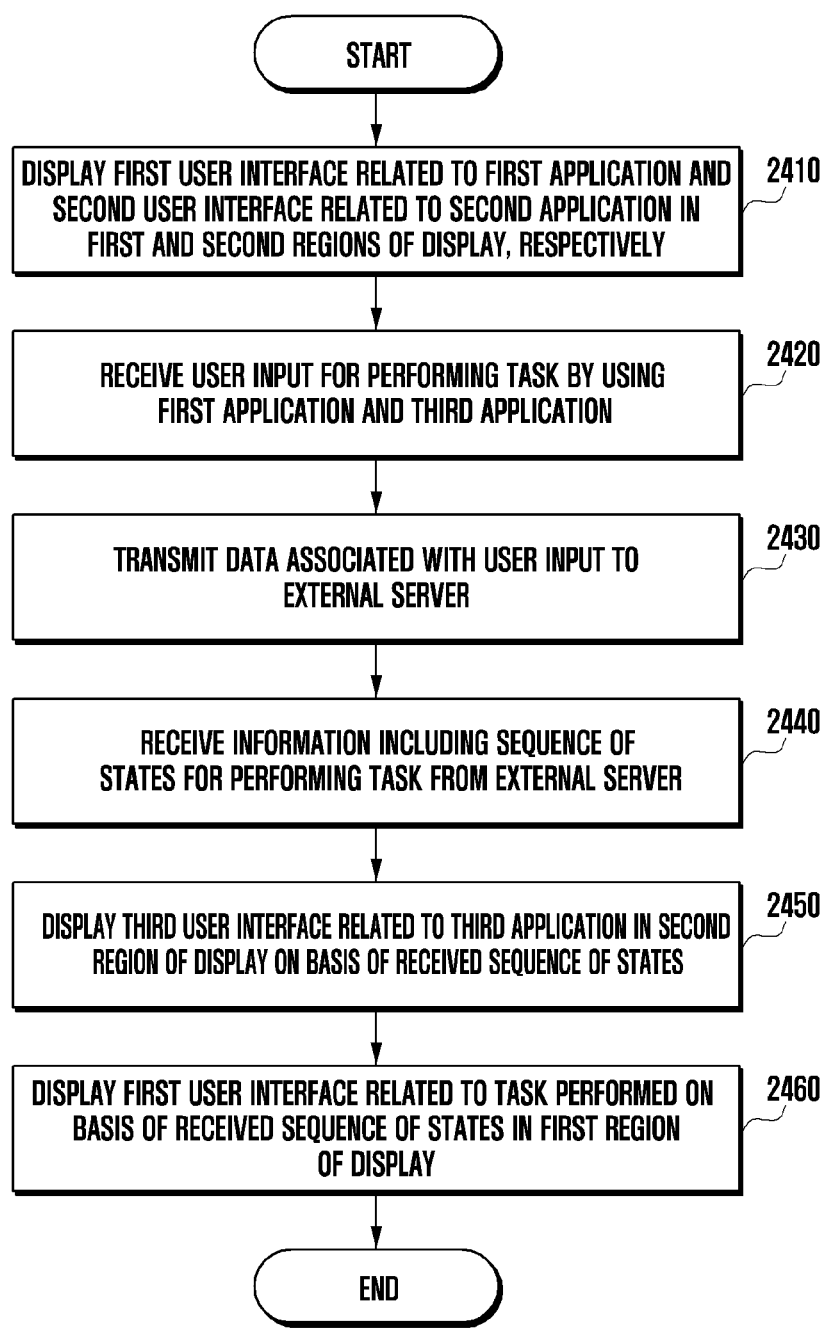
FIG. 24 is a flowchart illustrating a method for controlling a screen when there are multiple applications to be performed according to a user input received from a multiwindow according to various embodiments of the disclosure.

FIG. 24 is a flowchart illustrating a method for controlling a screen when there are multiple applications to be performed according to a user input received from a multiwindow according to various embodiments of the disclosure.

Referring to FIG. 24, the electronic device (for example, the processor 460 in FIG. 4) may display a first user interface related to a first application and a second user interface related to a second application, as a multiwindow, in the first and second regions of the display (for example, the display 420 in FIG. 4), respectively, in operation 2410.

According to various embodiments of the disclosure, the electronic device (for example, the intelligent agent 820 in FIG. 8B) may receive a user input for performing a task by using the first application and a third application in operation 2420.

According to various embodiments of the disclosure, the electronic device (for example, the intelligent agent 820 in FIG. 8B) may transmit data associated with the received user input to an external server (for example, the intelligent server 850 in FIG. 8B) in operation 2430.

According to various embodiments of the disclosure, the electronic device (for example, the intelligent agent 820 in FIG. 8B) may receive information including a sequence of states for performing a task from the external server (for example, the intelligent server 850 in FIG. 8B) in operation 2440.

According to various embodiments of the disclosure, the electronic device (for example, the intelligent agent 820 in FIG. 8B) may display a third user interface related to the third application in the second region of the display on the basis of the received sequence of states in operation 2450.

According to various embodiments of the disclosure, the electronic device (for example, the intelligent agent 820 in FIG. 8B) may display the third user interface and may then display the first user interface related to the task performed on the basis of the received sequence of states in the first region of the display in operation 2460.

This will be described in detail with reference to FIG. 25A to FIG. 25C.

Figure 25A:
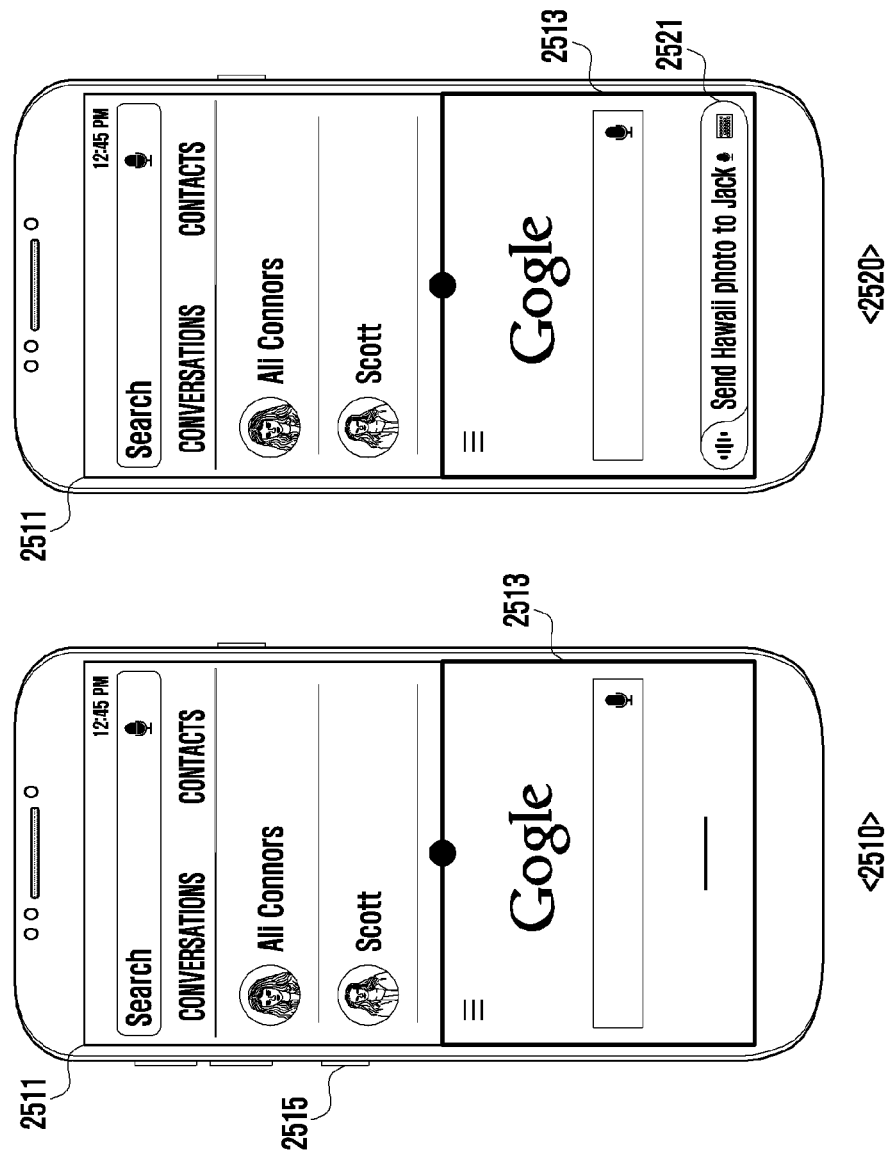
FIG. 25A to FIG. 25C are diagrams illustrating a method for controlling a screen when there are multiple applications to be performed according to a user input received from a multiwindow according to various embodiments of the disclosure.
Figure 25B:
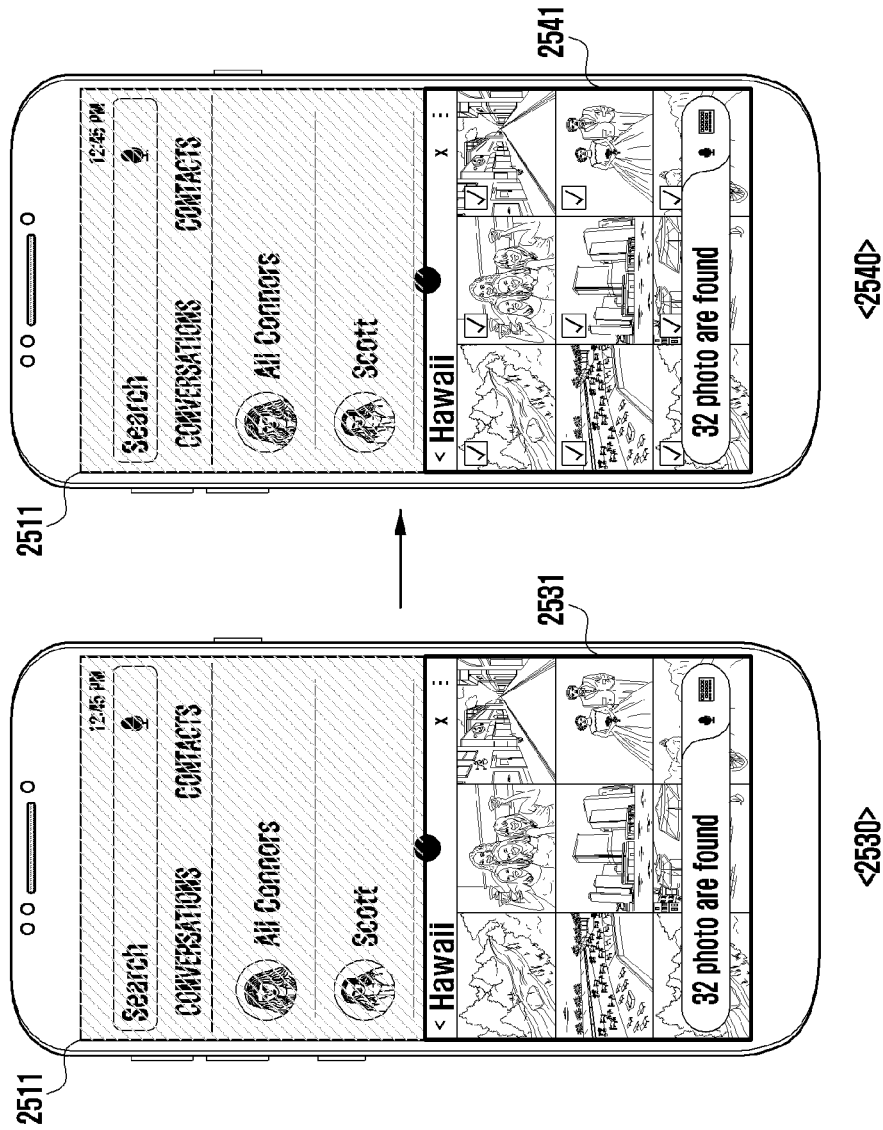
Figure 25C:
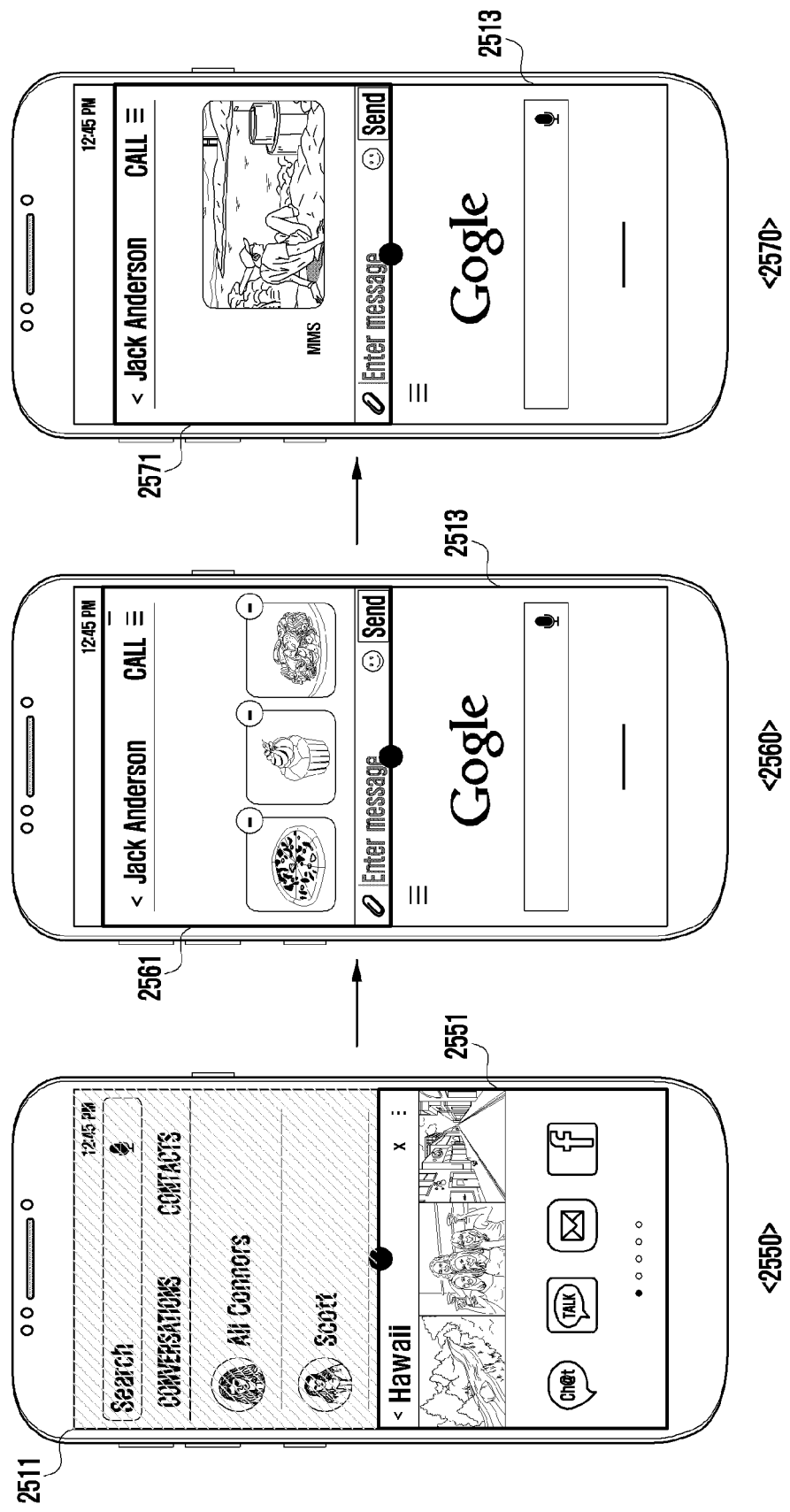

FIG. 25A to FIG. 25C are diagrams illustrating a method for controlling a screen when there are multiple applications to be performed according to a user input received from a multiwindow according to various embodiments of the disclosure.

Referring to FIG. 25A to FIG. 25C, the electronic device (for example, the electronic device 810 in FIG. 8B) may display a user interface 2511 related to a message application and a user interface 2513 related to a browser application as a multiwindow in the first region and the second region of the display (for example, the display 420 in FIG. 4), respectively, as illustrated in <2510>.

According to various embodiments of the disclosure, the electronic device may display a user interface 2521 for performing the speech recognition function as illustrated in <2520> in response to a signal generated by pressing a hardware key 2515 (for example, the hardware key 813 in FIG. 8A) separately provided on the electronic device. The electronic device may receive a user input "Send Hawaii photo to Jack" through the user interface 2521. The electronic device may transmit the user input "Send Hawaii photo to Jack" to an intelligent server (for example, the intelligent server 850 in FIG. 8B).

According to various embodiments of the disclosure, the natural language understanding module (for example, the natural language understanding module 855 in FIG. 8B) of the intelligent server may generate domain information, an intent, and a parameter on the basis of the user input "Send Hawaii photo to Jack". The natural language understanding module of the intelligent server may transmit the generated domain information, intent, and parameter to the path planner module (for example, the path planner module 859 in FIG. 8B) of the intelligent server.

According to various embodiments of the disclosure, if there are multiple pieces of domain information corresponding to the user input "Send Hawaii photo to Jack" generated by the natural language understanding module of the intelligent server, the path planner module may generate multiple path rules on the basis of the multiple pieces of domain information. For example, the path planner module of the intelligent server may generate a first path rule "message-conversation view(Jack)-attach-search-search result (Hawaii)-select Hawaii photo-send" and a second path rule "gallery-search-search result(Hawaii)-select Hawaii photo-share via message-send" with regard to the user input "Send Hawaii photo to Jack". The intelligent server may transmit the generated first path rule and second path rule to the electronic device.

According to various embodiments of the disclosure, the electronic device may successively perform states by using one of the first path rule and the second path rule received from the intelligent server.

According to various embodiments of the disclosure, if a sequence of states is performed on the basis of the first path rule, the electronic device may determine whether or not the message application which is not active among the multiwindow is identical to the domain (application) for performing the first path rule. Since the message application which is not active among the multiwindow is identical to the domain for performing the first path rule, that is, the message application, the electronic device may change the active window to the first region of the display in which the message application is displayed, and may successively perform states, for example, "message-conversation view (jack)-attach-search-search result(Hawaii)-select Hawaii photo-send" in the first region.

According to various embodiments of the disclosure, if states are performed on the basis of the second path rule, the electronic device may compare the message and browser applications displayed as a multiwindow with domain information for performing states on the basis of the second path rule, that is, the message application and the gallery application. The electronic device may determine the second region of the display, which displays the browser application that is not related to the application for performing states on the basis of the second path rule, as the region to display the user interface related to the application to perform the states. The electronic device may execute and display the gallery application in the second region as illustrated in <2530> to <2550>, and may successively perform states, for example, "gallery-search-search result(Hawaii)(2531)-select Hawaii photo(2541)-share via message(2551)" in the second region.

According to various embodiments of the disclosure, if states to be performed by using the message application is started after performing states by using the gallery application, the electronic device may perform (2561) the remaining states of the second path rule, for example, "send", by using the message application displayed in the first region of the display as illustrated in <2560>. The electronic device may display a user interface 2571 according to the result of transmitting a message as illustrated in <2570>.

Figure 26:
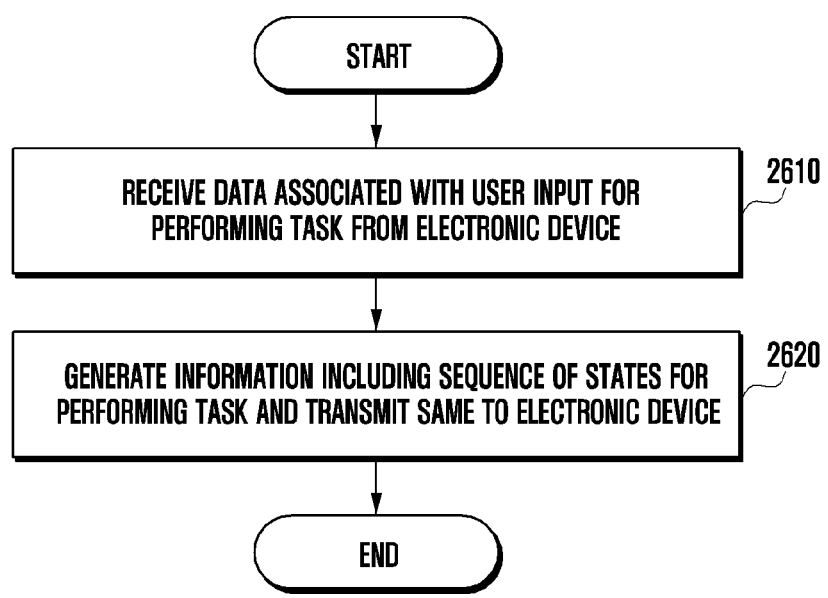
FIG. 26 is a flowchart illustrating a method for generating a path rule with regard to a user input in connection with an intelligent server according to various embodiments of the disclosure.

FIG. 26 is a flowchart illustrating a method for generating a path rule with regard to a user input in connection with an intelligent server according to various embodiments of the disclosure.

Referring to FIG. 26, the intelligent server (for example, the intelligent server 850 in FIG. 8B) may receive data associated with a user input for performing a task from an electronic device (for example, the intelligent agent 820 in FIG. 8B) in operation 2610. The intelligent server (for example, the intelligent server 850 in FIG. 8B) may generate information including a sequence of states for performing a task through a path planner module (for example, the path planner module 856 in FIG. 8B) and may transmit the same to the electronic device in operation 2620. The operation of generating information including a sequence of states has been described with reference to FIG. 5B, and detailed description thereof will be omitted herein.

Figure 27:
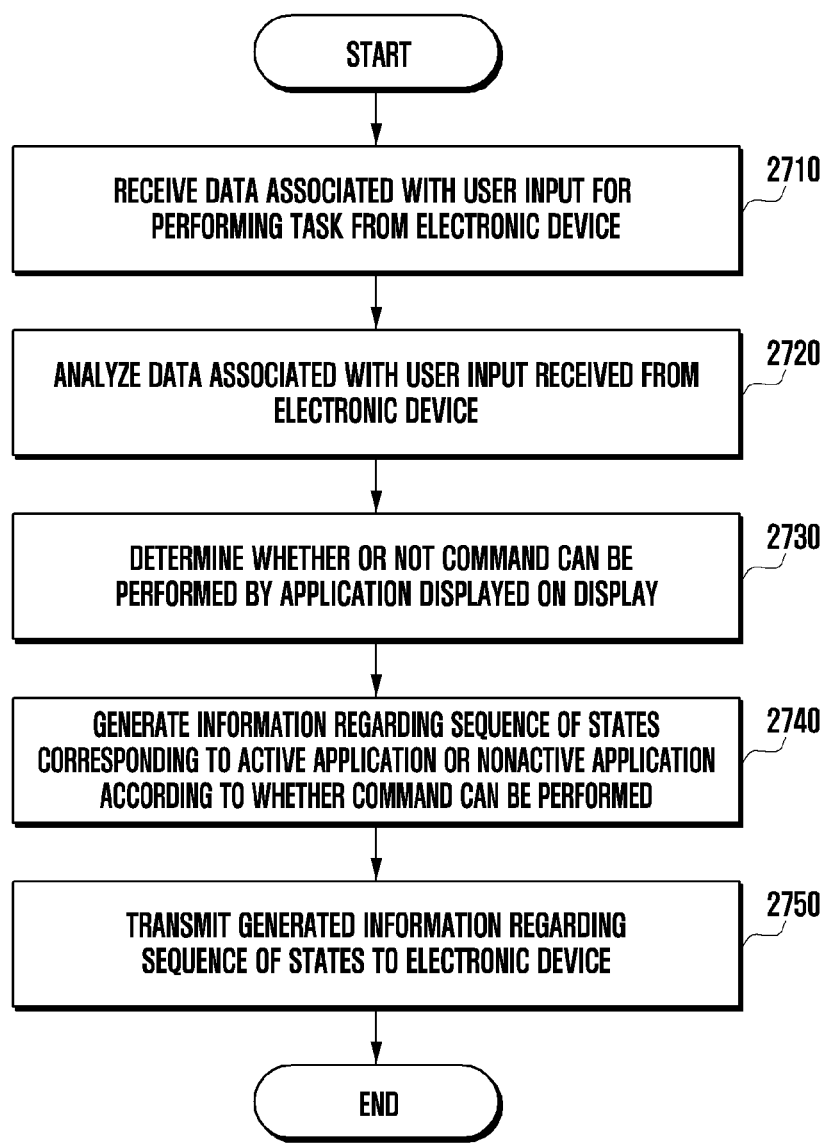
FIG. 27 is a flowchart illustrating a method for determining a window to display an application corresponding to a path rule by an intelligent server according to various embodiments of the disclosure.

FIG. 27 is a flowchart illustrating a method for determining a window to display an application corresponding to a path rule by an intelligent server according to various embodiments of the disclosure.

Referring to FIG. 27, the intelligent server (for example, the intelligent server 850 in FIG. 8B) may receive data associated with a user input for performing a task from an electronic device (for example, the intelligent agent 820 in FIG. 8B) in operation 2710. The intelligent server (for example, the intelligent server 850 in FIG. 8B) may analyze the data associated with the user input received from the electronic device in operation 2720. The intelligent server (for example, the intelligent server 850 in FIG. 8B) may determine whether or not the analyzed data associated with the user input is a command that can be performed by an application displayed on the display of the electronic device in operation 2730. For example, the user input may include at least one of a user utterance and a touch interaction.

According to various embodiments of the disclosure, the intelligent server (for example, the intelligent server 850 in FIG. 8B) may generate information regarding a sequence of states corresponding to an application which is active or nonactive on the display of the electronic device according to whether or not the received user input is a command that can be performed by the application displayed on the display of the electronic device in operation 2740. The intelligent server (for example, the intelligent server 850 in FIG. 8B) may transmit the generated information regarding a sequence of states to the electronic device (for example, the intelligent agent 820 in FIG. 8B) in operation 2750.

This will be described in detail with reference to FIG. 28A to FIG. 28E.

FIG. 28A to FIG. 28E are diagrams illustrating a method for determining a window to display an application corresponding to a path rule by an intelligent server according to various embodiments of the disclosure.

Figure 28A:
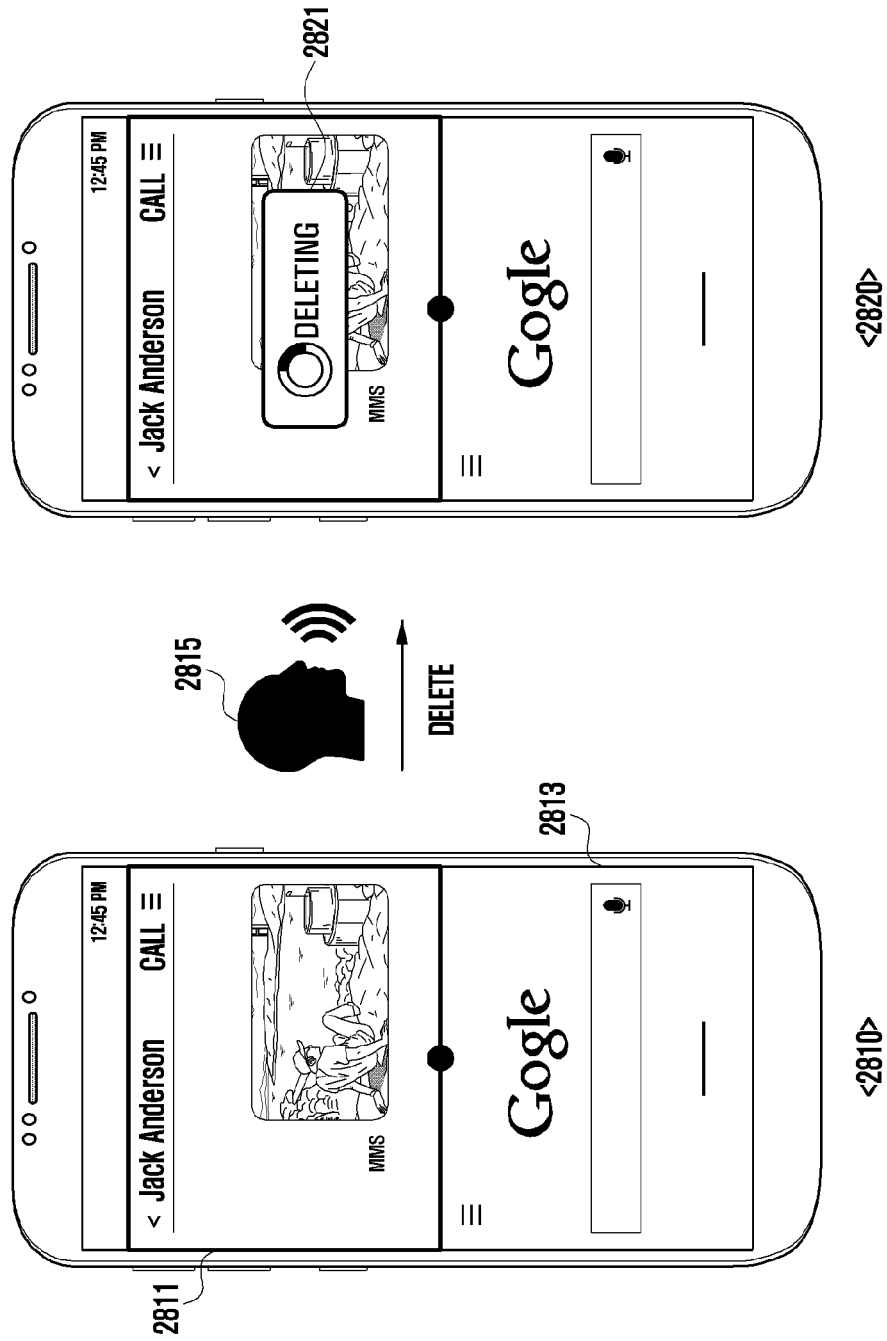

Referring to FIG. 28A, the electronic device (for example, the electronic device 810 in FIG. 8B) may display a user interface 2811 related to a message application and a user interface 2813 related to a browser application as a multi-window in the first region and the second region of the display (for example, the display 420 in FIG. 4), respectively, as illustrated in <2810>. The first region, in which the user interface 2811 related to the message application among the user interfaces is displayed, may be the active window. The electronic device may receive a user input, for example, "Delete" 2815.

According to various embodiments of the disclosure, electronic device may transmit the user input "Delete" 2815 to an intelligent server (for example, the intelligent server 850 in FIG. 8B). The electronic device may transmit window context information, together with the user input, to the intelligent server. The window context information may include information regarding the number of displayed windows, information regarding an active window, information regarding an application displayed in the window, information regarding the state of the application, and information regarding the input state of windows (for example, whether or not an input is made by using the keypad).

According to various embodiments of the disclosure, the intelligent server may determine, on the basis of the window context information, whether or not an operation corresponding to the user input "Delete" 2815 can be performed by the user interface related to the message application displayed in the active window. When the same can be performed, the intelligent server may determine that the window to perform the user input "Delete" 2815 is the user interface related to the message application in the first region, and may transmit the same to the electronic device.

According to various embodiments of the disclosure, the electronic device may perform an operation 2821 of deleting messages in the window determined by the intelligent server (for example, the user interface related to the message application) as illustrated in <2820>.

Figure 28B:
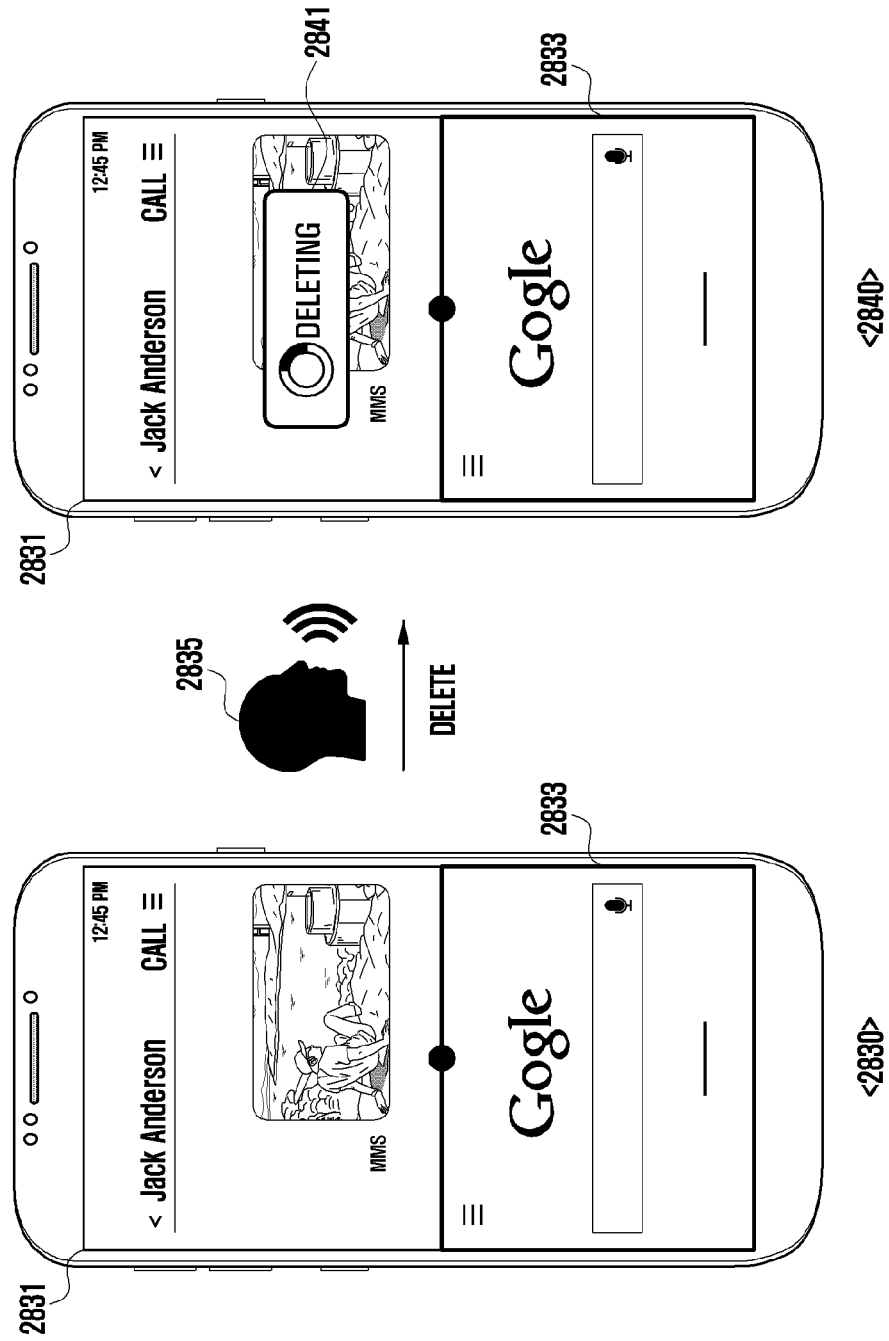

Referring to FIG. 28B, the electronic device may display a user interface 2831 related to a message application and a user interface 2833 related to a browser application as a multiwindow in the first region and the second region of the display, respectively, as illustrated in <2830>. The second region, in which the user interface 2833 related to the browser application among the user interfaces is displayed, may be the active window. The electronic device may receive a user input, for example, "Delete" 2835.

According to various embodiments of the disclosure, the electronic device may transmit the user input "Delete" 2835 to the intelligent server. The electronic device may transmit window context information, together with the user input, to the intelligent server.

According to various embodiments of the disclosure, the intelligent server may determine, on the basis of the window context information, whether or not an operation corresponding to the user input "Delete" 2835 can be performed by the user interface 2833 related to the browser application displayed in the second region as the active window. When an operation corresponding to the user input "Delete" 2835 cannot be performed by the user interface 2833 related to the browser application displayed in the second region as the active window, the electronic device may determine whether or not the same can be performed by the user interface 2831 related to the message application displayed in a region which is displayed as the active window, and which is different from the second region, for example, in the first region of a nonactive window. When the operation corresponding to the user input "Delete" 2835 can be performed by the user interface 2831 related to the message application displayed in the first region of the nonactive window, the intelligent server may determine that the window to perform the user input "Delete" 2815 is the user interface 2831 related to the message application in the first region, and may transmit the same to the electronic device.

According to various embodiments of the disclosure, the electronic device may perform an operation (2841) of deleting messages from the window determined by the intelligent server (for example, the user interface related to the message application) as illustrated in <2840>.

According to various embodiments of the disclosure, the electronic device may maintain the active window in the second region (which has been the existing active window) while performing the deleting operation, or change the active window to the first region in which the deleting operation is performed.

According to various embodiments of the disclosure, after performing the deleting operation, the electronic device may maintain the active window in the first region, which has been changed as a result of performing the deleting operation, or change the same to the second region which has been the active window prior to the deleting operation.

Figure 28C:
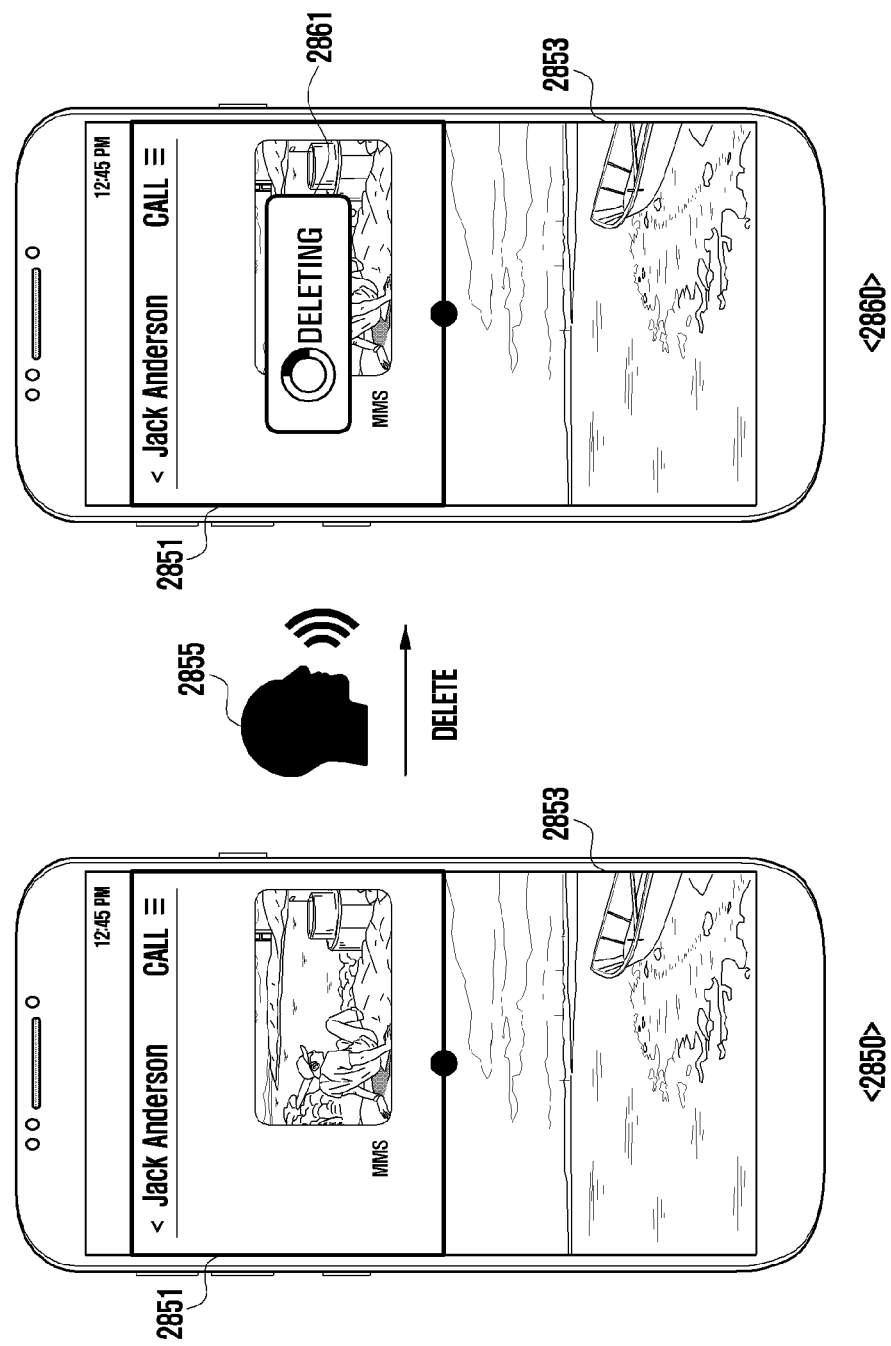

Referring to FIG. 28C, the electronic device may display a user interface 2851 related to a message application and a user interface 2853 related to a gallery application as a multiwindow in the first region and the second region of the display, respectively, as illustrated in <2850>. The first region in which the user interface 2851 related to the message application among the user interfaces is displayed, may be the active window. The electronic device may receive a user input, for example, "Delete" 2855.

According to various embodiments of the disclosure, the electronic device may transmit the user input "Delete" 2855 to the intelligent server. The electronic device may transmit window context information, together with the user input, to the intelligent server.

According to various embodiments of the disclosure, the intelligent server may determine, on the basis of the window context information, whether or not an operation corresponding to the user input "Delete" 2855 can be performed by the user interfaces 2851 and 2853 related to the applications displayed in the first and second regions of the display. If the operation corresponding to the user input "Delete" 2855 can be performed by the user interfaces 2851 and 2853 related to the applications displayed in the first and second regions of the display, the intelligent server may make a determination such that the user input is preferentially performed in the active window, and may transmit the same to the electronic device.

According to various embodiments of the disclosure, the electronic device may perform a command 2861 of deleting messages through the user interface 2851 related to the message application displayed in the active window determined by the intelligent server, for example, the first region, as illustrated in <2860>.

Figure 28D:
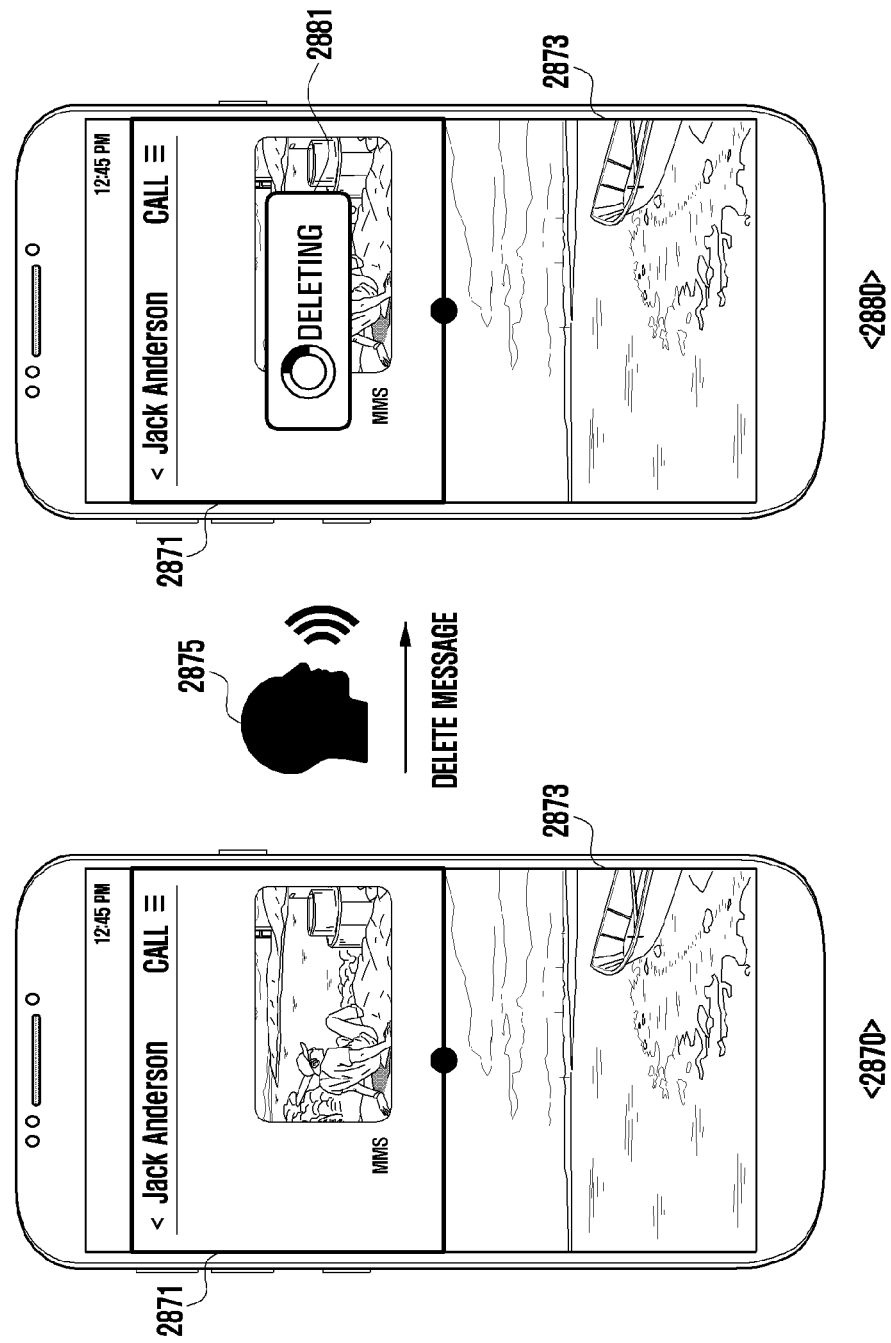

Referring to FIG. 28D, the electronic device may display a user interface 2871 related to the message application and a user interface 2873 related to the gallery application as a multiwindow in the first region and the second region of the display, respectively, as illustrated in <2870>. The first region in which the user interface 2871 related to the message application among the user interfaces is displayed, may be the active window. The electronic device may receive a user input, for example, "Delete messages" 2875.

According to various embodiments of the disclosure, the electronic device may transmit the user input "Delete messages" 2875 to the intelligent server. The electronic device may transmit window context information, together with the user input, to the intelligent server.

According to various embodiments of the disclosure, if a user input including the deletion target (for example, messages) is received as in the case of the user input "Delete messages" 2875, the intelligent server may preferentially perform a deleting command through the user interface related to the application corresponding to the deletion target, regardless of whether the display region is active or not.

According to various embodiments of the disclosure, the intelligent server may determine whether or not the user interface related to the application corresponding to the deletion target "messages" in the user input "Delete messages" 2875 is displayed on the display. Since the user interface 2871 related to the message application is displayed in the first region, which is the active window of the display, as described above, the intelligent server may determine that the window to perform the user input "Delete messages" is the user interface 2871 related to the message application displayed in the first region, which is the active window of the display, and may transmit the same to the electronic device.

According to various embodiments of the disclosure, the electronic device may perform a command 2881 of deleting messages through the window determined by the intelligent server (for example, the user interface 2871 related to the message application displayed in the first region of the display) as illustrated in <2880>.

Various embodiments of the disclosure have been described with reference to an exemplary user input "Delete messages", but the same is not limiting in any manner. For example, if a user input "Delete photos" is received from the electronic device, the intelligent server may determine whether or not the user interface related to the application corresponding to the deletion target "photos" is displayed on the display. Since the user interface 2873 related to the gallery application is displayed in the second region, which is a nonactive window of the display, as described above, the intelligent server may determine that the window to perform the user input "Delete photos" is the user interface 2873 related to the gallery application displayed in the second region, which is a nonactive window of the display, and may transmit the same to the electronic device. According to various embodiments of the disclosure, the electronic device may change the active window from the first region to the second region while performing the operation of deleting photos. In addition, after performing the deleting operation, the electronic device may maintain the active window in the second region, or may change the same to the first region which has been the existing active window.

Referring to FIG. 28E, the electronic device may display a user interface 2891 related to the message application and a user interface 2892 related to the gallery application as a multiwindow in the first region and the second region of the display, respectively, as illustrated in <2890>. The second region in which the user interface 2892 related to the gallery application among the user interfaces is displayed, may be the active window. The electronic device may receive a user input, for example, "Delete" 2894, and may sense a touch interaction 2893 in the second region.

According to various embodiments of the disclosure, the electronic device may transmit the user input "Delete" 2894 to the intelligent server. The electronic device may transmit window context information and information regarding the sensed touch interaction 2893, together with the user input, to the intelligent server.

According to various embodiments of the disclosure, the intelligent server may determine that the window to perform the operation corresponding to "Delete" 2894 (for example, a deleting command) is the first region in which the user interface 2891 related to the message application is displayed (for example, a region in which no touch interaction 2893 is sensed). In addition, the intelligent server may determine that the window to perform an operation corresponding to the touch interaction 2893 sensed in the second region is the second region in which the user interface 2892 related to the gallery application is displayed (for example, a region in which a touch interaction 2893 is sensed).

According to various embodiments of the disclosure, the electronic device may perform a deleting command 2897 corresponding to the user input in the first region of the display, in which the user interface 2891 related to the message application is displayed, on the basis of the window determined by the intelligent server, as illustrated in <2895>. In addition, the electronic device may display an operation corresponding to the touch interaction 2893 in the second region of the display, in which the user interface 2892 related to the gallery application is displayed, for example, a user interface 2898 related to the gallery application switched to the next photo.

According to embodiments of the disclosure, preferred embodiments of an electronic device and a screen control method for processing a user input by using the same have been described with reference to the specification and drawings. Although specific terms have been used, the same are used in a normal sense to easily describe the technical features of the disclosure and to help understand the disclosure, and the disclosure is not limited to the above-described embodiments. That is, it will be obvious to a person skilled in the art to which the disclosure pertains that various embodiments are possible on the basis of the technical idea of the disclosure.

The invention claimed is:

1. An electronic device comprising:
   a housing;
   a touch screen display positioned inside the housing and exposed through a first portion of the housing;
   a microphone positioned inside the housing and exposed through a second portion of the housing;
   at least one speaker positioned inside the housing and exposed through a third portion of the housing;
   a wireless communication circuit positioned inside the housing;
   a processor positioned inside the housing and electrically connected to the display, the microphone, the speaker, and the communication circuit; and
   a memory positioned inside the housing and electrically connected to the processor,
   wherein the memory is configured to store a first application program that includes a first user interface, a second application program that includes a second user interface, and a speech recognition application different from the first and second application programs, and
   wherein the memory stores instructions that, when executed, cause the processor to:
      display the first user interface on the display;
      while displaying the first user interface, execute the speech recognition application and receive, through the microphone and through the speech recognition application, an utterance for performing a task using the second application program;
      transmit data associated with the utterance to an external server via the communication circuit;
      receive a response from the external server via the communication circuit, wherein the response includes information on a sequence of states of the electronic device to perform the task generated by the external server, wherein the sequence of states includes a plurality of actions for performing a function of at least one application program from among the first and second application programs;
      after receiving the response, display the second user interface on a first region of the display, based on performing of the sequence of the states corresponding to the utterance using the second application program in the first region of the display, while displaying a portion of the first user interface on a second region of the display;
      determine a window that displays the second user interface for performing the sequences of states as an active window; and
      change the active window from the second user interface to the first user interface in response to detecting the sequence of states is completely performed.

2. The device of claim 1, wherein the instructions cause the processor to display the second user interface to overlap with a portion of the first user interface.

3. The device of claim 1, wherein the instructions further cause the processor to, after displaying the second user interface, close the first user interface and the second user interface, and display a third user interface on the display, based on the sequence of the states.

4. The device of claim 1, wherein the instructions further cause the processor to:
   detect an input for executing a speech recognition function related to the speech recognition application while the first user interface is displayed;
   in response to detecting the input for executing the speech recognition function, display, on the touch screen display, a third user interface related to the speech recognition functions; and
   receive the utterance through the third user interface related to the speech recognition function.

5. The device of claim 1, further comprising an input module comprising a hardware key for executing a speech recognition function.

6. The device of claim 1, wherein the instructions further cause the processor to determine a region of the touch screen display, in which the second user interface is to be displayed, based on the sequence of states and window context information.

7. The device of claim 6, wherein the window context information comprises at least one of information regarding a currently executed application, information regarding whether or not a window of the touch screen display, in which a user interface related to the currently executed application is displayed, is active, and information regarding whether or not the user interface related to the currently executed application has input characteristics.

8. The device of claim 1, wherein the instructions further cause the processor to determine whether or not a connection with an external device is established through the wireless communication circuit and, in response to determining that a connection with the external device is established, transmit information regarding the sequence of states to the external device through the wireless communication circuit such that the second application program is displayed on a display of the external device.

9. The device of claim 1, wherein the first application program comprises a message application, and the second application program comprises at least one of a gallery application, a camera application, and a browser application.

10. The device of claim 1, wherein the instructions further cause the processor to:
while displaying the first user interface, receive, through the microphone, a second utterance for performing a task using the first application and the second application programs;
transmit data associated with the second utterance to an external server via the communication circuit;
receive a response from the external server via the communication circuit, wherein the response includes information on a sequence of states of the electronic device to perform the task generated by the external server;
after receiving the response, display the first user interface on the display, based on performing of the sequence of the states corresponding to the utterance using the first application program; and
after displaying the first user interface, display the second user interface on a first region of the display, based on the sequence of the states corresponding to the utterance using the second application program in the first region of the display, while displaying a portion of the first user interface on a second region of the display.

11. An electronic device comprising:
a housing;
a touchscreen display positioned inside the housing and exposed through a first portion of the housing;
a microphone positioned inside the housing and exposed through a second portion of the housing;
at least one speaker positioned inside the housing and exposed through a third portion of the housing;
a wireless communication circuit positioned inside the housing;
a processor positioned inside the housing and electrically connected to the display, the microphone, the speaker, and the communication circuit; and
a memory positioned inside the housing and electrically connected to the processor,
wherein the memory is configured to store a first application program that includes a first user interface, a second application program that includes a second user interface, and a speech recognition application different from the first and second application programs, and
wherein the memory stores instructions that, when executed, cause the processor to:
display the first user interface on a first region of the display, and the second user interface on a second region of the display;
execute the speech recognition application and receive, through the microphone and through the speech recognition application, an utterance for performing a task using the second application program in a state where the second user interface is determined as an activation window;
transmit data associated with the utterance to an external server via the communication circuit;
receive a response from the external server via the communication circuit, wherein the response includes information on a sequence of states of the electronic device to perform the task generated by the external server, wherein the sequence of states includes a plurality of actions for performing a function of at least one application program from among the first and second application programs;
after receiving the response, adapt the second user interface on the display, based on performing of the sequence of the states corresponding to the utterance using the second application program in the second region of the display, while keeping displaying the first user interface on the first region of the display; and
maintain the active window in the second user interface in response to detecting the sequence of states is completely performed.

12. The device of claim 11, wherein the memory is configured to store a third application program that includes a third user interface, and
wherein the memory stores instructions that, when executed, cause the processor to:
display the first user interface on a first region of the display, and the second user interface on a second region of the display;
receive a user input through at least one of the display or the microphone, wherein the user input includes a request for performing a task using the third application program;
transmit data associated with the user input to an external server via the communication circuit;
receive a response from the external server via the communication circuit, wherein the response includes information on a sequence of states of the electronic device to perform the task; and
after receiving the response, display the third user interface on the first region of the display, based on the sequence of the states, while keeping displaying the second user interface on the second region of the display.

13. The device of claim 11, wherein the memory is configured to store a third application program that includes a third user interface, and
wherein the memory stores instructions that, when executed, cause the processor to:
display the first user interface on a first region of the display, and the second user interface on a second region of the display;
receive a user input through at least one of the display or the microphone, wherein the user input includes a request for performing a task using the first application program and the third application program;
transmit data associated with the user input to an external server via the communication circuit;
receive a response from the external server via the communication circuit, wherein the response includes information on a sequence of states of the electronic device to perform the task; and
after receiving the response, adapt the first user interface on the first region of the display, based on the sequence of the states, while keeping displaying the second user interface on the second region of the display; and
after adapting the first user interface, displaying the third user interface on the first region of the display, based on the sequence of the states, while keeping displaying the second user interface on the second region of the display.

14. The device of claim 11, wherein the instructions further cause the processor to:
- detect an input for executing a speech recognition function related to a speech recognition application while the first user interface is displayed;
- in response to detecting the input for executing the speech recognition function, display, on the touchscreen display, a third user interface related to the speech recognition function; and receive the utterance through the third user interface related to the speech recognition function.

* * * * *